(12) United States Patent
García Morate et al.

(10) Patent No.: US 11,336,819 B2
(45) Date of Patent: *May 17, 2022

(54) METHODS AND APPARATUS TO CAPTURE PHOTOGRAPHS USING MOBILE DEVICES

(71) Applicant: The Nielsen Company (US), LLC, New York, NY (US)

(72) Inventors: Diego García Morate, Valladolid (ES); Antonio Hurtado Garcia, Valladolid (ES); Javier Tovar Velasco, Valladolid (ES); Carlos Barrales Ruiz, Valladolid (ES)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/932,238

(22) Filed: Jul. 17, 2020

(65) Prior Publication Data

US 2020/0358948 A1 Nov. 12, 2020

Related U.S. Application Data

(60) Continuation of application No. 16/164,201, filed on Oct. 18, 2018, now Pat. No. 10,735,645, which is a
(Continued)

(51) Int. Cl.
*H04N 5/232* (2006.01)
*G06T 3/40* (2006.01)
(Continued)

(52) U.S. Cl.
CPC ........... *H04N 5/23222* (2013.01); *G06K 9/22* (2013.01); *G06T 3/4038* (2013.01); *G06T 5/003* (2013.01);
(Continued)

(58) Field of Classification Search
CPC ......... H04N 5/23222; H04N 5/232945; H04N 5/23254; G06K 9/22; G06K 2009/2045;
(Continued)

(56) References Cited

U.S. PATENT DOCUMENTS 4,373,133 A 2/1983 Clyne et al.
4,973,952 A 11/1990 Malec et al.
(Continued)

OTHER PUBLICATIONS

Azizyan et al., "SurroundSense: Mobile Phone Localization via Ambience Fingerprinting," MobiCom '09, Sep. 20-25, 2009, 12 pages.
(Continued)

*Primary Examiner* — Chiawei Chen
(74) *Attorney, Agent, or Firm* — Hanley, Flight & Zimmerman, LLC

(57) ABSTRACT

Methods and apparatus to capture photographs using mobile devices are disclosed. An example apparatus includes a photograph capturing controller to capture a first photograph. The apparatus further includes a blurriness analyzer to determine a probability of blurriness of the first photograph. The probability of blurriness is based on an analysis of a portion of the first photograph, the portion excluding a region of the first photograph associated with an auto-focus operation. The example apparatus also includes a photograph capturing interface to prompt a user to capture a new photograph to replace the first photograph when the probability of blurriness exceeds a blurriness threshold.

28 Claims, 27 Drawing Sheets

Related U.S. Application Data division of application No. 15/871,658, filed on Jan. 15, 2018, now Pat. No. 10,136,052, which is a continuation of application No. 14/796,813, filed on Jul. 10, 2015, now Pat. No. 9,906,712, which is a continuation of application No. PCT/IB2015/001103, filed on Jun. 18, 2015.

(51) Int. Cl.

| | | |
|---|---|---|
| G06T 5/00 | (2006.01) | |
| G06T 7/00 | (2017.01) | |
| G06T 7/73 | (2017.01) | |
| G06K 9/22 | (2006.01) | |
| G06K 9/20 | (2006.01) | |
| G06K 9/32 | (2006.01) | |

(52) U.S. Cl.
CPC .............. *G06T 7/0002* (2013.01); *G06T 7/73* (2017.01); *H04N 5/23254* (2013.01); *H04N 5/232945* (2018.08); *G06K 2009/2045* (2013.01); *G06K 2009/3225* (2013.01); *G06T 2207/30168* (2013.01); *G06T 2207/30244* (2013.01)

(58) Field of Classification Search
CPC .......... G06K 2009/3225; G06T 3/4038; G06T 5/003; G06T 7/0002; G06T 7/73; G06T 2207/30168; G06T 2207/30244
See application file for complete search history.

(56) References Cited

U.S. PATENT DOCUMENTS

| | | | |
|---|---|---|---|
| 5,287,266 A | 2/1994 | Malec et al. | |
| 5,294,781 A | 3/1994 | Takahashi et al. | |
| 5,506,918 A | 4/1996 | Ishitani | |
| 5,640,002 A | 6/1997 | Ruppert et al. | |
| 5,659,816 A | 8/1997 | Uchiyama | |
| 5,699,244 A | 12/1997 | Clark, Jr. et al. | |
| 5,821,513 A | 10/1998 | O'Hagan et al. | |
| 6,026,376 A | 2/2000 | Kenney | |
| 6,097,854 A | 8/2000 | Szeliski et al. | |
| 6,304,284 B1 | 10/2001 | Dunton et al. | |
| 6,304,855 B1 | 10/2001 | Burke | |
| 6,473,531 B1 | 10/2002 | Kunitake | |
| 6,574,614 B1 | 6/2003 | Kesel | |
| 6,584,375 B2 | 6/2003 | Bancroft et al. | |
| 6,911,908 B1 | 6/2005 | Beart | |
| 6,928,343 B2 | 8/2005 | Cato | |
| 7,064,783 B2 | 6/2006 | Colavin et al. | |
| 7,080,061 B2 | 7/2006 | Kabala | |
| 7,148,803 B2 | 12/2006 | Bandy et al. | |
| 7,155,336 B2 | 12/2006 | Dorfman et al. | |
| 7,164,780 B2 | 1/2007 | Brundage et al. | |
| 7,206,753 B2 | 4/2007 | Bancroft et al. | |
| 7,221,805 B1 | 5/2007 | Bachelder | |
| 7,412,427 B2 | 8/2008 | Zitnick et al. | |
| 7,420,464 B2 | 9/2008 | Fitzgerald et al. | |
| 7,428,012 B2 | 9/2008 | Sakamoto et al. | |
| 7,561,192 B2 | 7/2009 | Kobayashi | |
| 7,575,171 B2 | 8/2009 | Lev | |
| 7,681,796 B2 | 3/2010 | Cato et al. | |
| 7,751,805 B2 | 7/2010 | Neven et al. | |
| 8,139,886 B2 * | 3/2012 | Szeliski | G06T 5/003 |
| | | | 382/260 |
| 8,189,855 B2 | 5/2012 | Opalach et al. | |
| 8,260,689 B2 | 9/2012 | Dollens | |
| 8,374,246 B2 | 2/2013 | Raveendran et al. | |
| 8,605,141 B2 | 12/2013 | Dialameh et al. | |
| 8,634,593 B2 | 1/2014 | Zhang et al. | |
| 8,694,459 B2 | 4/2014 | Zadeh | |
| 8,941,685 B1 | 1/2015 | Chapin et al. | |
| 9,082,004 B2 | 7/2015 | Nielsen | |
| 9,367,831 B1 | 6/2016 | Besehanic | |
| 9,456,121 B2 | 9/2016 | Miyazawa | |
| 9,560,267 B2 | 1/2017 | Nielsen | |
| 10,735,645 B2 * | 8/2020 | Garcia Morate | H04N 5/23222 |
| 2002/0007295 A1 | 1/2002 | Kenny et al. | |
| 2002/0010655 A1 | 1/2002 | Kjallstrom | |
| 2002/0028071 A1 | 3/2002 | Molgaard | |
| 2002/0075258 A1 | 6/2002 | Park et al. | |
| 2003/0020732 A1 | 1/2003 | Jasa et al. | |
| 2003/0026482 A1 | 2/2003 | Dance | |
| 2003/0026609 A1 | 2/2003 | Parulski | |
| 2003/0055707 A1 | 3/2003 | Busche et al. | |
| 2003/0151674 A1 | 8/2003 | Lin | |
| 2004/0061796 A1 | 4/2004 | Honda et al. | |
| 2004/0224703 A1 | 11/2004 | Takaki et al. | |
| 2005/0035198 A1 | 2/2005 | Wilensky | |
| 2005/0078178 A1 * | 4/2005 | Brown | H04N 7/181 |
| | | | 348/139 |
| 2005/0111723 A1 | 5/2005 | Hannigan et al. | |
| 2005/0163380 A1 | 7/2005 | Wang et al. | |
| 2005/0261573 A1 * | 11/2005 | Satoh | G06K 9/3216 |
| | | | 600/415 |
| 2006/0010030 A1 | 1/2006 | Sorensen | |
| 2006/0023078 A1 | 2/2006 | Schmitt et al. | |
| 2006/0146009 A1 | 7/2006 | Syrbe et al. | |
| 2006/0146174 A1 | 7/2006 | Hagino | |
| 2006/0170781 A1 * | 8/2006 | Sobol | H04N 5/232939 |
| | | | 348/208.4 |
| 2006/0181619 A1 | 8/2006 | Liow et al. | |
| 2007/0071038 A1 | 3/2007 | Mao | |
| 2008/0002893 A1 | 1/2008 | Vincent et al. | |
| 2008/0002914 A1 | 1/2008 | Vincent et al. | |
| 2008/0002916 A1 | 1/2008 | Vincent et al. | |
| 2008/0013801 A1 | 1/2008 | Reed et al. | |
| 2008/0056612 A1 | 3/2008 | Park et al. | |
| 2008/0137906 A1 | 6/2008 | Chang et al. | |
| 2008/0170803 A1 | 7/2008 | Forutanpour | |
| 2008/0180550 A1 | 7/2008 | Gulliksson | |
| 2008/0249867 A1 | 10/2008 | Angell et al. | |
| 2008/0292213 A1 | 11/2008 | Chau | |
| 2008/0306787 A1 | 12/2008 | Hamilton et al. | |
| 2009/0021576 A1 | 1/2009 | Linder et al. | |
| 2009/0063307 A1 | 3/2009 | Groenovelt et al. | |
| 2009/0128644 A1 | 5/2009 | Camp, Jr. et al. | |
| 2009/0147109 A1 | 6/2009 | Muresan | |
| 2009/0192921 A1 | 7/2009 | Hicks | |
| 2009/0284637 A1 | 11/2009 | Parulski et al. | |
| 2009/0316995 A1 * | 12/2009 | Szeliski | G06T 5/003 |
| | | | 382/199 |
| 2010/0214419 A1 | 8/2010 | Kaheel et al. | |
| 2010/0232706 A1 | 9/2010 | Forutanpour | |
| 2010/0260426 A1 | 10/2010 | Huang et al. | |
| 2011/0135206 A1 | 6/2011 | Miura et al. | |
| 2011/0158385 A1 | 6/2011 | Nakatsugawa et al. | |
| 2011/0164866 A1 * | 7/2011 | Kayama | H04N 5/23212 |
| | | | 396/100 |
| 2011/0170669 A1 | 7/2011 | Nakatsugawa et al. | |
| 2011/0229043 A1 | 9/2011 | Kuraki et al. | |
| 2011/0317768 A1 | 12/2011 | Liu et al. | |
| 2012/0070102 A1 | 3/2012 | Yokokawa et al. | |
| 2012/0106844 A1 | 5/2012 | Ramachandrula et al. | |
| 2012/0120283 A1 | 5/2012 | Capata et al. | |
| 2012/0165648 A1 | 6/2012 | Ferrantelli | |
| 2012/0170808 A1 | 7/2012 | Ogata et al. | |
| 2012/0188237 A1 | 7/2012 | Han et al. | |
| 2012/0268652 A1 | 10/2012 | Liu et al. | |
| 2012/0294549 A1 | 11/2012 | Doepke | |
| 2012/0306904 A1 | 12/2012 | Francois et al. | |
| 2012/0307000 A1 | 12/2012 | Doepke et al. | |
| 2013/0035984 A1 | 2/2013 | Davis et al. | |
| 2013/0051524 A1 | 2/2013 | Sato | |
| 2013/0063485 A1 | 3/2013 | Kita | |
| 2013/0129233 A1 | 5/2013 | Schiller et al. | |
| 2013/0141524 A1 | 6/2013 | Karunamuni et al. | |
| 2013/0148862 A1 | 6/2013 | Roach et al. | |
| 2013/0250062 A1 | 9/2013 | Tin | |
| 2013/0308866 A1 * | 11/2013 | Lin | G06K 9/46 |
| | | | 382/195 |
| 2013/0314303 A1 | 11/2013 | Osterhout et al. | |

(56) References Cited

U.S. PATENT DOCUMENTS

| | | |
|---|---|---|
| 2014/0016870 A1 | 1/2014 | Kim et al. |
| 2014/0044338 A1 | 2/2014 | Coleman |
| 2014/0078320 A1 | 3/2014 | Hong |
| 2014/0104458 A1 | 4/2014 | Tanaka |
| 2014/0118483 A1 | 5/2014 | Rapoport et al. |
| 2014/0126811 A1 | 5/2014 | Ihara |
| 2014/0198981 A1 | 7/2014 | Wilson et al. |
| 2014/0226914 A1 | 8/2014 | Mocanu et al. |
| 2014/0267618 A1 | 9/2014 | Esteban et al. |
| 2014/0307288 A1 | 10/2014 | Sakaida |
| 2014/0340394 A1 | 11/2014 | Mattila |
| 2014/0340395 A1 | 11/2014 | Mattila |
| 2014/0355881 A1 | 12/2014 | Bhardwaj et al. |
| 2014/0362248 A1 | 12/2014 | Ishida |
| 2014/0369600 A1 | 12/2014 | Fu et al. |
| 2015/0009520 A1 | 1/2015 | Yamada |
| 2015/0016712 A1 | 1/2015 | Rhoads et al. |
| 2015/0039458 A1 | 2/2015 | Reid |
| 2015/0049946 A1 | 2/2015 | Madineni et al. |
| 2015/0062289 A1 | 3/2015 | Yoo et al. |
| 2015/0085184 A1 | 3/2015 | Vidal et al. |
| 2015/0093033 A1 | 4/2015 | Kwon et al. |
| 2015/0116353 A1 | 4/2015 | Miura et al. |
| 2015/0124047 A1 | 5/2015 | Yatziv et al. |
| 2015/0138399 A1 | 5/2015 | Ma et al. |
| 2015/0139488 A1 | 5/2015 | Dharssi et al. |
| 2015/0213611 A1 | 7/2015 | Dai |
| 2015/0215526 A1 | 7/2015 | Jafarzadeh et al. |
| 2015/0235367 A1 | 8/2015 | Langer et al. |
| 2015/0235379 A1 | 8/2015 | O'Gorman et al. |
| 2015/0254861 A1 | 9/2015 | Chornenky |
| 2015/0287209 A1 | 10/2015 | Zhou et al. |
| 2015/0312442 A1 | 10/2015 | Higashi |
| 2015/0358542 A1 | 12/2015 | Sato |
| 2016/0063686 A1 | 3/2016 | Lou et al. |
| 2016/0094781 A1* | 3/2016 | Ebato ............... H04N 5/23245 348/345 |
| 2016/0150153 A1* | 5/2016 | Sakurabu ......... H04N 5/232122 348/353 |
| 2016/0179137 A1 | 6/2016 | Bendiscioli et al. |
| 2016/0255266 A1 | 9/2016 | Nakagata et al. |
| 2016/0267670 A1 | 9/2016 | Sun et al. |
| 2016/0269628 A1 | 9/2016 | Nihiyama et al. |
| 2016/0295120 A1* | 10/2016 | Ota .................... H04N 5/23219 |
| 2016/0330366 A1 | 11/2016 | Kinoshita |
| 2016/0353018 A1 | 12/2016 | Anderson et al. |
| 2016/0373647 A1 | 12/2016 | Garcia Morate et al. |
| 2017/0011488 A1 | 1/2017 | Cohen et al. |
| 2017/0026574 A1 | 1/2017 | Kwon et al. |
| 2017/0124383 A1 | 5/2017 | Ohbitsu |
| 2017/0163915 A1 | 6/2017 | Naruse et al. |
| 2017/0265725 A1 | 9/2017 | Ichikawa et al. |
| 2017/0357869 A1 | 12/2017 | Shustorovich et al. |
| 2018/0182099 A1 | 6/2018 | Lesniak |
| 2018/0367741 A1 | 12/2018 | Matsumura |

OTHER PUBLICATIONS

Google Maps, "How to create a photo sphere," Jul. 30, 2013, retrieved from [https://www.youtube.com/watch?v=NPs3eliWRaw], 6 pages.

International Searching Authority, "Search Report," issued in connection with PCT Patent Application No. PCT/IB2015/001103, dated Mar. 18, 2016, 5 pages.

International Searching Authority, "Written Opinion," issued in connection with PCT Patent Application No. PCT/IB2015/001103, dated Mar. 18, 2016, 12 pages.

Vanhemert, "Horizon App Solves The Dumbest Thing About Smartphone Video," Jan. 22, 2014, retrieved from [http://www.wired.com/2014/01/camera-app-solves-single-dumbest-thing-spartphone-video/], on May 15, 2015, 9 pages.

Store Eyes, Inc., "The Mobile Capture Unit (MCU)," retrieved from [www.storeeyes.com/Products-p2.html], on Mar. 8, 2011, 6 pages.

Sudobility, "Night Camera," retrieved from [https://itunes.apple.com/app/night-camera/id296186779], on May 12, 2015, 2 pages.

United States Patent and Trademark Office, "Non-final Office Action," issued in connection with U.S. Appl. No. 14/796,813, dated Feb. 21, 2017, 17 pages.

United States Patent and Trademark Office, "Final Office Action," issued in connection with U.S. Appl. No. 14/796,813, dated Jun. 27, 2017, 15 pages.

United States Patent and Trademark Office, "Notice of Allowance," issued in connection with U.S. Appl. No. 14/796,813, dated Oct. 3, 2017, 13 pages.

International Bureau, "International Preliminary Report on Patentability," issued in connection with PCT Patent Application No. PCT/IB2015/001103, dated Dec. 28, 2017, 14 pages.

United States Patent and Trademark Office, "Non-Final Office Action", issued in connection with U.S. Appl. No. 15/871,658, dated Mar. 28, 2018, 7 pages.

United States Patent and Trademark Office, "Notice of Allowance", issued in connection with U.S. Appl. No. 15/871,658, dated Jul. 18, 2018, 18 pages.

United States Patent and Trademark Office, "Non-Final Office Action", issued in connection with U.S. Appl. No. 16/164,201, dated Feb. 15, 2019, 36 pages.

United States Patent and Trademark Office, "Non-Final Office Action", issued in connection with U.S. Appl. No. 16/164,201, dated Jun. 5, 2019, 26 pages.

United States Patent and Trademark Office, "Final Office Action", issued in connection with U.S. Appl. No. 16/164,201, dated Dec. 11, 2019, 41 pages.

United States Patent and Trademark Office, "Advisory Action", issued in connection with U.S. Appl. No. 16/164,201, dated Mar. 3, 2020, 5 pages.

United States Patent and Trademark Office, "Notice of Allowance", issued in connection with U.S. Appl. No. 16/164,201, dated Mar. 30, 2020, 9 pages.

* cited by examiner

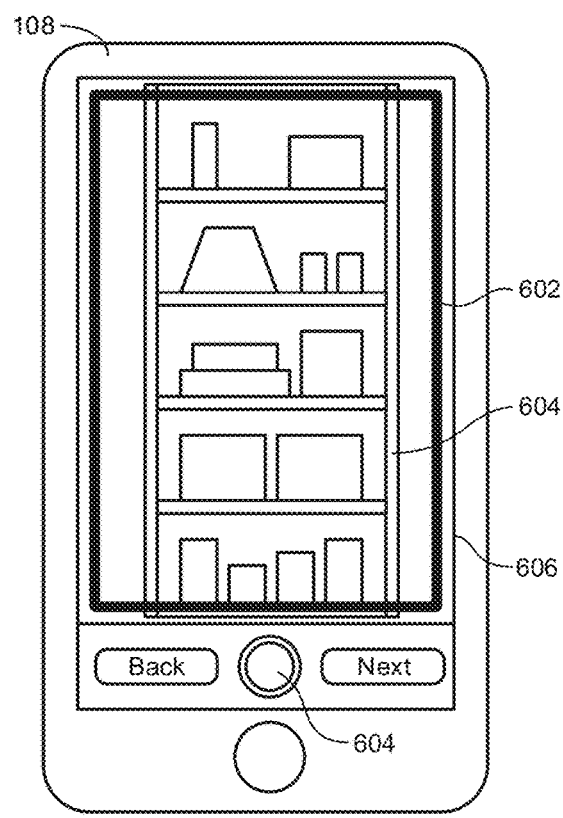 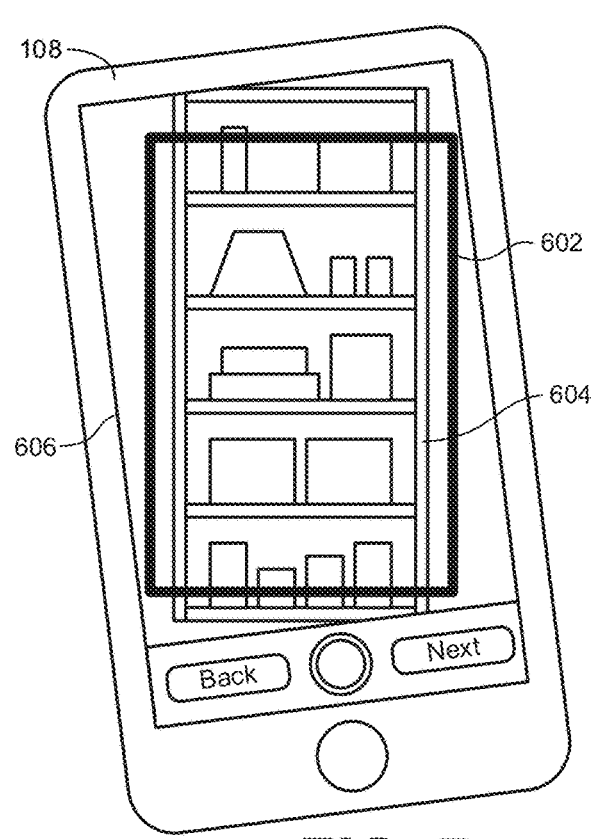 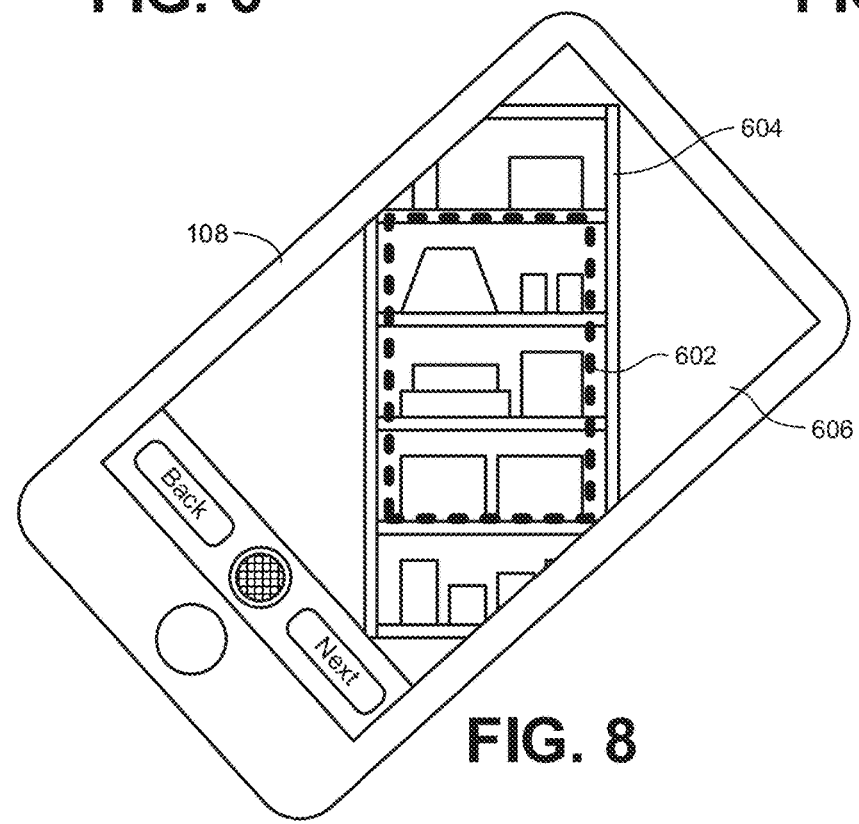
FIG. 6
FIG. 7
FIG. 8

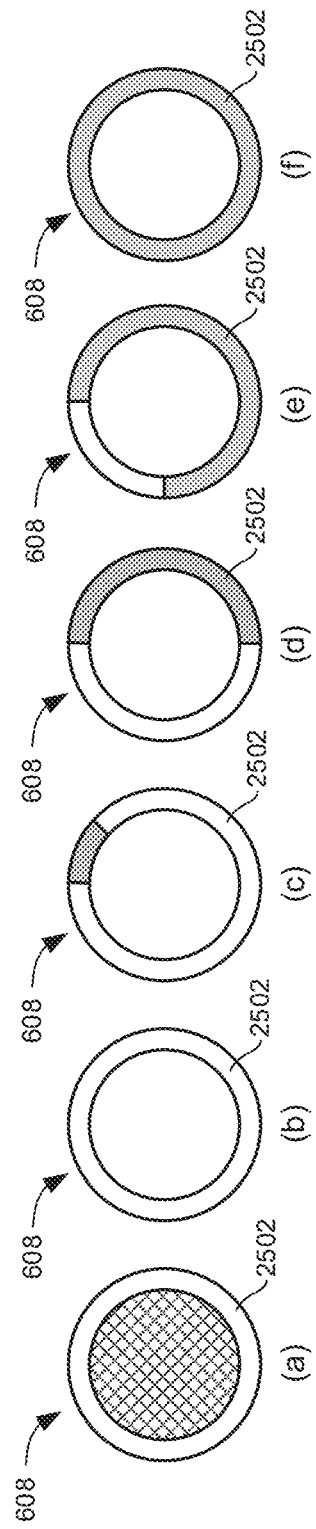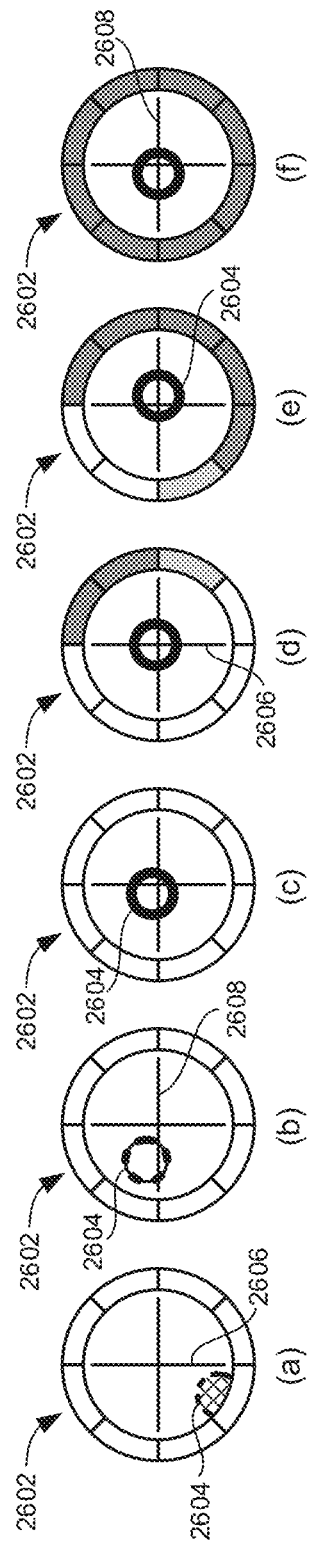
FIG. 25
FIG. 26

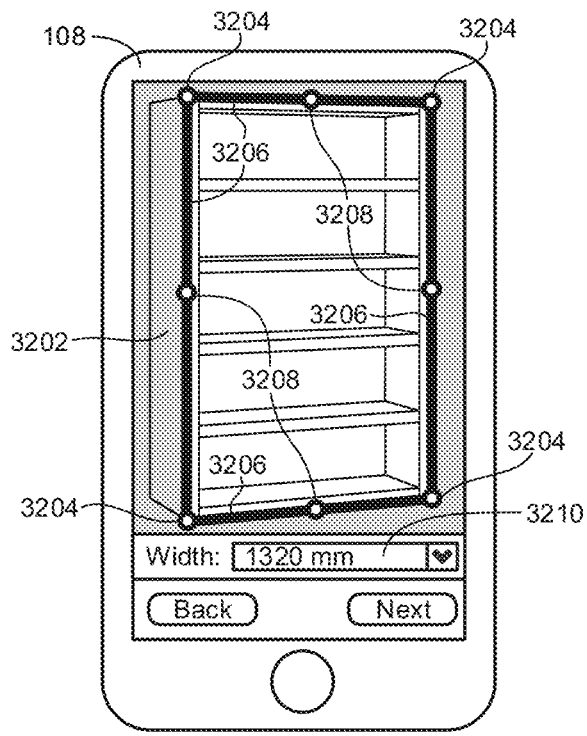
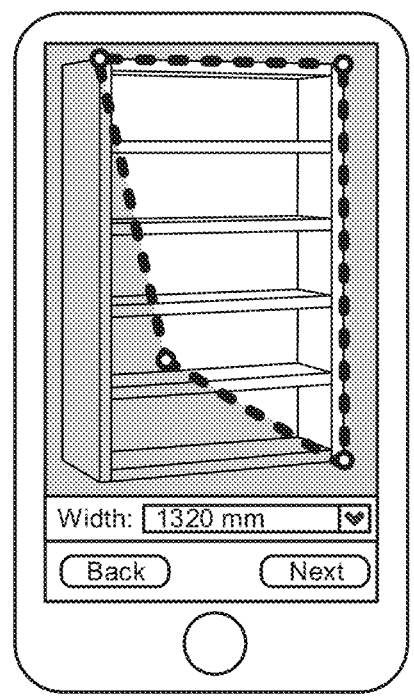
FIG. 32E  FIG. 32F
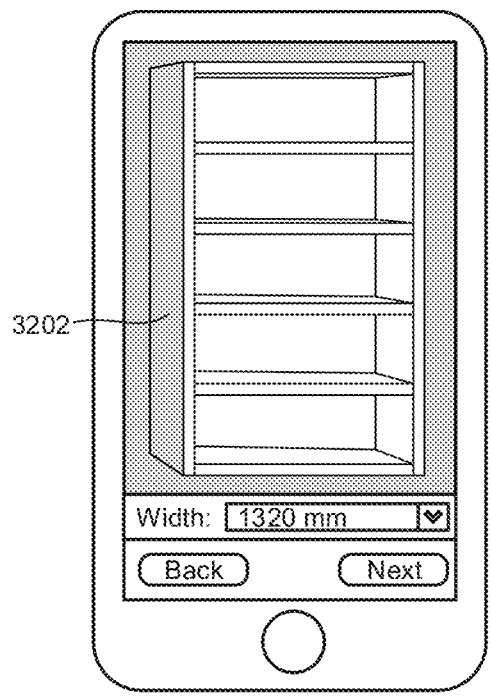
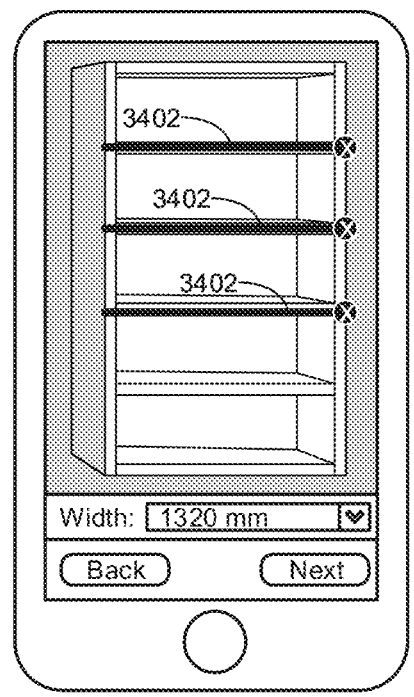
FIG. 33  FIG. 34

METHODS AND APPARATUS TO CAPTURE PHOTOGRAPHS USING MOBILE DEVICES

RELATED APPLICATION

This patent arises from a continuation of U.S. patent application Ser. No. 16/164,201 (now U.S. Pat. No. 10,735,645), which was filed on Oct. 18, 2018 as a divisional of U.S. patent application Ser. No. 15/871,658 (now U.S. Pat. No. 10,136,052), which was filed on Jan. 15, 2018 as a continuation of U.S. patent application Ser. No. 14/796,813 (now U.S. Pat. No. 9,906,712), which was filed on Jul. 10, 2015 as a continuation of International Application No. PCT/IB2015/001103, which was filed on Jun. 18, 2015. U.S. patent application Ser. No. 16/164,201, U.S. patent application Ser. No. 15/871,658, U.S. patent application Ser. No. 14/796,813, and International Application No. PCT/IB2015/001103 are hereby incorporated herein by reference in their entireties.

FIELD OF THE DISCLOSURE

This disclosure relates generally to image recognition, and, more particularly, to methods and apparatus to capture photographs using mobile devices.

BACKGROUND

Image recognition involves computer-aided techniques to analyze pictures or photographs to determine and/or identify the content of the captured scene (e.g., the recognition of the general subject matter of the scene and/or the recognition of individual objects within the scene). Such techniques are useful in many different applications in many different industries. For example, retail establishments, product manufacturers, and other business establishments may take advantage of image recognition techniques of photographs of such establishments (e.g., pictures of product shelving) to identify quantities and/or types of products in inventory, to identify shelves that need to be restocked and/or the frequency with which products need restocking, to recognize and read product barcodes, to assess product arrangements and displays, etc.

BRIEF DESCRIPTION OF THE DRAWINGS

FIGS. 6-11 illustrate example capture information displayed via the example mobile device of FIG. 1 to assist a user in capturing a photograph.

FIGS. 25 and 26 illustrate other example capture information to assist a user in capturing a photograph.

FIGS. 32A-F illustrate an example graphical user interface to enable a user to define a region of interest within a photograph.

FIG. 33 illustrates the example photograph of FIGS. 32A-F corrected for perspective.

FIG. 34 illustrates an example graphical user interface to enable a user to define segments of the region of interest defined in FIGS. 32A-F.

DETAILED DESCRIPTION

Figure 1:
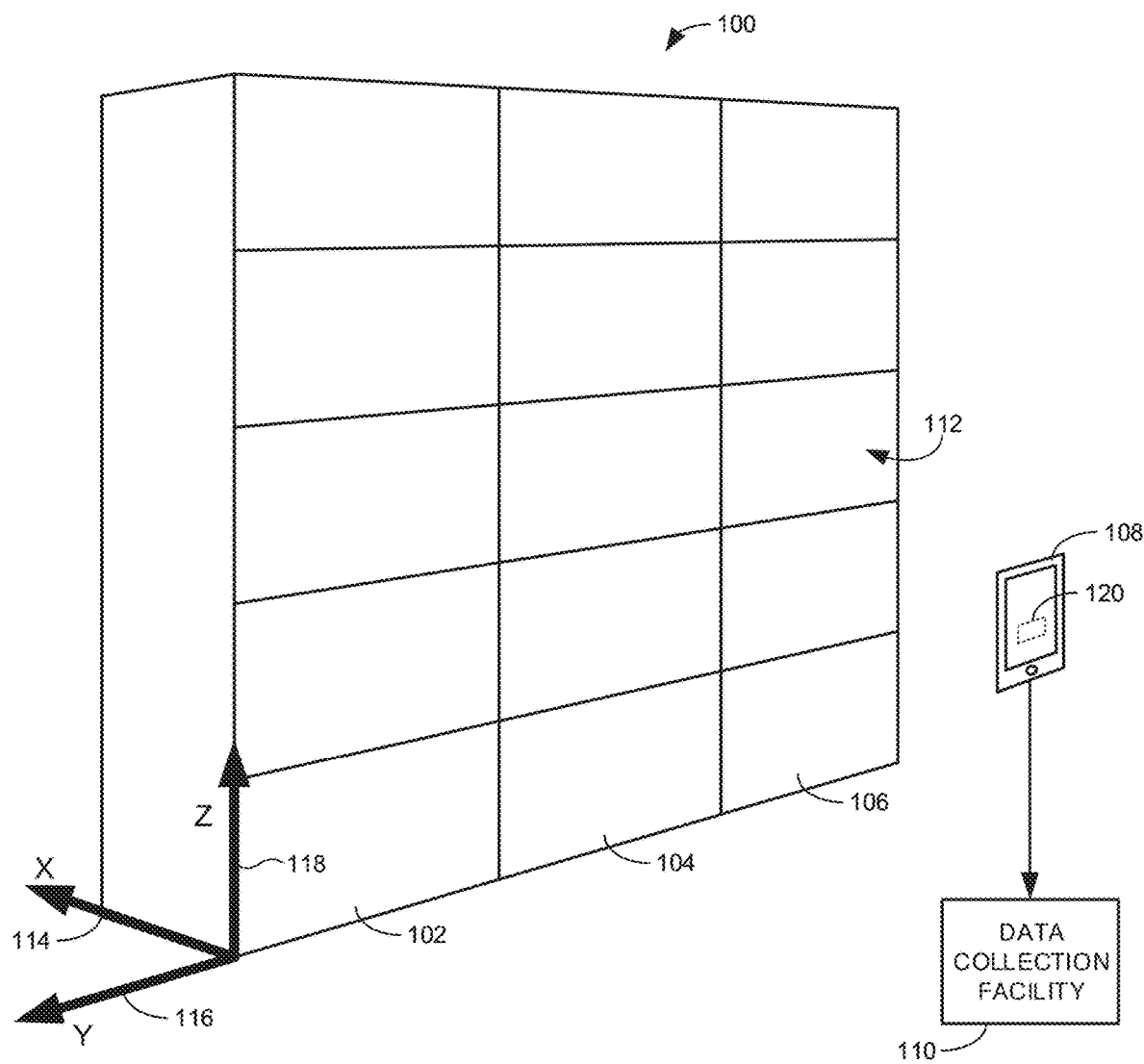
FIG. 1 illustrates an example environment in which the teachings disclosed herein may be implemented.

While there are many different image recognition techniques to analyze an image, the accuracy of such techniques depends upon the quality of the images being analyzed. There are many factors that may play a role in the quality of pictures for effective image recognition including, for example: (1) resolution (image quality typically increases as resolution increases), (2) sharpness (high quality images typically include little or no blurriness), (3) perspective (image quality typically increases the more directly the camera is facing the scene of interest straight on rather than at an angle), (4) orientation (image quality typically increases when the camera is rotated upright to correspond with the orientation of the scene of interest), (5) framing (image quality typically increases when the photographed scene to be analyzed is the central focus of the picture and extraneous material is excluded), and (6) coverage (image quality typically increases when the image captures the entire scene of interest). Sometimes it is not possible to capture an entire scene of interest in a single shot. Accordingly, multiple pictures may need to be taken and stitched or spliced together to make a complete image of the scene. In such examples, the quality of the final image also depends upon the accuracy or quality of the stitching of the individual shots.

Frequently, individuals taking pictures may not be aware of all the factors that go into capturing a high quality image for image recognition analysis and/or may inadvertently do things when taking a picture that can negatively impact the resulting quality of the image. For example, individuals may fail to steady the camera while taking a picture resulting in blurriness. In some examples, individuals may preview the image but, due to the small display screens, nevertheless fail to recognize that the image is blurry. Individuals may fail to properly orient the scene of interest within the field of view of the camera (e.g., fail to hold the camera in an upright position). Individuals may fail to capture the whole scene of interest. In some instances, when individuals take multiple shots to be stitched together, they may inadvertently change the angle of the camera relative to the scene of interest thereby reducing the quality of a subsequent stitching of the shots. These and other factors may reduce the quality of photographs that could otherwise be achieved resulting in lower recognition rates of objects within the captured images during image recognition post-processing. Likewise, lower quality images increase the likelihood of false positives (incorrectly recognizing an object) during image recognition post-processing. As a result, bad or low quality images causes inefficiencies by bloating the post-processing system with useless data. Furthermore, bad or low quality images can generate the need of an individual to return to the location of the photographed scene of interest to retake pictures resulting in additional waste of time and resources.

Examples disclosed herein take advantage of the processing resources and sensors incorporated in modern mobile devices that also include a camera (e.g., smartphones, tablets, etc.) to provide feedback to a user that assists the user in capturing high quality images. More particularly, the examples disclosed herein provide guidance to users taking photographs in substantially real-time to reduce the likelihood of certain errors that may arise when users are left to take pictures manually without such guidance. This includes guiding a user when taking a single shot, as well as when taking multiple shots to be stitched together. In some examples, visual feedback (e.g., guidelines and/or other widgets on a user interface of the mobile device) is provided to assist user in positioning the camera at an acceptable orientation and ensuring that the mobile device is sufficiently still to increase the likelihood of high quality photos being taken. Additionally, in some examples, non-visual feedback (e.g., sound, vibration, etc.) is provided to a user to assist in positioning the camera device to increase the likelihood of a high quality photograph. In some examples, feedback to guide a user is based on sensor data from one or more sensors associated with a mobile device (e.g., gyroscope, accelerometer, magnetic field sensor, vibration sensor, etc.). In some examples, the sensor data include orientation data indicative of an orientation of the mobile device (e.g., angle of rotation relative to the three axes in three-dimensional Euclidean space). In some examples, the sensor data include movement data indicative of the amount of motion or movement of the mobile device.

Additionally, in some examples, a processor within the mobile device is used to analyze captured photographs as soon as they are taken for image quality metrics such as perspective and/or blurriness to automatically detect pictures that are low quality (e.g., one or more of the metrics fail to satisfy one or more corresponding quality thresholds). In some such examples, the picture may be rejected and the user is immediately asked to retake the shot to replace the first shot determined to be of insufficient quality. This on-device analysis results in less processing by backend servers because fewer poor quality photographs will be collected for analysis and reduces (e.g., avoids) the need for the user to return to the location after the fact to retake a shot because it is later discovered a photograph was not of an acceptable quality.

Further, examples disclosed herein enable users to define or demarcate the region of interest within a photographed scene to ensure that the desired scene of interest is fully captured and is the focus of the image to be analyzed via image recognition. Additionally, in some examples, once a user has defined the scene of interest in a captured photograph, the mobile device may conduct post-processing on the image to correct for perspective (e.g., perspective that was insufficient to require retaking the shot but could be improved). Further, in some examples, a user may demarcate individual segments within the region of interest (e.g., individual shelves on a shelving module) to facilitate the subsequent analysis of the image.

FIG. 1 illustrates an example scene 100 within a retail establishment to be photographed corresponding to a row of shelving units or modules 102, 104, 106. In the illustrated example, a mobile device 108 is used to capture photographs of the scene 100 that may then be sent to a data collection facility 110. In some examples, the data collection facility 110 may be associated with a business operating the retail establishment where the scene 100 is located. In other examples, the data collection facility 110 may be associated with a third party entity that provides image recognition analytical services.

In some examples, each shelving module 102, 104, 106 corresponds to a separate region of interest to be the focus of separate images. In some examples, each shelving module 102, 104, 106 is captured in a single photograph. In other examples, multiple photographs are taken and stitched together to generate a complete image of each of the shelving modules 102, 104 106. In some examples, more than one of the shelving modules 102, 104, 106 may be defined as a region of interest to be captured within a single image (corresponding to a single photograph or a group of stitched photographs). Additionally or alternatively, in some examples, only a portion of one of the modules 102, 104, 106 is defined as a region of interest to be captured within an image sent to the data collection facility 110 for subsequent processing.

In the illustrated example, the shelving modules 102, 104, 106 define a front facing plane 112. For purposes of explanation, FIG. 1 shows an X, Y, and Z axes 114, 116, 118. The X axis 114 extends in a horizontal direction perpendicular to the front face (e.g., the plane 112) of the shelving modules 102, 104, 106. The Y axis 116 extends in a horizontal direction parallel with the front face of the shelving modules 102, 104, 106. The Z axis 118 extends in a vertical direction (parallel to the front face of the shelving modules 102, 104, 106). In some examples, to increase the likelihood of capturing high quality photographs, it is desirable to position the mobile device in an upright position (e.g., vertically aligned with the Z axis 118 when rotated about the X axis 114) and directly facing front facing plane 112 (e.g., the camera is aimed in the direction of the X axis 114 such that the mobile device 108 is parallel to the Y and Z axes 116, 118).

In some examples, the orientation of the mobile device relative to the X, Y, and Z axes 114, 116, 118 may be determined based on feedback from motion and position sensors in the mobile device 108. For example, an accelerometer and/or a gyroscope may be used to detect the rotation of the mobile device about either of the X or Y axes 114, 116. Further, a compass or magnetic field detector may determine the rotation of the mobile device about the Z axis 118. In some examples, rotation about the X or Y axes 114, 116 is determined relative to the direction of gravity (i.e., a vertical direction). Thus, in the illustrated examples, where the scene to be photograph includes a subject with a known orientation (e.g., vertically oriented shelves aligned with the vertical direction of gravity), the orientation of the mobile device 108 can be determined relative to the subject to be photographed (e.g., relative to the plane 112 of the shelving modules 102, 104, 106). The examples described herein assume the scene has a front facing plane that is vertically oriented (as with shelving modules). However, this is for purposes of explanation only. The teachings disclosed herein may be adapted to other applications with different known orientations of scene containing different subject matter. For example, the teachings disclosed herein may be applied to optical character recognition of documents assumed to be in a horizontal plane on a desk or table. In other examples, the orientation of the scene to be photographed may not be known and/or no assumptions about the orientation of a scene are made.

As described above, for purposes of explanation, it will be assumed that the plane of a scene to be photographed is vertical and corresponds to the front facing plane of a shelving module. With such an assumption, the tilt of the mobile device 108 to the left or right, when facing device (i.e., rotation about the X axis 114), relative to the upright (vertical) shelves can be determined. Likewise, the inclination of the mobile device 108 forward or backwards (i.e., aiming the camera of the device up or downwards via rotation about the Y axis 116), relative to the upright (vertical) shelves can also be determined. In some examples, the mobile device 108 is provided with a photograph capturing module 120 that monitors the orientation of the mobile device 108 about the X and Y axes 114, 116 relative to the shelving modules 102, 104, 106 to ensure the mobile device 108 is approximately aligned with the modules (i.e., is in an upright position). In some such examples, as described more fully below, the photograph capturing module 120 provides visual and/or non-visual feedback to the user to guide the user in positioning and/or orienting the mobile device 108. In some examples, if a user is holding the mobile device at an angle relative to the vertical Z axis 118 that exceeds a threshold, the photograph capturing module 120 prevents the user from taking a photograph (e.g., by disabling the photograph capturing functionality) until the misorientation of the device is corrected.

While shelving modules are typically vertically oriented, they may be positioned in any geographic (compass) direction. As such, the rotation of the mobile device 108 to the left or right (i.e., rotation about the Z axis), relative to any particular shelving unit, cannot typically be determined as with rotation about the other axes because there is no direction of the shelves that can be assumed for reference. Of course, if the direction of a particular shelving module is known (can be assumed) then the relative position of the mobile device 108 to the shelving module about the Z axis 118 may also be determined. In some examples, a user may specify the compass direction of the shelving modules and/or place the mobile device 108 against a face a module to measure the direction of the module before taking a picture. In some examples, real-time object recognition of a shelving module within the field of view of the camera is implemented to determine the compass direction of the mobile device 108 relative to the shelving module.

In other examples, no particular assumptions are made about the direction the shelving modules 102, 104, 106 are facing. Rather, in some examples, the user is assumed to be aiming the camera of the mobile device 108 in the general direction of the shelving unit to be photographed. In some such examples, the user may not position the mobile device 108 exactly facing the scene such that a captured photograph will be less than ideal (e.g., the photograph may exhibit more perspective than it would otherwise if the mobile device were directly facing the shelves). Without assuming the facing direction of shelves, the photograph capturing module 120 cannot provide feedback to a user to correct such misorientations. However, as described more fully below, in some such examples, the photograph capturing module 120 analyzes photographs immediately after they are taken to detect pictures in which the mobile device 108 may be aimed in a direction at too much of an angle (about the vertical Z axis 118) relative to the front facing plane 112 of the shelving modules 102, 104, 106. In some examples, the photograph capturing module 120 detected photographs taken at an angle based on an amount of perspective in the photograph. If the amount of perspective exceeds a threshold, the photograph capturing module 120 may reject the photograph and prompt the user to retake the shot. Thus, while the rotation of a mobile device 108 about the Z axis 118 relative to the shelving modules 102, 104, 106 may not be known, poor alignment of the mobile device 108 with the front face 112 of the modules 102, 104, 106 may nevertheless be detected to reduce the likelihood of the user capturing a poor quality image that cannot be reliably analyzed using image recognition techniques.

In addition to providing real-time feedback to guide users in orienting the mobile device 108 before a picture is taken, in some examples, the photograph capturing module 120 provides additional feedback to the user both based on monitored sensor data and post-processing of captured images. For example, the photograph capturing module 120 also monitors the movement of the mobile device 108 to ensure the mobile device is sufficiently still before a photograph is taken to reduce the likelihood of blurriness. Furthermore, in some examples, the photograph capturing module 120 may analyze captured images for blurriness and prompt the user to retake a shot if the amount of blurriness exceeds a threshold. Additionally or alternatively, in some examples, the photograph capturing module 120 provides guidance to the user in collecting multiple shots to be stitched together into one complete image of the scene. Further, in some examples, the photograph capturing module 120 stores the orientation of the mobile device 108 at the time each shot is taken to then use this information to generate projective or geometric transformations of the shots (homography) when they are being stitched together. These and other aspects of the photograph capturing module 120 are described in the following description.

Figure 2:
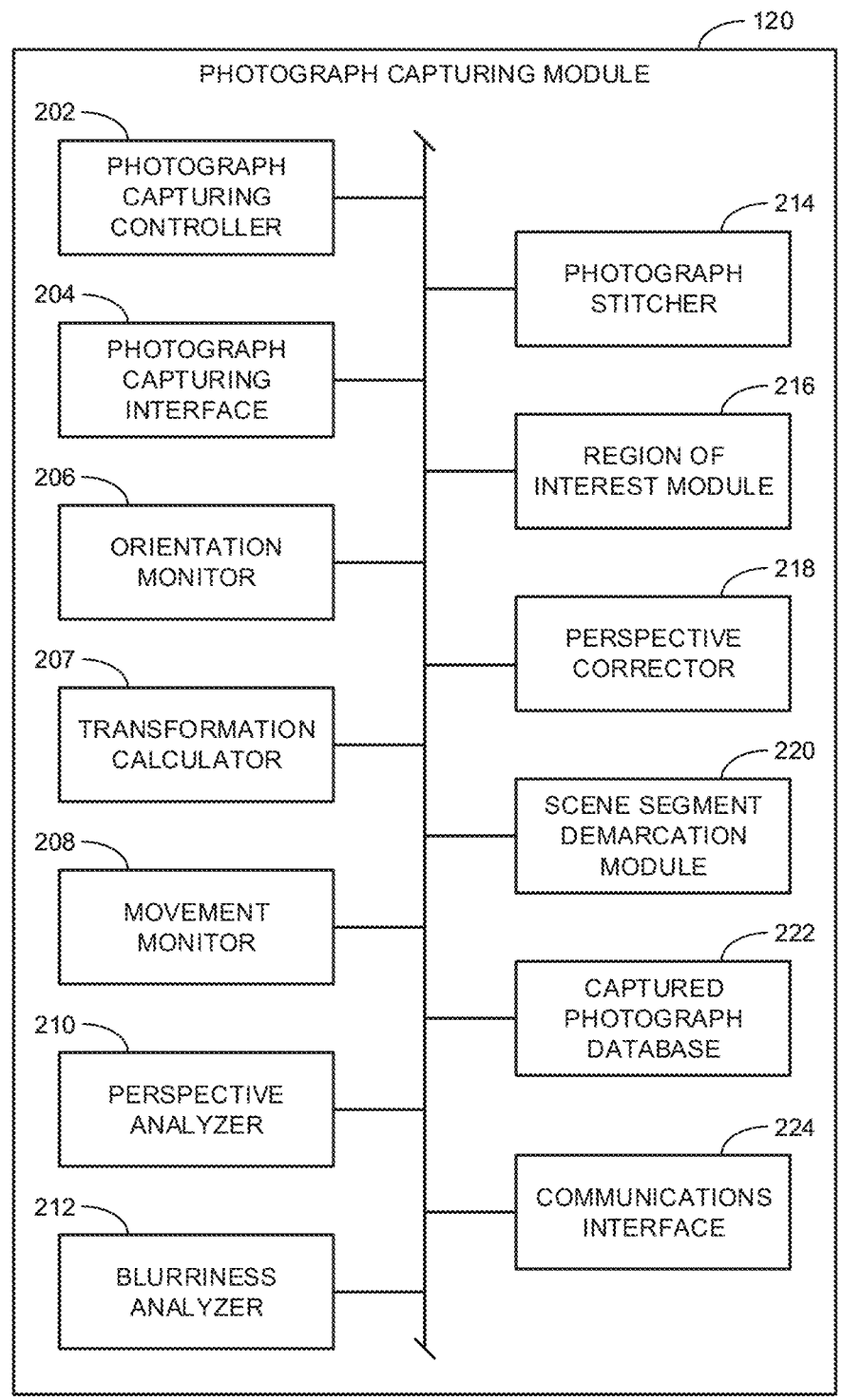
FIG. 2 illustrates an example manner of implementing the example photograph capturing module of FIG. 1.

FIG. 2 illustrates an example implementation of the example photograph capturing module 120 of FIG. 1. In the illustrated example, the photograph capturing module 120 includes an example photograph capturing controller 202, an example photograph capturing interface 204, an example orientation monitor 206, an example transformation calculator 207, an example movement monitor 208, an example perspective analyzer 210, an example blurriness analyzer 212, an example photograph stitcher 214, an example region of interest module 216, an example perspective corrector 218, an example scene segment demarcation module 220, an example captured photograph database 222, and an example communications interface 224.

The example photograph capturing controller 202 of the illustrated example is provided to control various operations of the example photograph capturing module 120. In some examples, the photograph capturing controller 202 communicates instructions and/or commands to other portions of the example photograph capturing module 120 to control the operations of those portions.

The example photograph capturing interface 204 of the illustrated example is provided to generate graphical elements for a user interface rendered via a display of the mobile device 108. In some examples, the graphical elements include capture information that provides visual cues, indicators, and/or guides to assist a user in taking a quality photograph. In some examples, the capture information is overlaid or superimposed onto an image of the current field of view of the camera. As such, a user can see what the camera of the mobile device 108 is aimed at while adjusting the camera based on feedback indicated by the capture information.

In some examples, the capture information includes orientation lines or guides to indicate the orientation of the mobile device 108 relative to a plane of the scene being photographed. As described above, in the illustrated examples, the plane of the scene is assumed to be a vertical plane corresponding to a front face of a shelving module (e.g., the front facing plane 112 of the shelving modules 102, 104, 106 of FIG. 1).

In some examples, the photograph capturing interface 204 presents or renders graphical orientation guides based on orientation data collected from position sensors (a magnetometer, a gyroscope, an accelerometer, etc.) of the mobile device 108 by the orientation monitor 206 of the photograph capturing module 120. In particular, the example orientation monitor 206 tracks and/or monitors the orientation and/or position of the mobile device 108 including the amount of tilt (e.g., rotation about the X axis 114), angle of inclination (e.g., rotation about the Y-axis 116), and geographic direction (e.g., compass direction) of the mobile device (e.g., rotation about the Z axis 118). In some examples, the orientation monitor 206 compares the orientation data values provided by sensors of the mobile device 108 to reference values defining a target or reference orientation for the mobile device 108. In some examples, the orientation guides presented by the photograph capturing interface 204 provide a visual indication of the amount and/or nature of deviation of an orientation of the mobile device 108 relative to the reference orientation. In some examples, the reference orientation is defined based on an assumed and/or measured orientation of the front facing plane of the scene being photographed (e.g., a vertically upright plane for shelving modules). In some examples, the reference orientation is defined by orientation data collected from the sensors of the mobile device 108 at a particular point in time. For instance, in some examples where multiple shots are to be taken and stitched together, the reference orientation for the second and subsequent shots corresponds to the orientation of the mobile device 108 when the first shot was taken.

Example orientation guides 602 are shown in FIGS. 6-11. In particular, FIG. 6 shows the mobile device 108 aimed at a shelving module 604 such that the module 604 is within the field of view of the camera on the mobile device 108. As such, an image of the shelving module 604 appears within a display screen 606 of the mobile device 108. The shelving module 604 may be the same as, similar to, or different than the shelving modules 102, 104, 106 of FIG. 1. As shown in the illustrated example, the orientation guide 602 is a rectangle superimposed on the image in the shelving module 604 shown in the display screen 606. As shown in the illustrated examples of FIGS. 6-8, as the mobile device rotates about an axis perpendicular to the display screen (e.g., the X axis 114 in FIG. 1), the rectangle remains vertically oriented to indicate the reference orientation corresponding to the plane of the scene (e.g., the front face of the shelving module 604). As shown in the illustrated examples, the rectangle of the orientation guide 602 varies in size depending on the angle of rotation of the mobile device 108 to fully fit within display screen 606 of the mobile device 108 while remaining in a vertical orientation corresponding to the orientation of the shelving module 604 (i.e., the assumed reference orientation of the illustrated example). Presenting the orientation guide 602 in this manner, provides visual feedback to a user that can assist the user in properly rotating the mobile device 108 to an upright position (i.e., the reference orientation) by orienting the device such that the orientation guide substantially follows the perimeter of the display screen 606.

In some examples, when the mobile device 108 is upright (FIG. 6) or within a threshold angle of an upright position (e.g., FIG. 7), the photograph capturing interface 204 may present the orientation guide 602 with a first appearance (e.g., in green) to indicate that the position or orientation of the device is acceptable to take a picture. However, if the angle of rotation exceeds the threshold (e.g., FIG. 8), the photograph capturing interface 204 may present the orientation guide 602 with a different appearance (e.g., in red) to indicate the orientation of the mobile device is not acceptable. For purposes of clarity, in the illustrated example, the orientation guide 602 is shown in a thick solid line (e.g., representing the color green) when the mobile device 108 is in an acceptable orientation (e.g., within a threshold amount of deviation from the reference orientation) and is shown in a thick dashed line (e.g., representing the color red) when the mobile device 108 is in an unacceptable orientation. In some examples, the amount of tilt or rotation of the mobile device 108 about the X axis 114 before the orientation is deemed unacceptable depends upon the designated orientation threshold. In some examples, the threshold is defined between 20 and 30 degrees, but other angles greater or smaller than these may alternatively be implemented.

While the appearance of the orientation guide may change color (e.g., between green and red), in some examples, the orientation guide 602 may change in other ways and/or other graphical indicators may be provided to indicate when the orientation is acceptable or not. For example, in the illustrated example, the photograph capturing interface 204 may include a capture widget or button 608 that a user taps to take a picture. In some examples, the capture button 608 changes appearance (e.g., color) based on whether the orientation of the mobile device 108 is within the set limits of alignment with the reference orientation. (e.g., a green color (indicated by solid coloring) when the orientation is acceptable and a red color (indicated by cross-hatching) when the orientation is unacceptable). In some examples, when the orientation of the mobile device 108 is outside of a corresponding threshold, the picture taking functionality of the mobile device 108 may be disabled by, for example, disabling the capture button 608. Thus, in some examples, the change in appearance of the capture button 608 may not only indicate the mobile device 108 needs to be reoriented to improve the likelihood of capturing a high quality photograph but may also indicate that a user cannot capture a photograph until the orientation of the mobile device has been corrected to within the tolerable limits.

Figure 9:
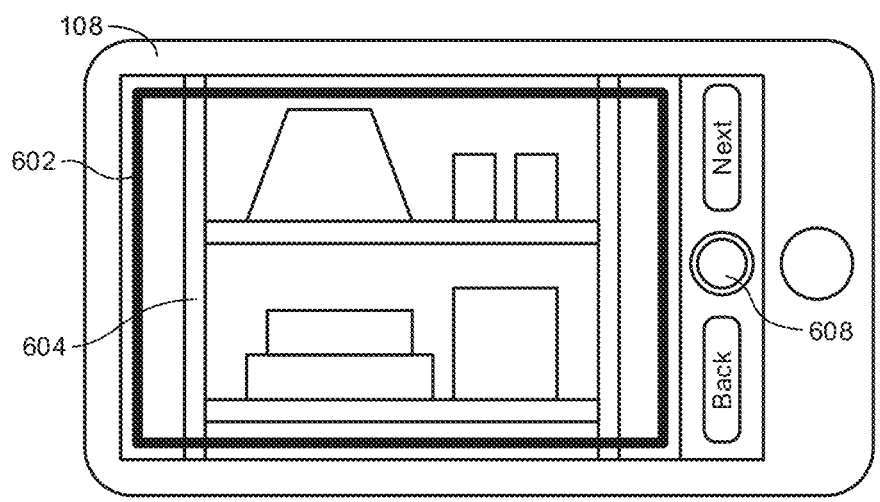
Figure 10:
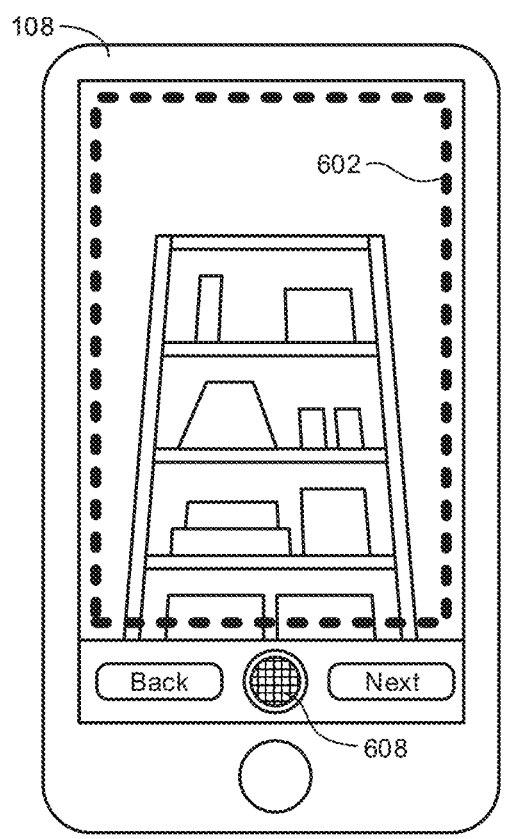

In some examples, where the subject to be photographed is vertical shelving (or other vertically oriented object), the mobile device 108 is locked into portrait mode such that the longer dimension of a captured photograph correspond to height direction of the shelves as in FIG. 7. In some example, due to space constraints (e.g., narrow aisles in a retail establishment), it may not be possible to capture the entire shelving module 604 in a single shot oriented in the portrait mode. Accordingly, in some examples, a user may rotate the mobile device 108 90 degrees in landscape mode (as in FIG. 9) to take a picture of a portion of the shelving module 604 from a closer distance. In some such, examples, multiple shots of different portions of the shelving module 604 may be captured and subsequently stitched together to generate a complete image of the shelving module 604. Thus, in some examples, a user may take photos in either portrait mode (FIG. 7) or landscape mode (FIG. 9). As such, in some example, although the mobile device 108 is rotated 90 degrees between FIGS. 7 and 9, both orientations may be deemed to be in an upright position that is aligned with the shelving module 604 (assumed to be in a vertical orientation).

Figure 11:
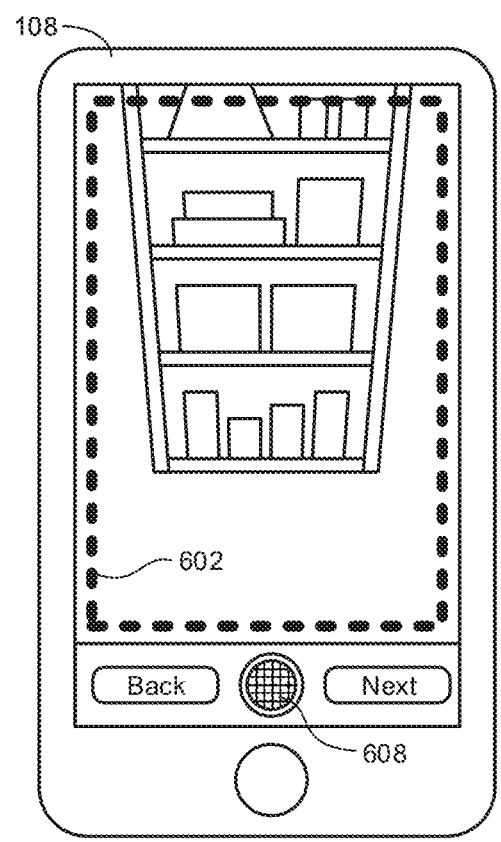
Figure 12:
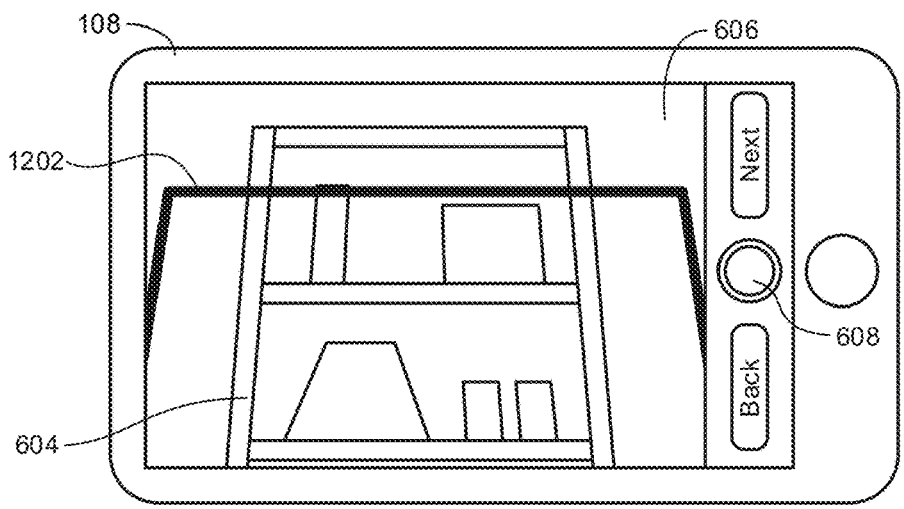
FIGS. 12-14 illustrate other example capture information displayed via the example mobile device of FIG. 1 to assist a user in capturing a photograph.

In addition to providing guidance to users regarding rotation about the X axis 114 that is perpendicular to display screen of the mobile device 108 (and perpendicular to the plane of the front face of the shelving module 604), the orientation guide 602 may also provide feedback on the inclination of the mobile device forwards or backwards (i.e., rotation about the Y axis 116 that extends horizontally parallel to the display screen). As with the rotation about the X axis 114 described above, if the mobile device 108 is inclined backwards such that the camera is directed upward (e.g., aimed at an upward angle as represented in FIG. 11) and the angle of inclination from a vertical (upright) position exceeds a threshold, the orientation guide 602 will change appearance (e.g., turn red as indicated by the dashed lines in the illustrated example) to indicate the orientation of the mobile device 108 needs to be corrected. Similarly, if the mobile device is inclined forwards such that the camera is directed downward (e.g., aimed at an downward angle as represented in FIG. 12) and the angle of inclination from a vertical (upright) position exceeds a threshold, the orientation guide 602 will change appearance (e.g., turn red) to indicate the orientation of the mobile device needs to be corrected. The threshold defining acceptable angles of inclination for the mobile device 108 (i.e., rotation about the Y axis 116) may be the same as or different than the threshold defining acceptable angles of rotation for the mobile device 108 (i.e., rotation about the X axis 114).

Figure 13:
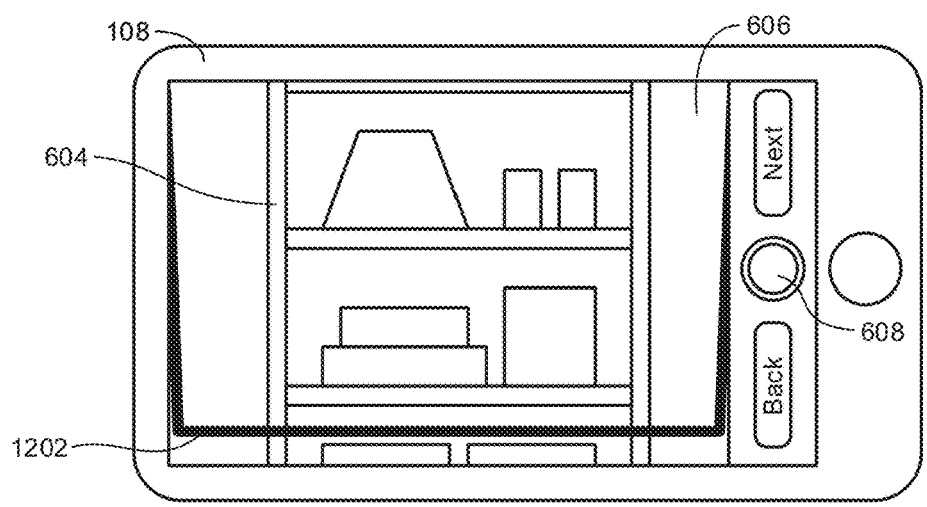
Figure 14:
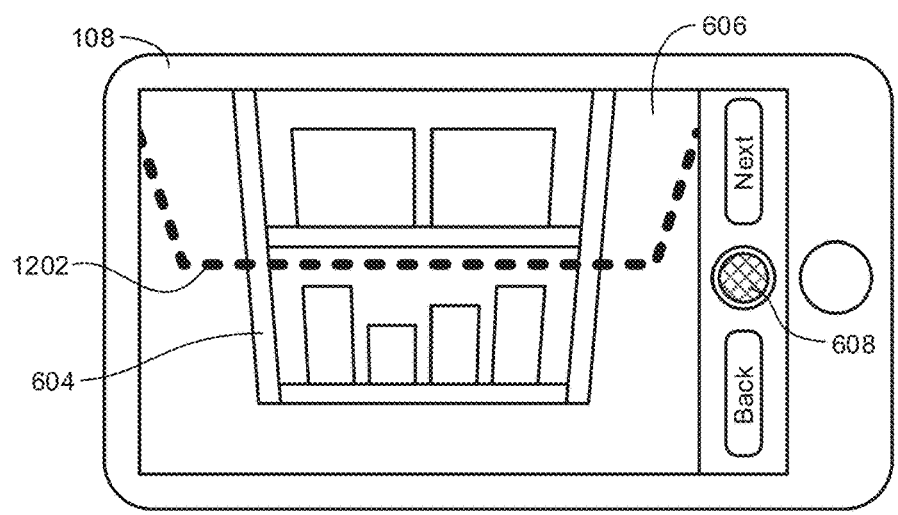

FIGS. 12-14 illustrate another example orientation guide 1202 that may be presented to provide feedback to a user regarding the orientation of the mobile device 108 relative to a vertical plane. Unlike the orientation guide 602 of FIGS. 6-11 that is provided as a rectangle fully contained within the display screen, the orientation guide 1202 of FIGS. 12-14 represent a rectangle that has been mathematically transformed based upon the orientation of the mobile device 108 to appear orthogonally aligned with the front plane of the shelving module 604. More particularly, the rectangular shape is transformed to a non-rectangular quadrilateral (e.g., a trapezoid-like shape) to account for perspective that may appear due to the angle of inclination of the mobile device 108 (e.g., rotation about the Y axis 116). That is, when the mobile device is inclined backwards such that the camera is aimed upwards toward the top of the shelving module 604, the top of the shelving module 604 appear smaller and more narrow than lower portions of the shelving module 604 (as represented in FIG. 12) due to perspective because the top portion is farther away. Accordingly, in the illustrated example of FIG. 12, the orientation guide 1202 represents a rectangle or box superimposed on the image of the shelving module 604 that has been geometrically transformed (e.g., distorted) with a narrower upper edge to approximate the effect of perspective caused by the angle of inclination of the mobile device 108. Similarly, when the mobile device is inclined forward such that the camera is aimed downward toward the bottom of the shelving module 604 (as represented in FIG. 14), perspective causes the bottom of the shelving module 604 to appear smaller and more narrow than upper portions. In such examples, the orientation guide 1202 is transformed accordingly with a narrower bottom edge. In some examples, the particular transformation is determined by the example transformation calculator 207 of the photograph capturing module 120 shown in FIG. 2.

While the orientation guide 1202 corresponds to a box that has been transformed to be orthogonal to the front facing plane of the shelving module 604, when the mobile device 108 is exactly aligned with the shelving module 604, the orientation guide 1202 will appear rectangular and correspond to the outer perimeter of the display screen 606. That is, in some examples, the size of the rectangle represented by the orientation guide 1202 corresponds to the size of the field of view of the camera of the mobile device 108. In some examples, the amount of distortion of the box represented by the orientation guide 1202 corresponds to the amount of deviation of the mobile device 108 from the reference orientation corresponding to an upright position. Thus, the orientation guide 1202 in FIG. 13 is nearly rectangular and nearly corresponds to the perimeter of the display screen 606 because the mobile device 108 is nearly upright (inclined slightly downward in the illustrated example). By contrast, the orientation guide 1202 in FIG. 12 is more distorted because the mobile device 108 is angled or inclined upward a greater extent but still within acceptable limits as indicated by the solid line. Further, the distortion of the orientation guide 1202 in FIG. 14 is even more pronounced because the mobile device 108 is inclined downward an even greater extent (even beyond the threshold limit as indicated by the dashed lines and hashed capture button 608).

Additionally or alternatively, in some examples, the amount of the box represented by the orientation guide 1202 that is visible on the screen 606 varies with the inclination of the mobile device 108. Thus, as shown in the illustrated example, the box in FIG. 13 nearly fills the display screen 606 whereas the box in FIG. 14 includes a relatively small portion of the display screen 606.

The illustrated example of FIGS. 12-14 is described with respect to changes in the inclination of the mobile device 108 (e.g., rotation about the Y axis 116 described in FIG. 1). In some examples, rotation of the mobile device 108 about the X axis 114 will cause the orientation guide 1202 to rotate in a similar manner as shown in FIGS. 7 and 8 such that the orientation guide 1202 remains substantially vertically oriented in alignment with the reference orientation. Additionally, in some examples, where the facing direction of the shelving module 604 is known or defined, turning the mobile to the left or right (i.e., rotation about the Z axis 118) may also cause the orientation guide 1202 to become distorted to account for horizontal perspective.

Figure 15:
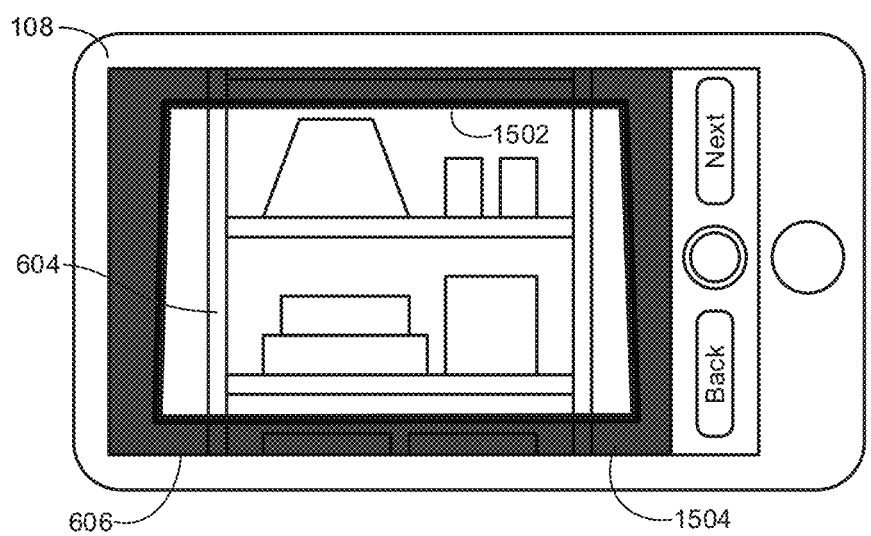
FIGS. 15-23 illustrate other example capture information displayed via the example mobile device of FIG. 1 to assist a user in capturing multiple photographs to be stitched together.
Figure 16:
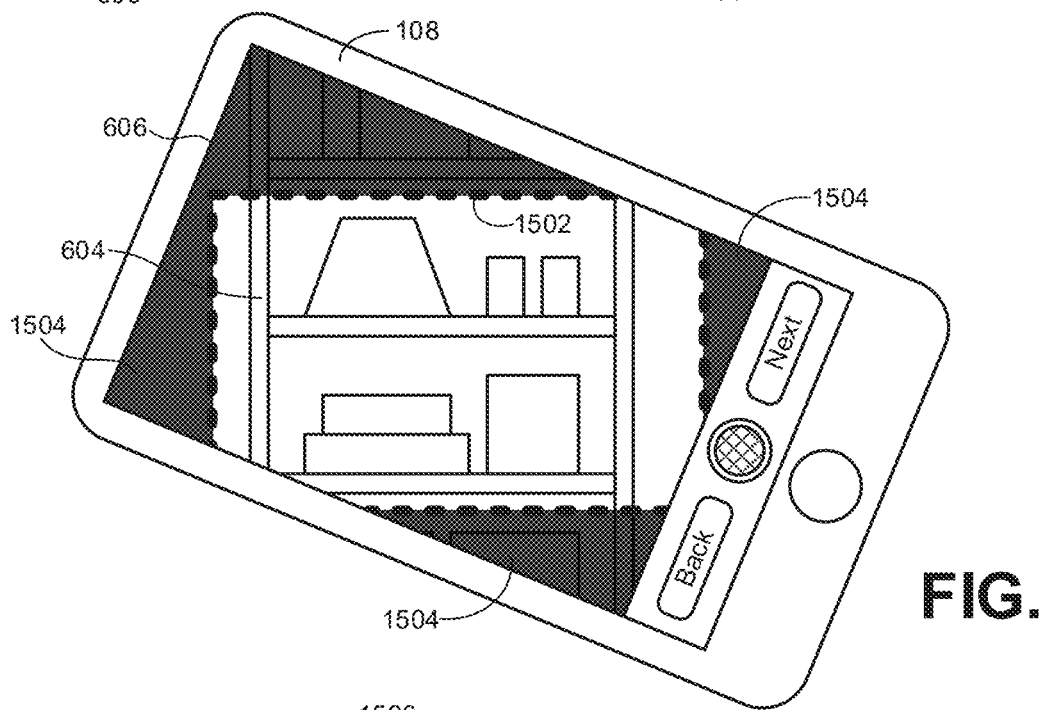

Another example orientation guide 1502 is illustrated in FIGS. 15 and 16. FIG. 15 illustrates when the mobile device 108 is substantially facing the shelving module 604 such that the orientation of the device is within prescribed limits). By contrast, FIG. 16 illustrates the orientation guide 1502 when the mobile device is rotated or tilted beyond the corresponding orientation threshold such that the orientation of the mobile device 108 needs to be corrected before a picture can be taken. As shown in the illustrated examples, the guide 1502 corresponds to a box that remains substantially the same size regardless of the orientation of the mobile device 108 (unlike the orientation guide 602 as shown in FIGS. 6-8). In some examples, the orientation guide 1502 is geometrically transformed (e.g., distorted) based on the orientation of the mobile device 108 as with the transformed box represented by the orientation guide 1202 of FIGS. 12-14. However, unlike the guide 1202 in which only a portion of the box is viewable, in the illustrated examples of FIGS. 15 and 16, the box represented by the orientation guide 1502 is slightly smaller than the size of the display screen 606 such that all or substantially all of the guide 1502 is visible regardless of the orientation of the mobile device 108. Having the orientation guide 1502 smaller than the screen 606 in this manner can help a user more easily recognize distortion in the guide 1502 indicative of an orientation of the mobile device 108 that has deviated from the reference orientation. For example, as shown in FIG. 15, the orientation guide 1502 is slightly trapezoidal in shape indicating the mobile device 108 is inclined slightly downwards relative to a reference orientation (e.g., an upright vertical position). In some examples, as shown, the display includes a darkened border 1504 with the orientation guide 1502 slightly inset from the perimeter of the display screen 606. In this manner, the box corresponding to the orientation guide 1502 remains substantially onscreen regardless of the orientation of the mobile device 108 to provide the user with a better sense of the orientation of the mobile device relative to the reference orientation. Additionally or alternatively, the inset guide 1502 with darkened border 1504 helps guide a user to position the particular region of interest of the scene to be photographed in the middle of the field of view of the camera.

Figure 17:
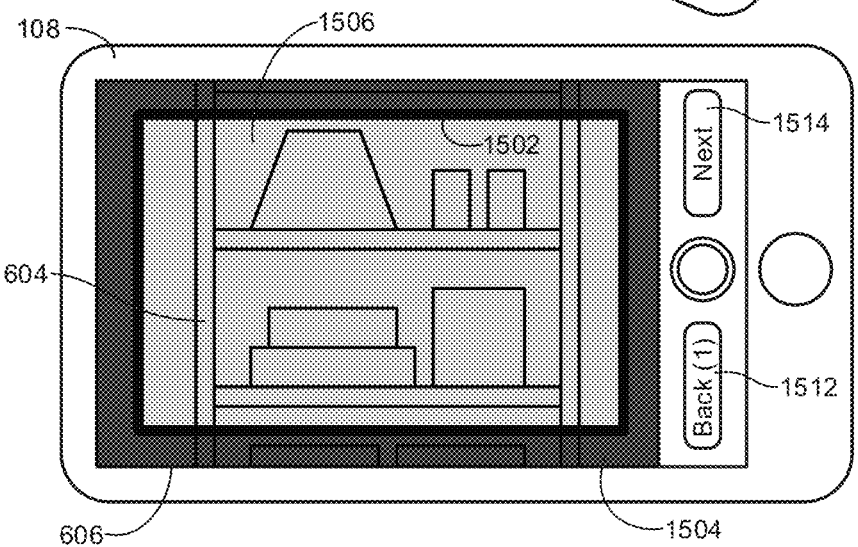

In some examples, the photograph capturing interface 204 provided visual feedback to a user based on orientation data collected by the orientation monitor 206 to assist a user in capturing multiple photographs to be stitched together. Example graphical elements provided to a user during a multi-shot workflow are shown and described in connection with FIGS. 17-23 that correspond to the examples illustrated in FIGS. 15 and 16. For purposes of explanation, FIG. 15 is assumed to illustrate the mobile device 108 just about to take a first shot for a multi-shot photograph. As can be seen in the illustrated example, the display 606 includes orientation guide 1502 that indicates the mobile device is oriented slightly off of the vertically upright position but within the threshold limits (indicated by the solid line (e.g., representative of the color green) having a slightly trapezoidal shape). FIG. 17 illustrates the display of the mobile device 108 immediately after the first shot is taken. Although the mobile device 108 has not changed orientation between FIGS. 15 and 17, in the illustrated example, the orientation guide 1502 is rectangular in shape in FIG. 17 rather than the slightly trapezoidal shape as shown in FIG. 15. In some examples, the change in shape of the orientation guide 1502 is based on a redefinition of the reference orientation. In particular, in some examples, the orientation of the mobile device 108 when a first of multiple shots is taken is defined as the reference orientation for the second and any subsequent shots. Thus, since the mobile device 108 in FIG. 17 (immediately after the first shot) is in the same orientation as the mobile device 108 when the first shot was taken, the orientation of the mobile device 108 exactly aligns with the reference orientation such that the box of the orientation guide 1502 is rectangular and without any transformation. Redefining the reference orientation for second and subsequent shots serves to ensure that a user takes each picture to be stitched together from approximately the same angle or orientation (e.g., with the specified threshold limits). Taking pictures to be stitched from a consistent orientation serves to increase the accuracy of the resulting stitched image such that subsequent image recognition analysis is more reliable. In some examples, in addition to redefining the reference orientation for second and subsequent shots, the threshold limits are also redefined. In some examples, the threshold limits for second and subsequent shots for a multi-shot image are stricter than for the first shot. For example, while an initial shot may need to be within 20 or 30 degrees of an upright reference orientation, the second and subsequent shots may be limited to being within 5 or 10 degrees of the orientation of the mobile device 108 at the time the first shot was taken.

In some examples, the portion or area of the scene being photographed (e.g., the shelving module 604) that has been captured by a previous shot (e.g., for a multi-shot image) is overlaid with a shaded box 1506. In the illustrated example of FIG. 17, the shaded box 1506 corresponds to the box of the orientation guide 1502 because the mobile device 108 is aimed at the same spot as the first shot. However, if the mobile device 108 is inclined upwards (as in FIG. 18), only a portion of the shaded box 1506 is shown that corresponds to the area of the shelving module 604 that was captured by the first shot. In this manner, a user can easily recognize that the unshaded portion corresponds to areas of the shelving module 604 that yet need to be captured in order to stitch together a complete image of the shelving module 604. In some examples, the shaded box 1506 is the same color as the orientation guide 1502 to indicate when the orientation of the mobile device is acceptable. In some examples, the shaded box is a different color that the orientation guide 1502 (e.g., blue). In some examples, rather than shading the area that has been captured in a previous photograph, the area is designated by an outline. Additionally or alternatively, in some examples, the previously captured photograph is overlaid or superimposed onto the area previously captured and made semi-transparent so that a user can see exactly what was captured during the previous shot.

Figure 18:
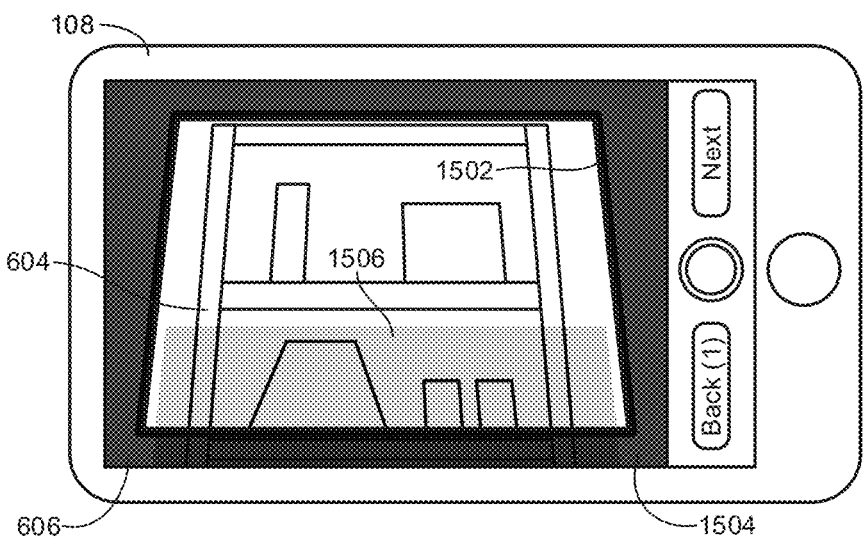
Figure 19:
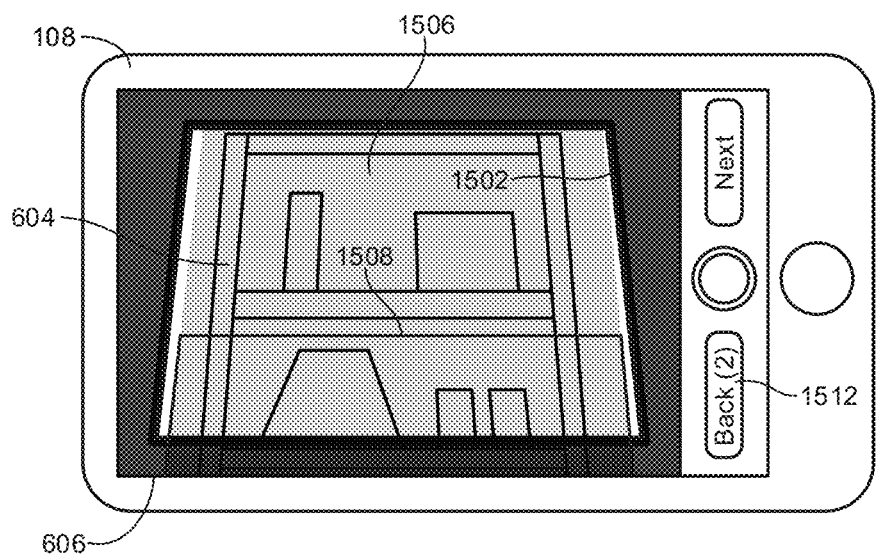

In some examples, the shaded box 1506 updates as each additional shot is taken to cover the newly captured area of the scene (the shelving module 604). For example, FIG. 18 represents the mobile device 108 immediately before taking a second shot whereas FIG. 19 represents the mobile device 108 immediately after taking a second shot. As shown in FIG. 19, the shaded box 1506 extends all the way up to the top of the orientation guide 1502 to indicate that the entire area within the field of view of the camera of the mobile device 108 has been captured by the previous shots (e.g., the first and second shots). However, as the mobile device is inclined downwards (FIGS. 20-22) there is still unshaded area indicating portions of the shelving module 604 that has not yet been captured. In some examples, when multiple shots are taken, the portion of the scene being photographed that was captured in each shot is separately demarcated. For example, as shown in FIG. 19, immediately after the second shot is taken, an outline 1508 is generated to designate the area corresponding to the first shot. In some examples a separate outline may be generated to designate the area corresponding to the second shot. In some examples, as shown, the shaded box 1506 and/or the outline 1508 corresponds to the area within the orientation guide 1502. In other examples, the shaded box 1506 and/or the outline 1508 may correspond to the entire field of view of the camera of the mobile device 108.

In some examples, the appearance (e.g., color) of the shaded box 1506 may change depending on the amount of overlap between the shaded box 1506 and the area of the scene within the field of view of the camera of the mobile device 108. For instance, when the proportion of the area within the field of view of the camera covered by the shaded box 1506 (representative of the area captured in previous shots) drops below a threshold (e.g., 30 percent), the shaded box 1506 may change from a first color (e.g., green) to a second color (e.g., red (represented by cross-hatching in FIG. 20) indicating the amount of overlap is insufficient to achieve a quality stitch. In some examples, a user is prevented from taking a picture in such a situation by the capture button being disabled. In some examples, the user may take the picture but may then be prompted to take another shot between the previous shots. Additionally or alternatively, in some examples, a textual indication 1510 is provided to a user to indicate when there is insufficient overlap between the currently viewed area (within the orientation guide 1502) and the previously captured area (corresponding to the shaded box 1506.

Figure 20:
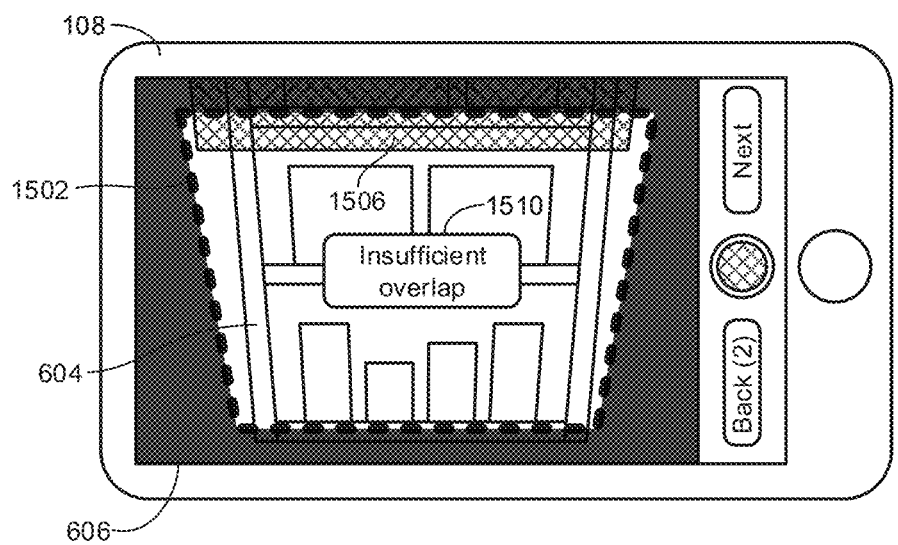
Figure 21:
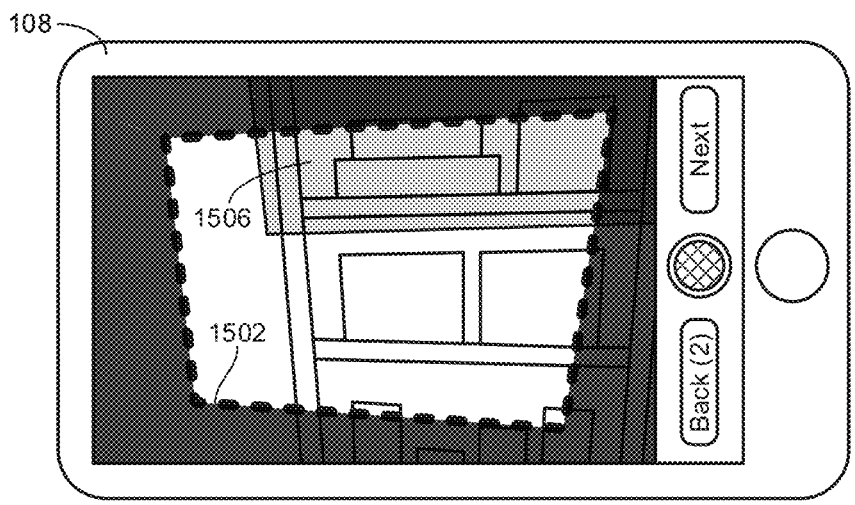

In some examples, as shown in FIG. 20, the orientation guide 1502 changes appearance (e.g., becomes red) along with the shaded box 1506 when there is insufficient overlap with the shaded box 1506 and the current field of view. However, in other examples, whether there is sufficient overlap between different shots is determined separately from whether the orientation of the mobile device 108 is within tolerable limits of corresponding orientation thresholds such that each is indicated separately. Thus, in some examples, the display in FIG. 20 indicates there is insufficient overlap and that the orientation of the mobile device 108 is unacceptable. For comparison, as shown in the illustrated example of FIG. 21, there is sufficient overlap of the field of view and the shaded box 1506 but the difference between the orientation of the mobile device 108 and the reference orientation has exceeded the acceptable limits. As described above, for the second and subsequent shots, the reference orientation corresponds to the orientation of the mobile device 108 when the first shot was taken. In some such examples, the compass direction of the mobile device 108 at the time of the first shot is included in the orientation data. As such, compass direction of the mobile device (e.g., rotation about the Z axis 118) can be compared unlike when the first shot was taken and the vertical direction of the reference orientation (corresponding to the front face of the shelving module 604) was assumed without knowing the compass direction from which to fix the reference orientation about the Z axis 118. Thus, as shown in the illustrated example, the mobile device 108 has been rotated to the left an angle that exceeds the corresponding orientation threshold. Accordingly, the orientation guide 1502 has been transformed to have a narrow left edge.

Figure 22:
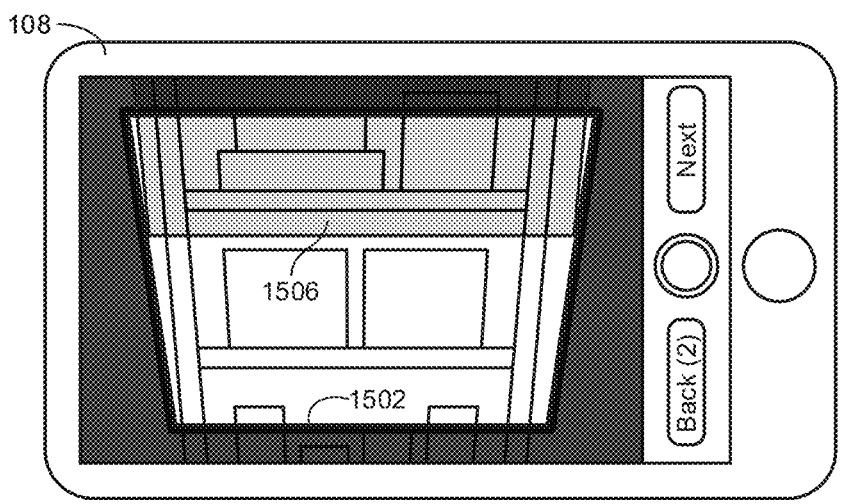
Figure 23:
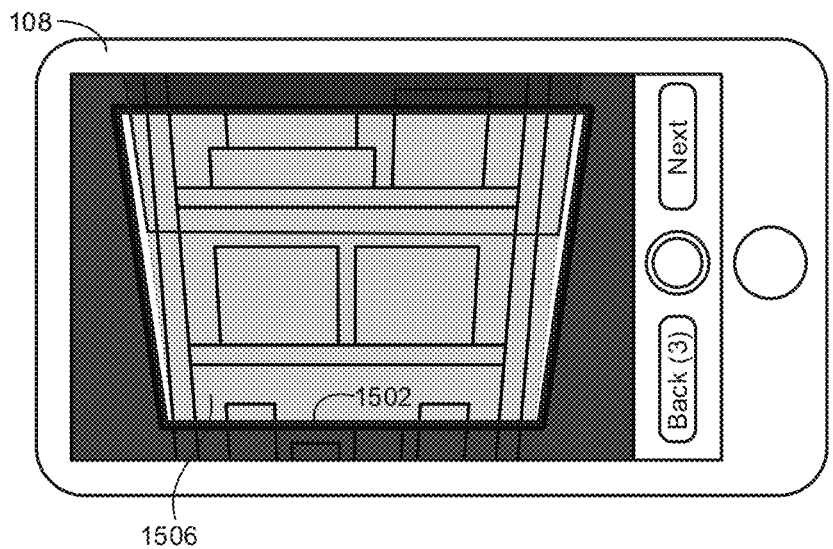

As shown in the illustrated examples, after the first shot is taken (FIG. 17), a back button 1512 is modified to include an indication that one photograph has been captured. In some examples, selecting the back button 1512 will delete the first photograph. In some examples, selecting a next button 1514 (without taking any additional shots) will indicate the user does not intend to capture multiple shots to be stitched together. However, if the user selects the capture button again a second shot will be taken (FIG. 19) and the button 1512 will indicate that two photographs have been captured. FIG. 23 represents the mobile device 108 immediately after taking a third shot (FIG. 22 representing the mobile device 108 immediately before taking the third shot). As shown in FIG. 23, the shaded box 1506 again is updated to cover the new area that has been captured by a photograph and the back button 1512 is updated to indicate three photographs have been taken. In some examples, any number of shots may be taken to be stitched together (e.g., 2 shots, 3 shots, 5 shots, 10 shots, etc.) with the only limitation being the memory and/or processing capacity of the mobile device 108 to store and process all of the shots to be stitched.

Figure 24:
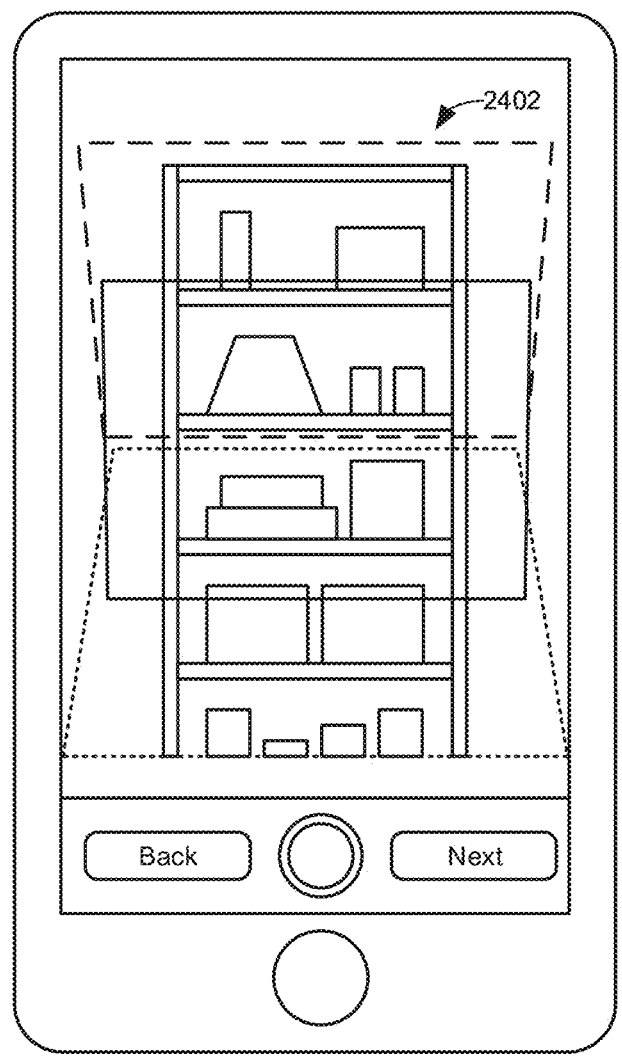
FIG. 24 illustrates an example preview of a stitched image corresponding to the multiple photographs of FIGS. 15-23.

The example photograph capturing module 120 of FIG. 2 is provided with the example photograph stitcher 214 to stitch or splice separate shots of a multi-shot photograph to form a complete image of a scene (e.g., a shelving module). FIG. 24 illustrates a stitched image 2402 previewed for a user corresponding to the three shots taken during the process described above in connection with FIGS. 15-23. In the illustrated example, each of the three shots are demarcated so that a user can verify that the stitching is accurate and/or whether one or more of the photographs fail to line up properly. As shown in the illustrated example, each of the shots has been geometrically transformed (e.g., distorted) to be properly stitched together. In some examples, the transformation applied to each of the shots is determined based on the orientation data collected by the orientation monitor 206 at the time that each shot was taken. Further detail regarding the implementation of the example photograph stitcher 214 is provided below in connection with FIG. 5.

The example photograph capturing module 120 of FIG. 2 is provided with the example movement monitor 208 to track and/or monitor the movement (or stillness) of the mobile device 108 (e.g., based on feedback from a vibration sensor of the mobile device 108). In some examples, the photograph capturing interface 204 presents graphical elements based on movement data collected by the movement monitor 208 to provide feedback to a user indicative of an amount of movement detected in the mobile device 108 and/or whether the movement exceeds a corresponding movement threshold. Such feedback can help ensure users hold the mobile device 108 sufficiently still while taking a picture to decrease the likelihood of capturing blurry photographs. In some examples, the visual feedback corresponds to a timer that graphically indicates a period of time the mobile device 108 needs to remain still (within a threshold) before a photograph is taken. In some examples, the movement monitor 208 begins monitoring the movement when a user first presses or taps on the capture button 608 (indicating the user is ready to take a picture). In some such examples, the timer begins as soon as the mobile device 108 is determined to be sufficiently still. In some examples, if the movement of the mobile device 108 remains below the threshold limit for the delay period set by the timer, a photograph is taken. In some examples, if the mobile device 108 moves more than the acceptable threshold limit, the timer resets and/or the request to capture a photograph is cancelled and a user must re-steady the photograph and press the capture button 608 again. The length of the delay may differ from one device to next (e.g., based on processing speeds, duration of auto-focus, etc.). In some examples, the delay is one second or less.

In some examples, the duration of the delay is graphically represented to the user so the user can anticipate when the delay expires and the photograph will actually be taken. In some examples, such a visual timer is incorporated into the capture button 608 as illustrated in FIG. 25 that changes appearance during the delay period while movement of the mobile device 108 is being monitored. As shown in the illustrated example of FIG. 25, a visual timer 2502 is represented as an outer ring of the capture button 608. In FIG. 25(*a*), the capture button 608 is disabled (as indicated by the cross-hatching) because the orientation of the mobile device 108 is outside threshold limits of the reference orientation. Once the orientation is corrected to within acceptable limits, the capture button 608 appears as shown in FIG. 25(*b*) indicating that a picture can be taken. At the time the capture button 608 is first pressed or tapped to take a picture (FIG. 25(*a*)), the visual timer 2502 is represented in a first state corresponding to a first color (e.g., white) but then gradually fills to a second color (e.g., green) in a clockwise direction (FIGS. 25(*c-f*)) until the ring is represented in a final state (FIG. 25(*f*)) corresponding to a different color (e.g., entirely green) over the span of the designated delay period during which the movement of the mobile device 108 is tracked. In some examples, if the movement of the mobile device 108 exceeds a threshold before the timer 2502 elapses (e.g., fully changes color), the request to capture the photograph is cancelled and the user must steady the mobile device and press the capture button 608 again. In other examples, the request to capture a photograph is not cancelled but the visual timer 2502 is reset to begin transitioning from the initial state (e.g., all white) to the final state (e.g., all green) before the photograph is finally taken. In some examples, once the time elapses, a photograph is automatically taken. Although the visual timer 2502 is represented as an outer ring around the capture button 608, the visual timer 2502 may be represented in any other way in which the appearance changes (e.g., via animation) during the specified period of time to provide visual feedback to assist a user in anticipating when a picture will actually be taken and how long the user needs to hold the mobile device 108 steady. In some examples, the visual timer is represented separate from and independent of the capture button 608.

FIG. 26 illustrates another example capture button 2602 that incorporates another example orientation guide 2604 that may be used in addition to or instead of the guide 602, 1202 described above, to guide a user in positioning the mobile device 108. In some examples, the relative position of the orientation guide 1604 along a first one of the axes within the button 2602 (e.g., the vertical axis 2606) is representative of the inclination of the mobile device forwards or backwards (e.g., aiming the camera up or down). In some examples, the relative position of the orientation guide 1604 along the second one of the axes (e.g., the horizontal axis 2608) is representative of the angle of rotation or tilt of the mobile device 108. In some examples, the size of the orientation guide 1604 is representative of threshold limits for the orientation of the mobile device. That is, in some examples, a user is to orient the mobile device 108 such that the center of the button 2602 (e.g., where the two axes 2606, 2608 cross) is within the orientation guide 2604. In some examples, if the orientation guide 2604 is sufficiently off-centered, the guide 2604 changes appearance (e.g., from green (represented as a solid circle in FIG. 26(*c*)) to yellow (represented as a partially broken circle in FIG. 26(*b*)). In some examples, the size of the button 2602 relative to the size of the orientation guide 2604 represents the threshold limits for the orientation of the mobile device 108. That is, the mobile device is within acceptable limits so long as the orientation guide 2604 remains entirely within the button 2602. In some such examples, if the mobile device is oriented such that the orientation guide 2604 goes outside of the button 2602 (e.g., FIG. 26(*a*)), the guide 2604 changes to a different color (e.g., red (represented by a cross-hatched dashed circle)). In some examples, when the orientation guide 1604 goes outside of the button 2602, the ability to take a photograph is disabled until the orientation of the mobile device has been corrected to be within the specified limits. The example capture button 2602 of FIG. 26 also includes a visual timer similar to that described above in connection with FIG. 25.

Figure 27:
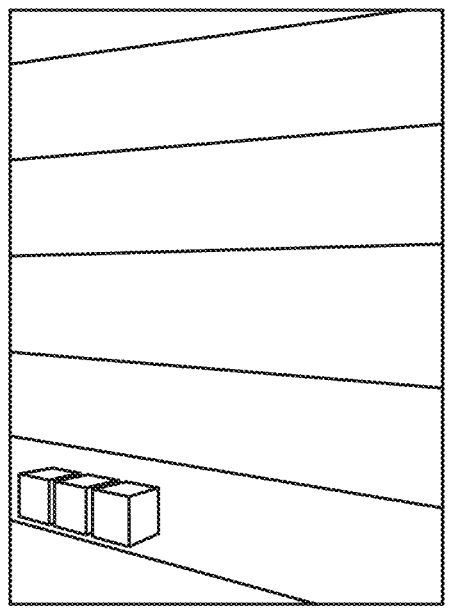
FIGS. 27 and 28 illustrate the effect of perspective in a photograph.
Figure 28:
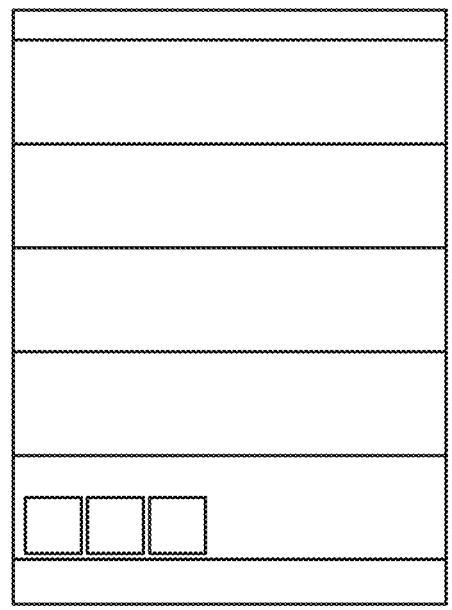

Returning to FIG. 2, the example photograph capturing module 120 is provided with the example perspective analyzer 210 to analyze a captured photograph to determine an amount or presence of perspective in the photograph. Perspective can be described as the appearance of parallel lines in a real-world scene appearing to converge when captured in a photograph. For example, FIG. 27 shows an example image of a shelving unit that has perspective, whereas FIG. 28 shows an example image of the same shelving unit without perspective. In the real world, the shelves are parallel (as shown in FIG. 28) but they appear to converge in FIG. 27 because of perspective. Perspective is caused by objects that are further away appearing smaller. The left side of the image is FIG. 26 is further away from the camera (because of the camera's angle relative to the shelves) such that the shelves appear closer together along the left side of the image. Perspective in a photograph is reduced when the camera is directly facing the plane of the scene of interest being photographed. This is one reason that, in some examples, the inclination of the mobile device 108 either forwards or backwards (aiming up or down) is limited to within a certain threshold from an upright position corresponding to the front face of a shelving module. While the vertical angle (up or down) with which a camera on the mobile device 108 is pointing relative to the vertical direction can be tracked and, thus, corrected as described above, in some examples, there is no reference to guide the horizontal angle (left or right) of the mobile device relative to a front facing place of a shelving module. In some such examples, as described above, it is assumed that a user will generally be facing the shelving modules (or other scene of interest) to be photographed. However, the user may not be directly facing the scene such that an unacceptable amount of perspective may be introduced into a captured image resulting in an image that cannot reliably be analyzed using image recognition algorithms. Accordingly, the example perspective analyzer 210 is provided to analyze photographs after being captured (during post-processing) to determine whether the amount of perspective is acceptable or if the photograph needs to be retaken. In this manner, the orientation of the mobile device 108 about the third vertical axis (i.e., the Z axis 118) can be accounted for in addition to the first two horizontal axes (i.e., the X and Y axes 114, 116) that are monitored in real-time when the mobile device 108 is being posited to frame a scene for photographing. Additional detail regarding the implementation of the perspective analyzer 210 is provided below in connection with FIG. 3.

Figure 29:
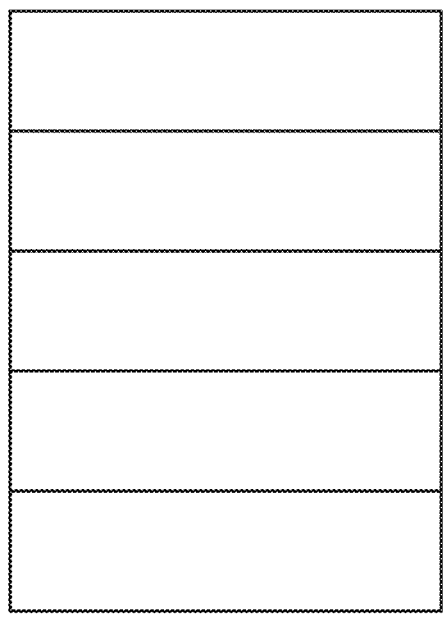
FIGS. 29 and 30 illustrate the effect of blurriness in a photograph.
Figure 30:

The example blurriness analyzer 212 of the illustrated example of FIG. 2 is provided to analyze a captured photograph to determine an amount or presence of blurriness in the photograph. Blurriness (or lack of sharpness or acutance) can be described as the sharp contrast of an edge in a real-world scene appearing to have a more gradual contrast over an area in a photograph. For example, FIG. 29 shows an example image of a shelving unit that is sharp (not blurry), whereas FIG. 30 shows an example image of the same shelving unit that is blurry. The lines representing the shelves are sharp in FIG. 29 because there is precise contrast between the line representing the edge of the shelves and the surrounding area. By comparison, the lines representing the edge in FIG. 30 gradually change over an area indicative of blurriness. As described above, the potential for blurriness is reduced by tracking the movement of a mobile device and only taking a picture when the mobile device is sufficiently still or steady. However, there may still be some movement which causes blurriness. Furthermore, other factors may cause blurriness such as the camera not being properly focused on the scene of interest, poor lighting, etc. Accordingly, the example blurriness analyzer 212 is provided to analyze photographs after being captured (during post-processing) to determine whether there is blurriness and/or whether the amount of blurriness is acceptable or if the photograph needs to be retaken. Additional detail regarding the implementation of the blurriness analyzer 212 is provided below in connection with FIG. 4.

Figure 31:
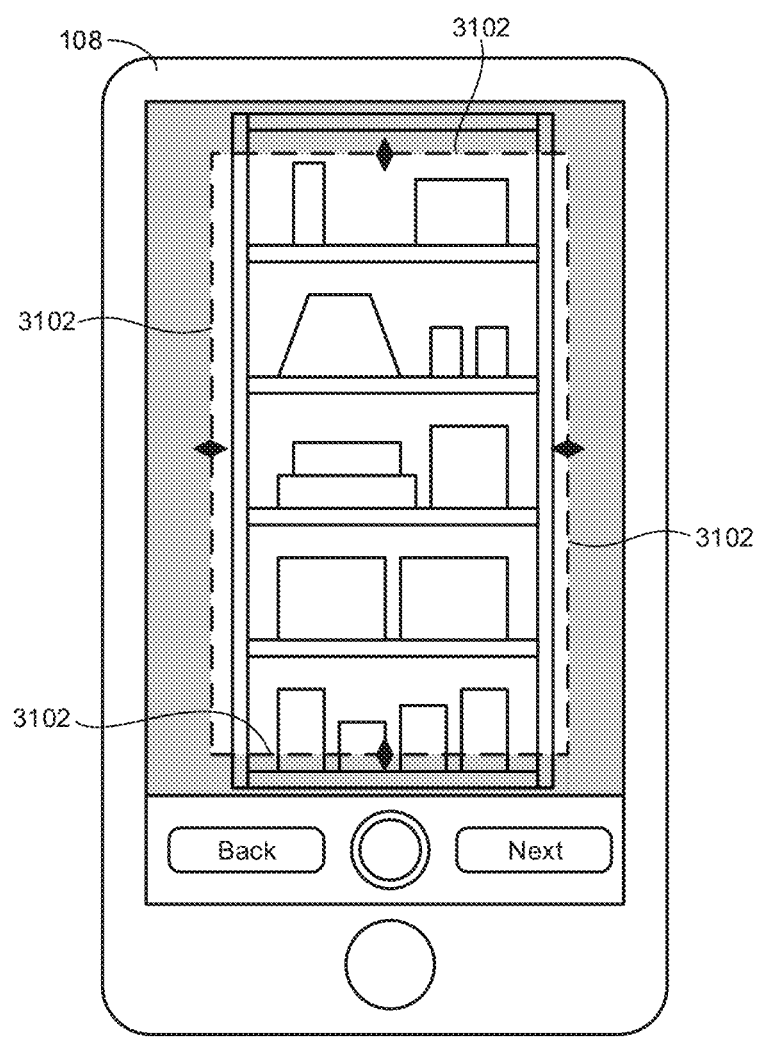
FIG. 31 illustrates example user-adjustable region of interest lines to assist a user in capturing a photograph.

In the illustrated example of FIG. 2, the photograph capturing module 120 is provided with the example region of interest module 216 to enable a user to define a region of interest within a photographed scene. In some examples, the region of interest module 216 enables a user to define an area of interest before taking a picture. For example, as shown in the illustrated example of FIG. 31, user adjustable region of interest lines 3102 are rendered over the display of the field of view of the mobile device 108. In some examples, a user may adjust the region of interest lines 3102 to align with and/or define the region of the scene being photographed that is the focus of the photograph (e.g., the region to be subsequently analyzed using image recognition techniques). In some examples, a user may frame the region of interest by appropriately positioning the mobile device 108 without using or defining the region of interest lines 2302.

Additionally or alternatively, in some examples, the region of interest module 216 enables a user to identify and/or adjust the area or region of interest after taking a picture (e.g., while previewing the captured photograph).

Figure 32A:
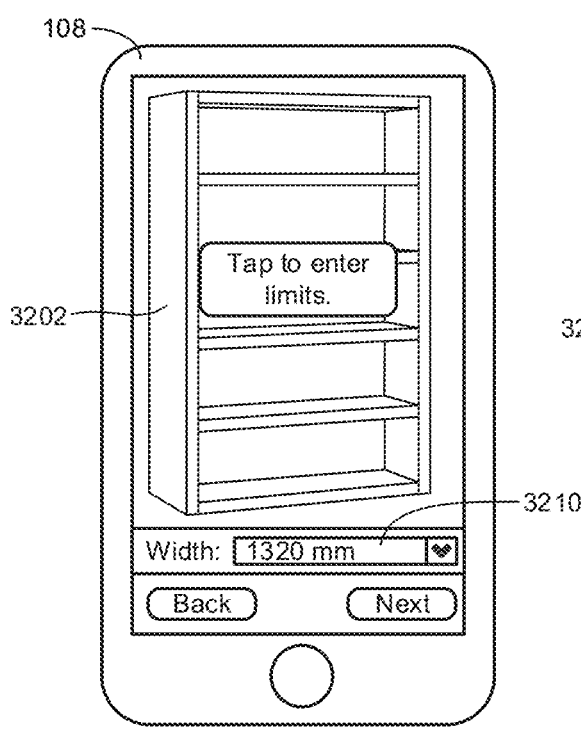

An example manner in which a user may define a region of interest is shown in FIGS. 32A-E. FIG. 32A illustrates the mobile device 108 displaying a preview of a photographed shelving module 3202. In some examples, the preview of the shelving module 3202 is based on a single photograph of the entire shelving module (e.g., similar to FIG. 6). In other examples, the preview of the shelving module 3202 is based on multiple shots that have been stitched together (e.g., similar to FIG. 24). As shown in the illustrated example, the captured photograph contains some perspective as indicated by the appearance of convergence of the shelves of the shelving module 3202 (e.g., similar to FIG. 27). However, that the photograph was not rejected by the perspective analyzer 210 when initially captured indicates the perspective was insufficient to exceed the defined threshold. As a result of the perspective, the shape of the shelving module 3202 within the previewed photograph is not a rectangle but is generally trapezoidal in shape. As such, defining vertical and horizontal boundary lines (as with the region of interest lines 3102 of FIG. 31) cannot precisely demarcate the front face of the shelving module 3202. Accordingly, in some such examples, the region of interest is defined by a user demarcating corners of the region of interest as provided in the preview of the photograph. With the region of interest being defined after the photograph is taken in this manner, a user can precisely define the region of interest without having to hold the camera in alignment with predefined region of interest lines as in FIG. 31.

Figure 32B:
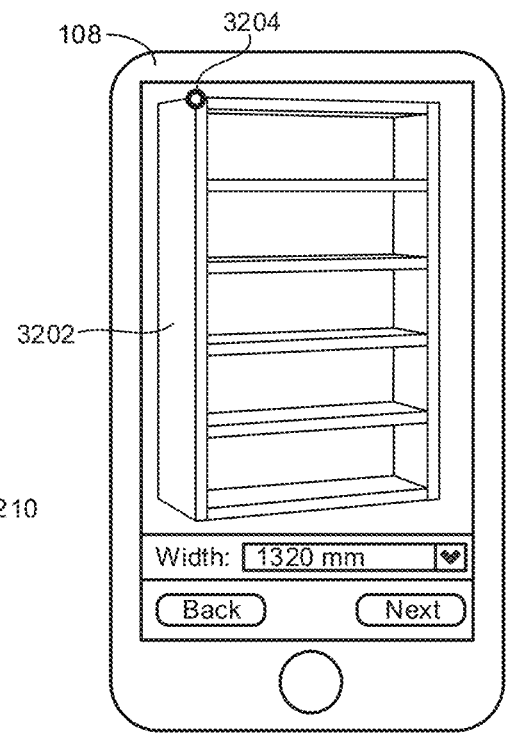
Figure 32C:
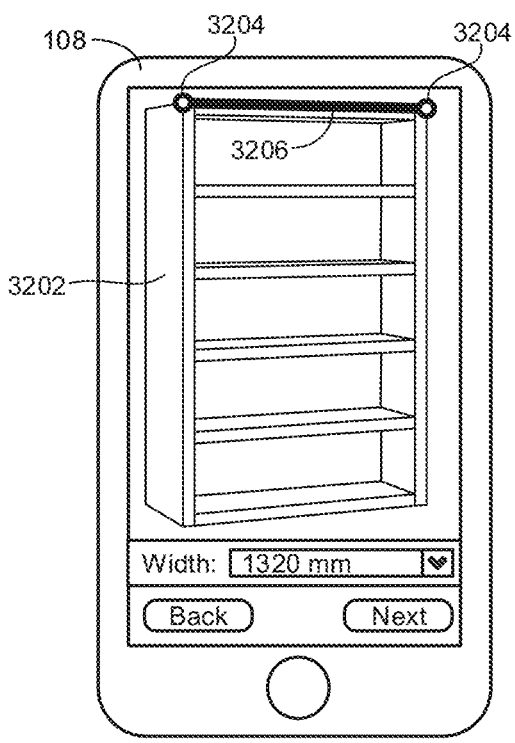
Figure 32D:
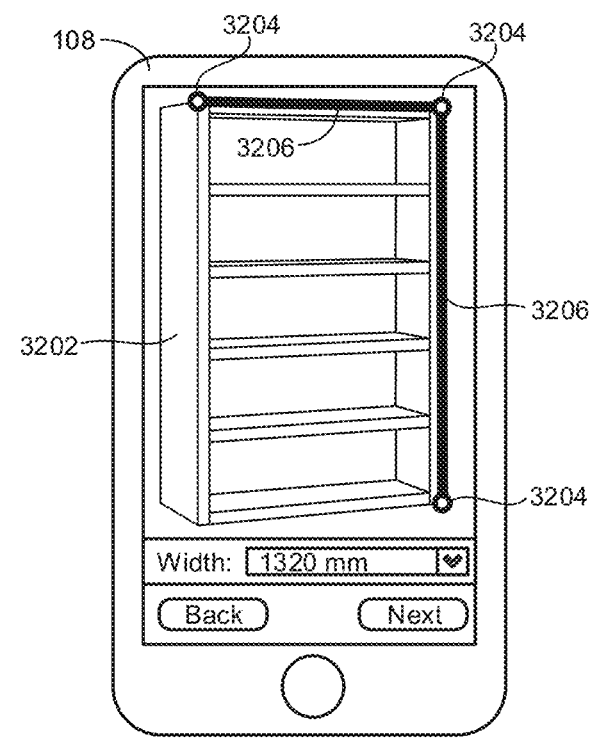

In some examples, as shown in FIG. 32A, the region of interest module prompts a user (via the photograph capturing interface 204) to tap the screen to define limits of the region of interest. FIG. 32B represents the user selecting a first corner 3204 of the region of interest. FIG. 32C represents the user selecting a second corner 3204 of the region of interest, thereby defining a first edge 3206 of the region to be defined (e.g., the front face of the shelving module 3202). FIG. 32D represents the user selecting a third corner 3204 of the region to define a second edge 3206. FIG. 32E represents the user selecting a fourth and final corner 3204 of the region of interest, whereupon all four edges 3206 of the region of interest are defined. In some examples, as shown in the illustrated example of FIG. 32E, the area outside of the defined region of interest is grayed out or darkened to differentiate from the selected region. In some examples, the user may further adjust the position of the corners defining the region of interest after an initial placement of each corner 3204. Additionally, as shown in the illustrated example, the user may be enabled to adjust the edges 3206 of the defined quadrilateral by moving edge points 3208 if, for example, the edges of the region of interest are not perfectly straight due to distortion from the camera lens or other reason. In some examples, when the user is placing and/or adjusting the points defining the region of interest, an inset showing an enlarged portion of the captured photograph may be provided to assist the user in precisely placing the particular corner 3204 or edge point.

The four edged region in the illustrated example is suitable for outlining or demarcating shelves, which are typically rectangular in shape. In some such examples, if the complete region does not correspond to an expected shape (e.g., a rectangle geometrically transformed based on the effects of perspective) the lines demarcating the region of interest may be represented in a different color (indicated by the dashed lines in FIG. 32F) to indicate the designated region of interest is invalid and needs correcting. In other examples (e.g., where the subject matter to be photographed is not rectangular in shape), other shapes with greater or fewer edges 3206 and/or with nonlinear edges may additionally or alternatively be defined by a user.

In some examples, the region of interest module 216 collects a measurement or user estimate of a width (and/or other dimensions) of the shelving module 3202 via a dimensions input field 3210. In this manner, a reference of the actual size or scale of the photographed region of interest is tied to the photograph to assist in image recognition analysis of the photograph at a later time.

Returning to FIG. 2, the example photograph capturing module 120 is provided with the perspective corrector 218 to correct perspective within a photograph that was not substantial enough to be detected by the example perspective analyzer 210. In some examples, the perspective corrector 218 corrects perspective based on the shape of the region of interest defined by the region of interest module 216. For example, as indicated above, the example shelving module 3202 of FIGS. 32A-F includes some perspective such that the defined region of interest, shown in FIG. 32E, is generally trapezoidal in shape. In some such examples, the perspective corrector 218 mathematically transforms the captured photograph in a manner that would convert the defined shape of a region of interest to a rectangle as shown in FIG. 33. As a result, the front face of the shelving module 3202 becomes rectangular in shape with each of the shelves being substantially horizontal.

The example scene segment demarcation module 220 of the illustrated example of FIG. 2 is provided to enable a user to demarcate segments within a scene captured in a photograph. For instance, the segments to be defined may correspond to each shelf of the shelving module 3202 described in the example above. In some examples, the segments (e.g., each of the shelves) are defined as a user taps the screen on each shelf to add horizontal markers 3402 as shown in the illustrated example of FIG. 34. Demarcating segments of the scene in this manner serves to improve the image recognition analysis at a backend data collection facility by indicating that the areas between the markers 3402 correspond to separate shelves and, therefore, have different content. In other examples, where the subject matter photographed is not a shelving unit, other lines and/or shapes may additionally or alternatively be defined to demarcate appropriate segments within the photographed scene.

Returning to FIG. 2, the example photograph capturing module 120 is provided with the example captured photograph database 222 to store captured photographs. In some examples, orientation data is stored in the database 222 along with the corresponding photograph. Further, in some examples, the captured photograph database 222 stores transformation information and/or transformed photographs as well as the defined region of interest for each photograph and any particular segments demarcated in each such photograph. The example communications interface 224 of the illustrated example is provided to communicate with sensors and/or other components within a mobile device 108 implementing the photograph capturing module 120. Additionally or alternatively, in some examples, the communications interface 224 transmits captured photographs and/or the other collected data stored in the database 222 to a central data collection facility (e.g., the data collection facility 110 of FIG. 1) where the photographs may be analyzed using image recognition techniques.

Figure 35:
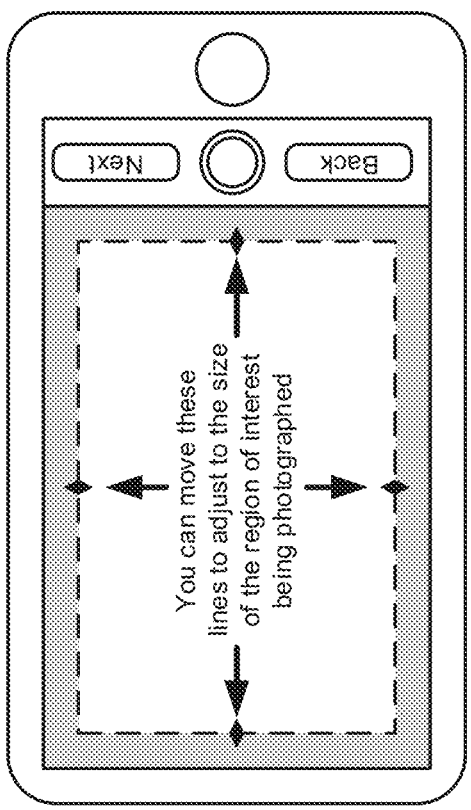
FIGS. 35-36 illustrate example contextual feedback provided to a user to assist the user in capturing a photograph.
Figure 36:
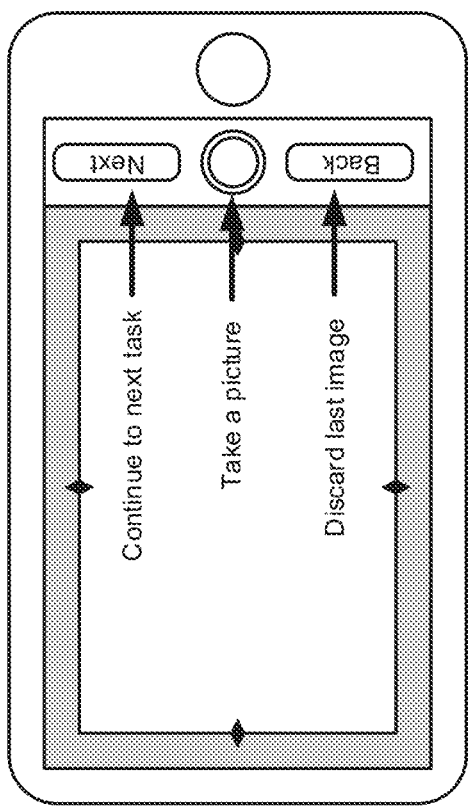

In some examples, the photograph capturing module 120 provides additional assistance and/or guidance to a user capturing and preparing photographs to be sent to a central facility for image recognition analysis. For instance, in some examples, contextual guidance is provided to a user via the photograph capturing interface 204 to explain the use of the capture information, region of interest lines, and/or other tools provided to the user by the photograph capturing module 120. Example contextual guidance is shown in FIGS. 35 and 36 to explain the use of the region of interest lines 3102 of FIG. 31 and the capture button 608 and other buttons shown in FIGS. 6-14. In some examples, such contextual guidance is provided to the user on a periodic and/or aperiodic basis (e.g., once a day, once a week, each time the module 120 is used, etc.).

Figure 37:
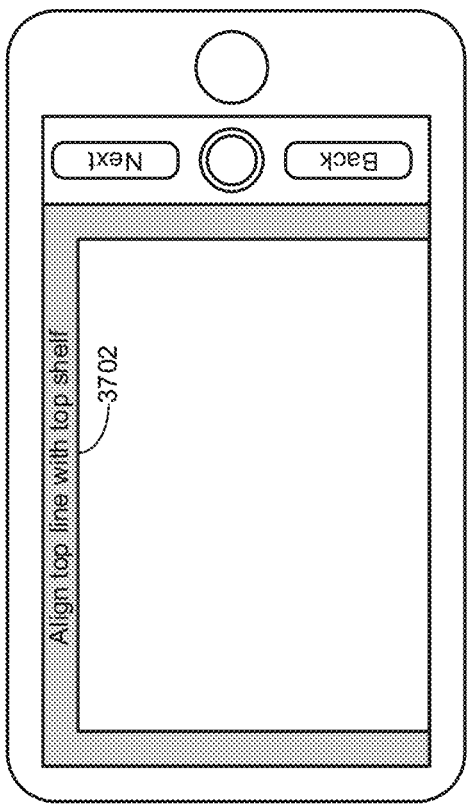
FIGS. 37 and 38 illustrate an alternative approach to assist a user in taking multiple photographs to be stitched together.
Figure 38:
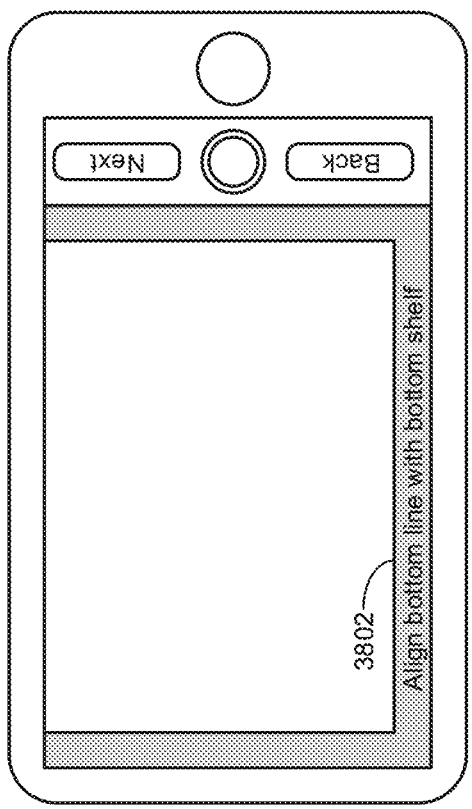

FIGS. 37 and 38 illustrate an alternative approach to assist a user in taking multiple photographs to be stitched together. In the illustrated example, the user is prompted to take a picture of the upper extremity of a scene (e.g., a top shelf of a shelving module as indicated in FIG. 37) and the lower extremity of the scene (e.g., a bottom shelf of a shelving module as indicated in FIG. 37). In some such examples, the user is instructed to align the top edge of the top shelf with a top region of interest line 3702 in a first photograph and align the bottom edge of the bottom shelf with a bottom region of interest line 3802. Such guidance serves to help the user properly frame the scene being photographed. In some examples, after taking the pictures at each end (e.g., top and bottom) of the scene, the user is guided in taking pictures of the middle portion of the scene. In some such examples, with the ends of the scene already captured, a user can be assisted in aligning the middle photographs and ensuring that there is sufficient overlap of the scene of interest captured in adjacent pictures for an accurate stitching.

While an example manner of implementing the photograph capturing module 120 of FIG. 2 is illustrated in FIG. 2, one or more of the elements, processes and/or devices illustrated in FIG. 2 may be combined, divided, re-arranged, omitted, eliminated and/or implemented in any other way. Further, the example photograph capturing controller 202, the example photograph capturing interface 204, the example orientation monitor 206, the example transformation calculator 207, the example movement monitor 208, the example perspective analyzer 210, the example blurriness analyzer 212, the example photograph stitcher 214, the example region of interest module 216, the example perspective corrector 218, the example scene segment demarcation module 220, the example captured photograph database 222, the example communications interface 224, and/or, more generally, the example photograph capturing module 120 of FIG. 2 may be implemented by hardware, software, firmware and/or any combination of hardware, software and/or firmware. Thus, for example, any of the example photograph capturing controller 202, the example photograph capturing interface 204, the example orientation monitor 206, the example transformation calculator 207, the example movement monitor 208, the example perspective analyzer 210, the example blurriness analyzer 212, the example photograph stitcher 214, the example region of interest module 216, the example perspective corrector 218, the example scene segment demarcation module 220, the example captured photograph database 222, the example communications interface 224, and/or, more generally, the example photograph capturing module 120 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example photograph capturing controller 202, the example photograph capturing interface 204, the example orientation monitor 206, the example transformation calculator 207, the example movement monitor 208, the example perspective analyzer 210, the example blurriness analyzer 212, the example photograph stitcher 214, the example region of interest module 216, the example perspective corrector 218, the example scene segment demarcation module 220, the example captured photograph database 222, and/or the example communications interface 224 is/are hereby expressly defined to include a tangible computer readable storage device or storage disk such as a memory, a digital versatile disk (DVD), a compact disk (CD), a Blu-ray disk, etc. storing the software and/or firmware. Further still, the example photograph capturing module 120 of FIG. 2 may include one or more elements, processes and/or devices in addition to, or instead of, those illustrated in FIG. 2, and/or may include more than one of any or all of the illustrated elements, processes and devices.

Figure 3:
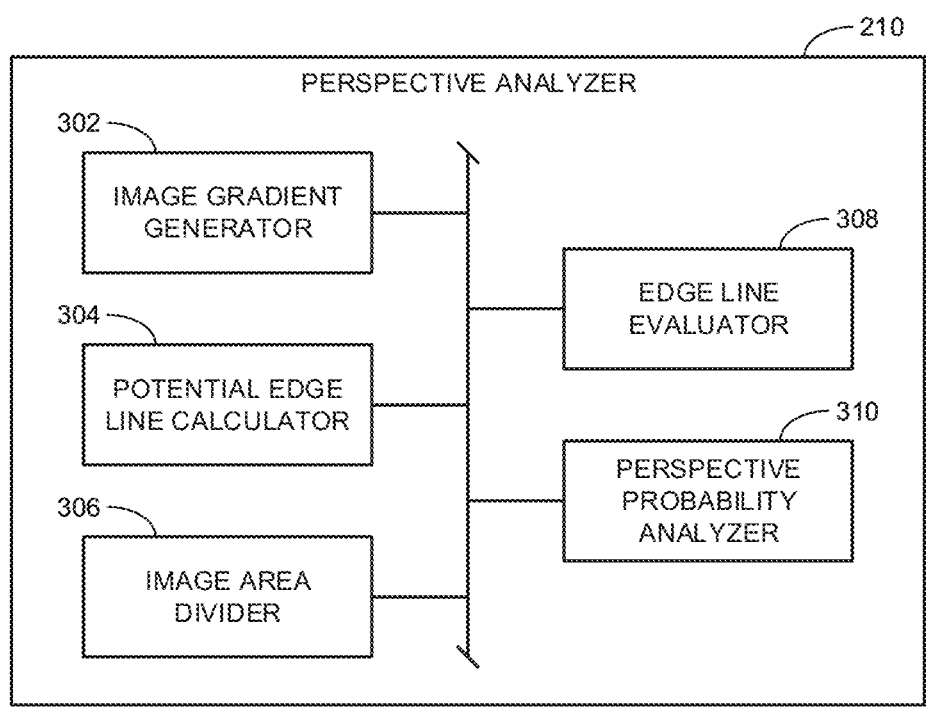
FIG. 3 illustrates an example manner of implementing the example perspective analyzer of FIG. 2.

FIG. 3 is an example implementation of the example perspective analyzer 210 of FIG. 2. In the illustrated example, the perspective analyzer 210 includes an example image gradient generator 302, an example potential edge line calculator 304, an example image area divider 306, an example edge line evaluator 308, and an example perspective probability analyzer 310.

The example image gradient generator 302 of the illustrated example of FIG. 3 is provided to generate an image gradient of a captured photograph to facilitate in the analysis of perspective in the photograph. In some examples, the image gradient generator 302 converts the photograph to grayscale and applies an edge detection filter (e.g., a Sobel filter) to the photograph. The edge detection filter detects changes in intensity of pixels (white vs. black because the image is in grayscale). In some examples, the edge detection filter is applied in the vertical direction to produce an image gradient that highlights edges or lines that extend in a direction generally horizontal across the image (e.g., the edge of horizontal shelves of a photographed shelving module). Additionally or alternatively, in some examples, the edge detection filter may be applied in the horizontal direction to produce an image gradient showing generally vertical edges or lines within the photograph. In either case, the image gradient will include white or near white pixels where lines or edges were detected and include darker (e.g., black) pixels in other areas of the gradient.

More particularly, in some examples, each pixel will have a value between 0 and 255 where 255 is perfectly white (corresponding to a sharp edge identified by the edge detection filter) and 0 is perfectly black (corresponding to an area that does not change intensity at all in the direction of the applied edge detection filter). The relative intensity (whiteness) of a pixel (e.g., the closeness of the pixel value to 255) produced in the image gradient by the edge detection filter is based on the abruptness of the discontinuity or change in intensity of the photograph in the direction the filter is applied. For purposes of clarity, as used herein, the term "white pixel" in the context of an image gradient produced using an edge detection filter includes a purely white pixel (e.g., a pixel value of 255) as well as pixels that are substantially or nearly white (e.g., pixel values above 230). Such "white pixels" are also referred to as edge pixels because they are indicative of an edge in the photograph. In some examples, the range of values that constitutes "white pixels" be larger or smaller depending upon the precision with which edges are to be detected. For example, white pixels may corresponds to pixels having values between 200-255, 215-255, 240-255, 250-255, etc. In some examples, only pixels that are purely white (e.g., a pixel value of 255) are designated as white pixels.

Figure 39:
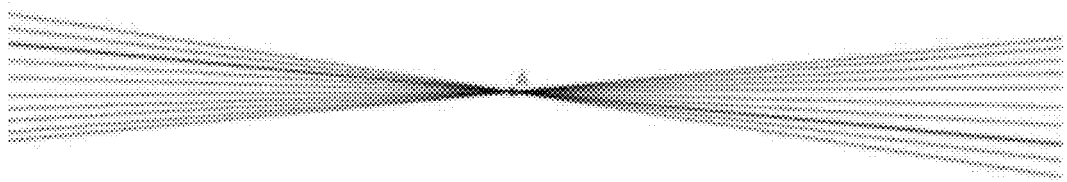
FIG. 39 illustrates an example range of different angled lines passing through a single point or pixel of a photograph.

The example potential edge line calculator 304 of the illustrated example of FIG. 3 is provided to generate or pre-calculate potential edge lines for each white pixel identified in the image gradient generated by the image gradient generator 302. That is, potential edge lines are calculated for pixels corresponding to an abrupt discontinuity detected by the edge detection filter that may be indicative of an edge. While the edge detection filter applied in a vertical direction serves to identify generally horizontal edges, the precise angle of such an edge is not known. Accordingly, a series of potential edge lines having different angles are calculated for each pixel and used in the subsequent analysis to determine the actual angle of the edge represented by the white pixel as described more fully below. More particularly, in some examples, multiple lines passing through each edge pixel (e.g., white pixel including substantially white pixels) at incremental angles between a range of angles within a threshold angle of a line extending perpendicular to the direction of the edge detection filter (i.e., a horizontal line for a vertically applied edge detection filter). For example, with incremental angles of 0.4 degrees between minimum and maximum (threshold) angles of −15 degrees and +15 degrees results in 75 different lines being defined. More lines may be defined by decreasing the incremental angle or increasing the total range of angles. Conversely, fewer lines result by increasing the angle or decreasing the total range of angles. An example range of different angled lines passing through a single point or pixel is illustrated in FIG. 39. In some examples, the range of angles above and below the horizontal (e.g., the direction perpendicular to the direction of the applied edge detection filter) may be greater or less than +/−15 degrees.

Further, in some examples, the potential edge line calculator 304 calculates the position of the white pixel (e.g., x and y coordinates within a pixel grid of the gradient) to specifically define the location of the potential edge line. Further still, in some examples, the potential edge line calculator 304 calculates endpoints or limits for each potential edge line. That is, based on the position of the pixel for which the line is being defined and the size of the two-dimensional pixel grid, the ends of the line can be determined where the line meets the edge of the image.

Figure 40:
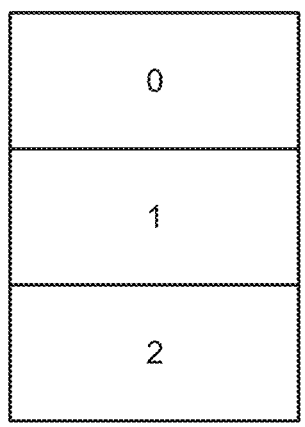
FIG. 40 illustrates an example division of a photograph into areas to analyze the photograph for perspective.
Figure 41:
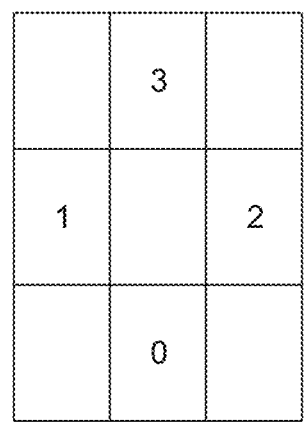
FIG. 41 illustrates an example division of a photograph into areas to analyze the photograph for blurriness.

The example image area divider 306 of the illustrated example of FIG. 3 is provided to divide different areas within the photograph to be analyzed for perspective. In some examples, multiple different areas of the image gradient are analyzed separately to provide measures of the angle of shelves (corresponding to detected edges) at different locations within the photograph. The differences in the angles of the detected edges are indicative of the amount of perspective in the photograph. An example division of the image gradient into three areas is represented in FIG. 40. In the illustrated example, the areas to be arranged are vertically arranged because it is the angle (due to perspective) of the horizontal shelves at different heights that are to be compared to determine perspective. In some examples, different arrangements and/or a different amount of areas may alternatively be defined for the analysis. In some examples, the entire image may be analyzed as a single area.

The example edge line evaluator 308 of the illustrated example of FIG. 3 is provided to evaluate the potential edge lines (defined by the potential edge line calculator 304) for each pixel in each area (defined by the image area divider 306) to determine a best line for the area. The best line in an area corresponds to the potential edge line that passes through the most white (i.e., edge) pixels within the image gradient because such a line is most likely corresponding to a real-world edge in the scene of the photograph (e.g., the edge of a shelf). That is, a potential edge line that mostly closely aligns with an actual edge in the photograph should pass through white pixels along its entire length because at each point, there actually is an edge. Thus, the greater the number of white pixels within a potential edge line, the more likely that the potential edge line corresponds to an actual edge in the photograph. In some examples, the absolute number of white pixels along a line is normalized by the length the line so as to exclude lines that may not follow an edge (represented by contiguous white pixels) but is a long line that passes through many white pixels (corresponding to one or more edges).

The example perspective probability analyzer 310 of the illustrated example of FIG. 3 is provided to analyze the angles of the best lines identified for each of the areas in the image using a logistic model to calculate a probability that the photograph contains perspective. In some examples, the output probability will be a value between 0 and 1 where 0 indicates there is no probability of there being perspective while increasing values approaching 1 indicate an increased probability that the photograph has perspective. In some examples, the perspective probability analyzer 310 designates a photograph as either containing perspective or not containing perspective based on whether the calculated probability exceeds a corresponding perspective threshold. In some examples, the perspective threshold is about 0.5 but may be higher or lower (e.g., 0.3, 0.4, 0.6) depending upon the amount of perspective that is acceptable for the particular application.

While an example manner of implementing the perspective analyzer 210 of FIG. 2 is illustrated in FIG. 3, one or more of the elements, processes and/or devices illustrated in FIG. 3 may be combined, divided, re-arranged, omitted, eliminated and/or implemented in any other way. Further, the example image gradient generator 302, the example potential edge line calculator 304, the example image area divider 306, the example edge line evaluator 308, the example perspective probability analyzer 310, and/or, more generally, the example perspective analyzer 210 of FIG. 3 may be implemented by hardware, software, firmware and/or any combination of hardware, software and/or firmware. Thus, for example, any of the example image gradient generator 302, the example potential edge line calculator 304, the example image area divider 306, the example edge line evaluator 308, the example perspective probability analyzer 310, and/or, more generally, the example perspective analyzer 210 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image gradient generator 302, the example potential edge line calculator 304, the example image area divider 306, the example edge line evaluator 308, and/or the example perspective probability analyzer 310 is/are hereby expressly defined to include a tangible computer readable storage device or storage disk such as a memory, a digital versatile disk (DVD), a compact disk (CD), a Blu-ray disk, etc. storing the software and/or firmware. Further still, the example perspective analyzer 210 of FIG. 2 may include one or more elements, processes and/or devices in addition to, or instead of, those illustrated in FIG. 3, and/or may include more than one of any or all of the illustrated elements, processes and devices.

Figure 4:
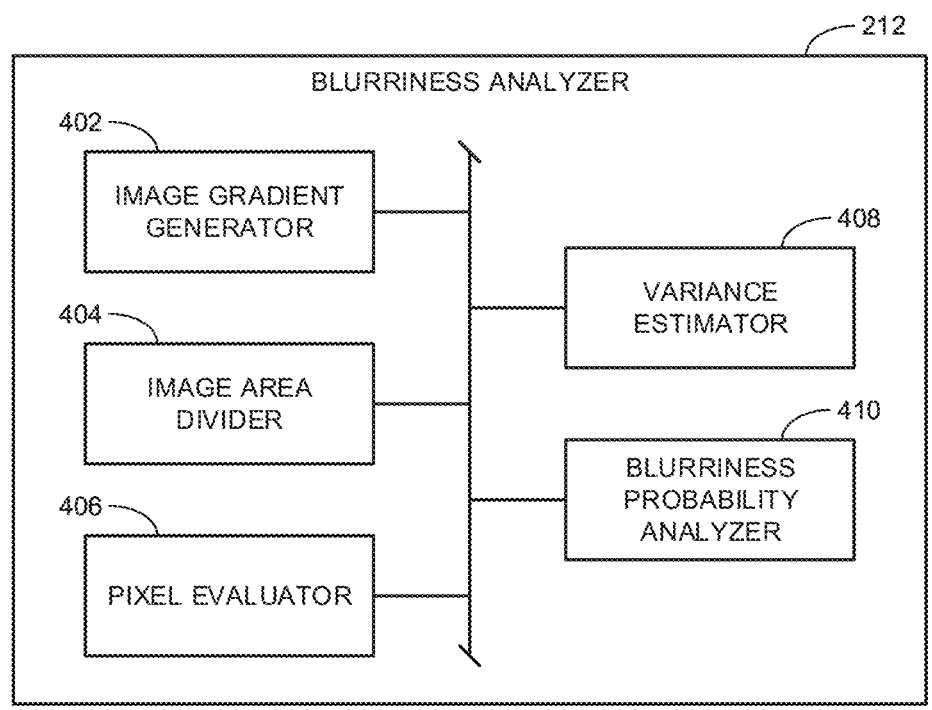
FIG. 4 illustrates an example manner of implementing the example blurriness analyzer of FIG. 2.

FIG. 4 is an example implementation of the example blurriness analyzer 212 of FIG. 2. In the illustrated example, the blurriness analyzer 212 includes an example image gradient generator 402, an example image area divider 404, an example pixel evaluator 406, an example variance estimator 408, and an example blurriness probability analyzer 410.

The example image gradient generator 402 of the illustrated example FIG. 4 is provided to generate an image gradient of a captured photograph to facilitate in the analysis of blurriness in the photograph. In some examples, the image gradient generator 402 functions the same as or similar to the image gradient generator 302 of the perspective analyzer 210 of FIG. 3. In some examples, a single image gradient generator is implemented to serve both the perspective analyzer 210 and the blurriness analyzer 212.

The example image area divider 404 of the illustrated example FIG. 4 is provided to divide different areas within the photograph to be analyzed for blurriness. In some examples, the image area divider 404 functions the same as or similar to the image area divider 306 of the perspective analyzer 210 of FIG. 3. In some examples, a single image area divider is implemented to serve both the perspective analyzer 210 and the blurriness analyzer 212. In some examples, parts of a photograph may be sharp while other parts of the photograph may be blurry. Accordingly, analyzing separate areas of the photograph can serve to better detect whether the photograph is blurry or not. An example division of areas to be analyzed is represented in FIG. 4I in which the image is divided into nine sections with the four side sections (e.g., numbered in the illustrated example) being used in the analysis. In some examples, the side areas are selected for analysis because the central region is typically the most likely to be sharp because the central region of an image is often the reference used when a camera auto-focuses before taking a picture. Other arrangements of the areas (e.g., smaller or larger areas, different shapes of areas, different amount of areas selected for analysis, etc.) may alternatively be used.

The example pixel evaluator 406 of the illustrated example of FIG. 4 is provided to evaluate each pixel within each area to determine whether the pixel is to be included in an analysis for blurriness. In some examples, a pixel is identified for analysis if the pixel has a pixel value above a corresponding pixel value threshold. As described above, in some examples, each pixel will have a value between 0 and 255 where 255 is perfectly white (corresponding to a sharp edge identified by the edge detection filter) and 0 is perfectly black (corresponding to an area that does not change intensity at all in the direction of the applied edge detection filter). In some examples, the pixel value threshold is 35 such that the black and nearly black pixels are excluded from the analysis. In other examples, a different threshold greater than or less than 35 may alternatively be (e.g., 10, 20, 25, 50, etc.). In some examples, all pixels are analyzed (i.e., there is no threshold to select the pixels). In some examples, the pixel values corresponding to the pixels identified for blurriness analysis are stored in a vector as a placeholder for the pixel values.

The example variance estimator 408 of the illustrated example of FIG. 4 is provided to estimate or evaluate the variance of pixel values for all of the pixels identified by the pixel evaluator 406. The greater amount of variance is indicative of blurriness because the pixel values will vary across gradual contrasting gradients of blurred lines rather being abrupt changes if the detected edge lines were sharp and clear.

The example blurriness probability analyzer 410 of the illustrated example of FIG. 4 is provided to analyze the estimated variance of pixel values for each of the areas in the image using a logistic model to calculate a probability that the photograph is blurry. In some examples, the output probability will be a value between 0 and 1 where 0 indicates there is no probability of the photograph being blurry while increasing values approaching 1 indicate an increasing probability that the photograph is blurry. In some examples, the blurriness probability analyzer 410 designates a photograph as either blurry or not blurry based on whether the calculated probability exceeds a defined blurriness threshold. In some examples, the blurriness threshold is about 0.9 but may be higher or lower (e.g., 0.7, 0.8, 0.95) depending upon the amount of blurriness that is acceptable for the particular application.

While an example manner of implementing the blurriness analyzer 212 of FIG. 2 is illustrated in FIG. 4, one or more of the elements, processes and/or devices illustrated in FIG. 4 may be combined, divided, re-arranged, omitted, eliminated and/or implemented in any other way. Further, the example image gradient generator 402, the example image area divider 404, the example pixel evaluator 406, the example variance estimator 408, the example blurriness probability analyzer 410, and/or, more generally, the example blurriness analyzer 212 of FIG. 4 may be implemented by hardware, software, firmware and/or any combination of hardware, software and/or firmware. Thus, for example, any of the example image gradient generator 402, the example image area divider 404, the example pixel evaluator 406, the example variance estimator 408, the example blurriness probability analyzer 410, and/or, more generally, the example blurriness analyzer 212 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image gradient generator 402, the example image area divider 404, the example pixel evaluator 406, the example variance estimator 408, and/or the example blurriness probability analyzer 410 is/are hereby expressly defined to include a tangible computer readable storage device or storage disk such as a memory, a digital versatile disk (DVD), a compact disk (CD), a Blu-ray disk, etc. storing the software and/or firmware. Further still, the example blurriness analyzer 212 of FIG. 2 may include one or more elements, processes and/or devices in addition to, or instead of, those illustrated in FIG. 4, and/or may include more than one of any or all of the illustrated elements, processes and devices.

Figure 5:
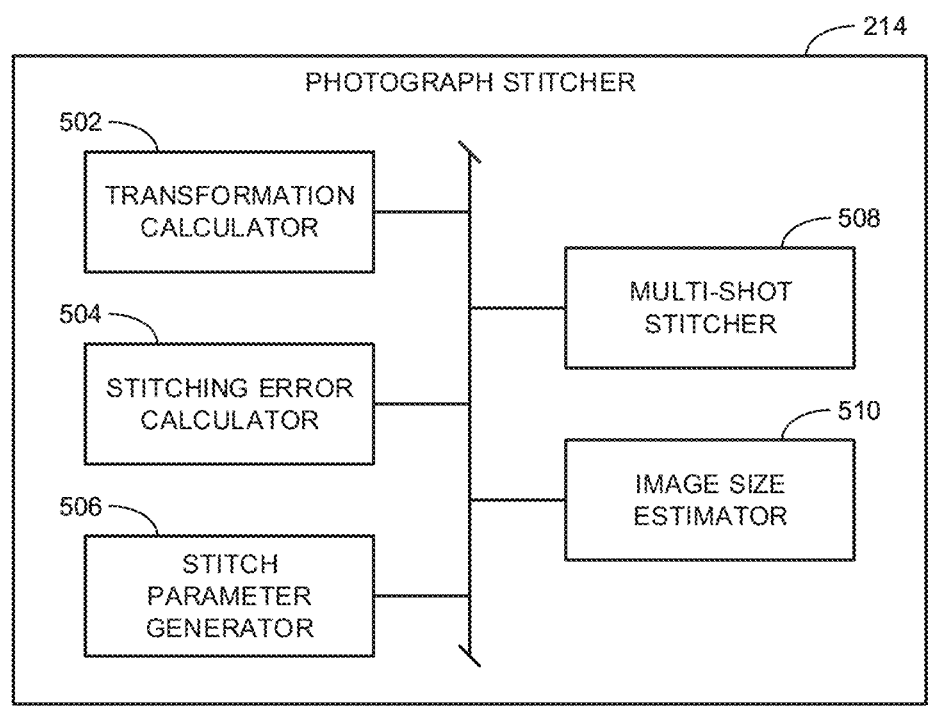
FIG. 5 illustrates an example manner of implementing the example photograph stitcher of FIG. 2.

FIG. 5 is an example implementation of the example photograph stitcher 214 of FIG. 2. In the illustrated example, the photograph stitcher 214 includes an example transformation calculator 502, an example stitching error calculator 504, an example stitch parameter generator 506, an example image stitcher 508, and an example image size estimator 510.

The example transformation calculator 502 of the illustrated example of FIG. 5 is provided to estimate or calculate geometric transformations of the different shots of a multi-shot photograph to be stitched together. In some examples, the transformation calculator 502 of FIG. 5 is the same as the example transformation calculator 207 of FIG. 2. In some examples, the transformation for each shot is estimated based on initial stitch parameters. In some examples, the initial stitch parameters include the orientation data stored for the shot (e.g., feedback data from the sensors of the mobile device) indicating the angle of tilt of the mobile device 108 (e.g., rotation about the X axis 114), the angle of inclination forward or backward (e.g., rotation about the Y axis 116), and the compass direction of the mobile device 108 (e.g., rotation about the Z axis 118). Additionally, in some examples, the initial stitch parameters include lens parameters associated with the camera of the mobile device 108 that characterize the lens focal length and/or the field of view of the camera. Calculating initial estimates of transformations for the photographs based on the initial stitch parameters (e.g., the actual values returned by the mobile device sensors) relative to a reference orientation provides relatively accurate transformations for each photograph to be aligned and stitched with the overlapping regions of the other transformed photographs. Furthermore, such initial transformation estimates are determined based on sensor feedback (orientation data) without regard to analyzing the pixel information to attempt to match the overlapping regions of the different shots as with other known stitching techniques.

While the initial estimate provides relatively accurate transformed photographs to be aligned for stitching, the reliability of the resulting transformation depends, in part, on the reliability and/or precision of the orientation sensors (e.g., accelerometers, gyroscopes, etc.) on the mobile device from which the stitching parameters are obtained. Accordingly, in some examples, the transformation calculator 502 calculates additional transformations based on random variations to the stitch parameters generated by the example stitch parameter generator 506. In some examples, the randomly generated variation in the stitch parameters is limited to within specific thresholds of the initial stitch parameters. For example, the variation in the orientation of the mobile device about any of the three axes may be limited to within 2 degrees of the initial values actually provided by the sensors of the mobile device 108. In other examples, different thresholds may be used (e.g., 1 degree, 3 degrees, 5 degrees, etc.).

In the illustrated example of FIG. 5, the example photograph stitcher 214 is provided with the example stitching error calculator 504 to compare the overlapping portions of adjacent photographs to be stitched together after the photographs have been transformed based on the transformation estimates calculated by the transformation calculator 502. That is, the stitching error calculator 504 determines an error or amount of difference between the overlapping regions of photographs transformed based on an initial transformation corresponding to the initial stitch parameters and the error between the overlapping regions of the photographs transformed based on each of the modified stitch parameters generated by the stitch parameter generator 506. In some examples, the error in each comparison is calculated as the root mean square (RMS) of the corresponding values for corresponding pixels of the overlapping regions of the two transformed shots being analyzed. In some such examples, the stitching error calculator 504 identifies the stitch parameters that produce the least amount of error (i.e., the best error) to be used in the actual stitching of the photographs.

The example image stitcher 508 of the illustrated example of FIG. 5 is provided to stitch or splice the photographs into a single image once transformed by the transformation calculator 502 based on the best stitch parameters identified by the stitching error calculator 504. The example image size estimator 510 of the illustrated example of FIG. 5 is provided to estimate a total size of a final image corresponding to each of multiple shots stitched together by the image stitcher 508. In some example, the image size estimator 510 calculates the size of the image bounded by region of interest lines defined by a user.

While an example manner of implementing the photograph stitcher 214 of FIG. 2 is illustrated in FIG. 5, one or more of the elements, processes and/or devices illustrated in FIG. 5 may be combined, divided, re-arranged, omitted, eliminated and/or implemented in any other way. Further, the example the example transformation calculator 502, the example stitching error calculator 504, the example stitch parameter generator 506, the example image stitcher 508, the example image size estimator 510, and/or, more generally, the example photograph stitcher 214 of FIG. 5 may be implemented by hardware, software, firmware and/or any combination of hardware, software and/or firmware. Thus, for example, any of the example transformation calculator 502, the example stitching error calculator 504, the example stitch parameter generator 506, the example image stitcher 508, the example image size estimator 510, and/or, more generally, the example photograph stitcher 214 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example transformation calculator 502, the example stitching error calculator 504, the example stitch parameter generator 506, the example image stitcher 508, and/or the example image size estimator 510 is/are hereby expressly defined to include a tangible computer readable storage device or storage disk such as a memory, a digital versatile disk (DVD), a compact disk (CD), a Blu-ray disk, etc. storing the software and/or firmware. Further still, the example photograph stitcher 214 of FIG. 2 may include one or more elements, processes and/or devices in addition to, or instead of, those illustrated in FIG. 5, and/or may include more than one of any or all of the illustrated elements, processes and devices.

Flowcharts representative of example machine readable instructions for implementing the photograph capturing module 120 of FIGS. 1 and 2 are shown in FIGS. 42-48. In this example, the machine readable instructions comprise a program for execution by a processor such as the processor 4912 shown in the example processor platform 4900 discussed below in connection with FIG. 49. The program may be embodied in software stored on a tangible computer readable storage medium such as a CD-ROM, a floppy disk, a hard drive, a digital versatile disk (DVD), a Blu-ray disk, or a memory associated with the processor 4912, but the entire program and/or parts thereof could alternatively be executed by a device other than the processor 4912 and/or embodied in firmware or dedicated hardware. Further, although the example program is described with reference to the flowcharts illustrated in FIG. 42-48, many other methods of implementing the example photograph capturing module 120 may alternatively be used. For example, the order of execution of the blocks may be changed, and/or some of the blocks described may be changed, eliminated, or combined.

Figure 42:
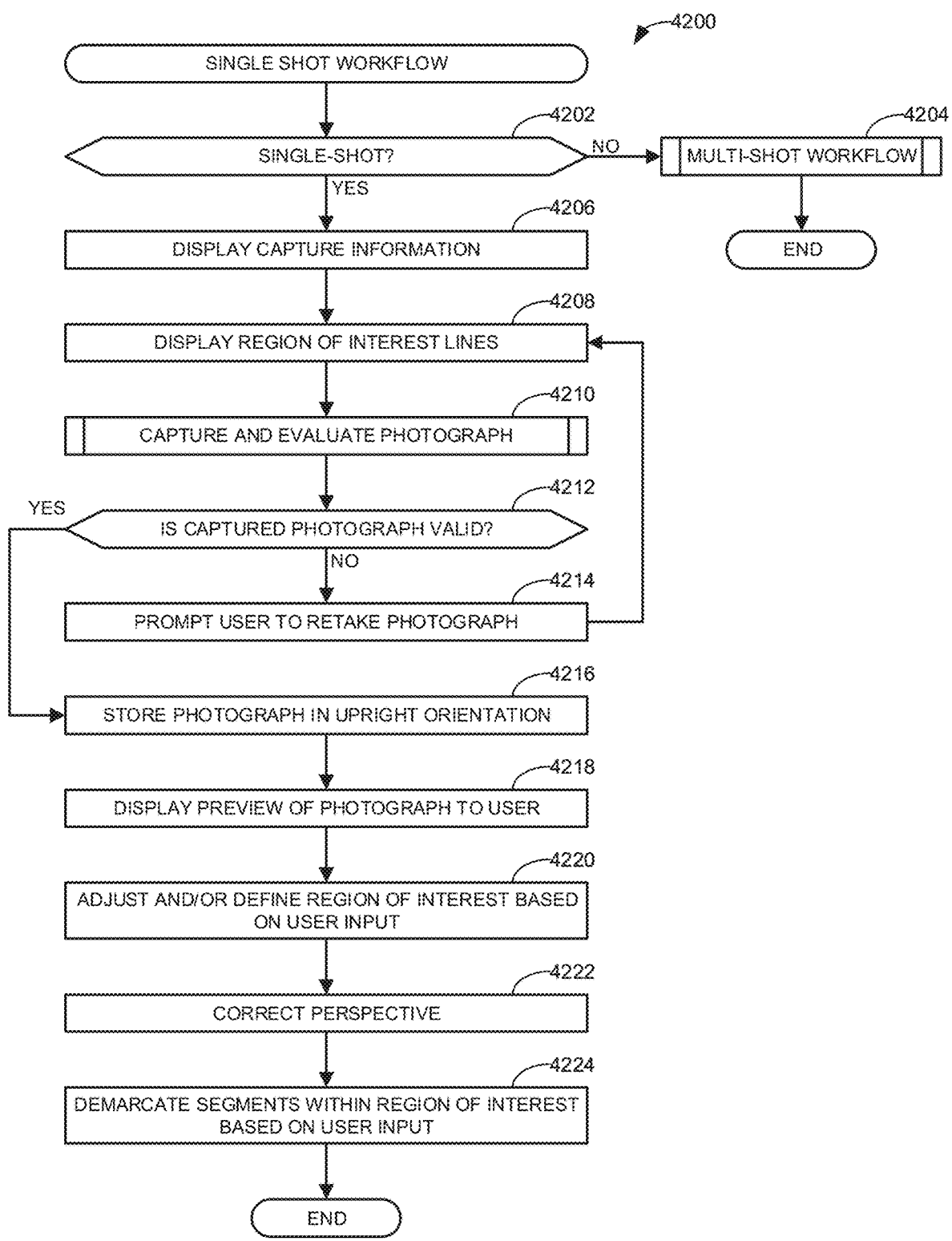
FIGS. 42-48 are flowcharts representative of machine readable instructions that may be executed to implement the example photograph capturing module of FIGS. 1 and/or 2.

The example process of FIG. 42 begins at block 4202 where the example photograph capturing controller 202 determines whether a user will be taking a single shot or multiple shots to be stitched together. If the user indicates that multiple shots are to be taken, control advances to block 4204 where a multi-shot workflow is implemented and then the example of FIG. 42 ends. An example multi-shot workflow corresponding to block 4204 is described in detail below in connection with FIG. 6. In some examples, whether a user intends to take a single shot or multiple shots to be stitched together is determined based on whether the user presses a capture button to capture after capturing a first shot or presses a button to continue to post-processing. That is, in some examples, a single shot is assumed until the user indicates a second shot is to be captured, at which point the example process of FIG. 6 may be implemented.

Returning to block 4202, if a single shot is to be taken, control advances to block 4206 where the example photograph capturing interface 204 displays capture information to the user (e.g., via a display screen of a mobile device being used to take the picture). At block 4208, the example region of interest module 216 displays region of interest lines. In some examples, the region of interest lines a user-adjustable. In other examples, the region of interest lines are omitted. At block 4210 of the example process of FIG. 42, the example photograph capturing controller 202 captures and evaluates a photograph. Further detail in the process of capturing and evaluating a photograph are described below in connection with FIG. 43. Once a photograph has been captured and evaluated, at block 4212, the example photograph capturing controller 202 determines whether the photograph is valid. In some examples, a photograph is valid if the evaluation (performed at block 4210) does not indicate a likelihood of the photograph having poor quality (e.g., the photograph meets acceptable threshold requirements). In particular, as described more fully below, after a photograph is captured, the photograph is analyzed for blurriness and perspective. If the example photograph capturing controller 202 determines that the device is blurry (e.g., a probability of blurriness exceeds a corresponding blurriness threshold) and/or that there is perspective (e.g., a probability of perspective exceeds a corresponding perspective threshold), the photograph may be rejected as invalid (i.e., unreliable for use in subsequent image recognition analysis)

If the photograph is not valid, control advances to block 4214 where the user is requested to retake the photograph. In some examples, the photograph is automatically rejected. In some examples, the user is given the option to accept the photograph even though the evaluation indicated it was not valid. In some examples, a user may be request to re-take a shot a set number of times (e.g., three attempts) before the user is allowed to accept an invalid photograph.

If the captured photograph is determined to be valid (block 4212), control advances to block 4216 where the example captured photograph database 222 stores the photograph in an upright orientation. Different users may hold a mobile device in different ways when taking pictures. For example, some users may hold the mobile device with a capture button (e.g., the capture button 608) on the left side (in landscape mode) while other users may hold a mobile device with the capture button on the right side. Likewise, some users may position the button either on the top or the bottom when holding the mobile device in portrait mode. Comparing photographs taken by such users without taking into account the orientation of the mobile device would result in the pictures from one user being upside down relative to the others. Accordingly, in some examples, the example orientation monitor 206 is used to define an upright direction for the captured photograph before it is stored. In some examples, the upright orientation is determined by the example orientation monitor 206 analyzing information collected from sensors on the mobile device indicating the orientation of the device at the time the photograph was taken. Thus, in some examples, the photograph may be rotated before being stored.

At block 4218, the example photograph capturing interface 204 displays a preview of the photograph to the user. At block 4220, the example region of interest module 216 adjusts and/or defines the region of interest based on user input. In some examples, a user may adjust the region of interest defined previously by region of interest lines at block 4208. In other examples, where no region of interest was initially defined, the user may define a region of interest.

At block 4222, the example perspective corrector 218 corrects the perspective in the photograph. As described above, photographs with too much perspective are rejected as invalid. However, photographs may still contain some level of perspective, just not enough to exceed the threshold to reject the photograph. Because of perspective, although the region of interest may correspond to a rectangular shelf, the lines demarcating the region of interest are likely to be distorted (e.g., have the appearance of a non-rectangular quadrilateral). Accordingly, in some examples, the mobile device implements a transform on the photograph to make the defined region of interest rectangular, thereby correcting for any perspective distortion in the original picture. At block 4224, the example scene segment demarcation module 220 demarcates segments within the region of interest based on user input. In some examples, where the region of interest corresponds to a shelving module, the user is enabled to define shelf positions within the perspective corrected photograph. Correcting the perspective (block 4222) and demarcating segments (block 4224) serve to facilitate the accurate image recognition analysis of the photograph at a later time. Once the shelf positions have been demarcated (block 4224), the example process of FIG. 42 ends.

Figure 43:
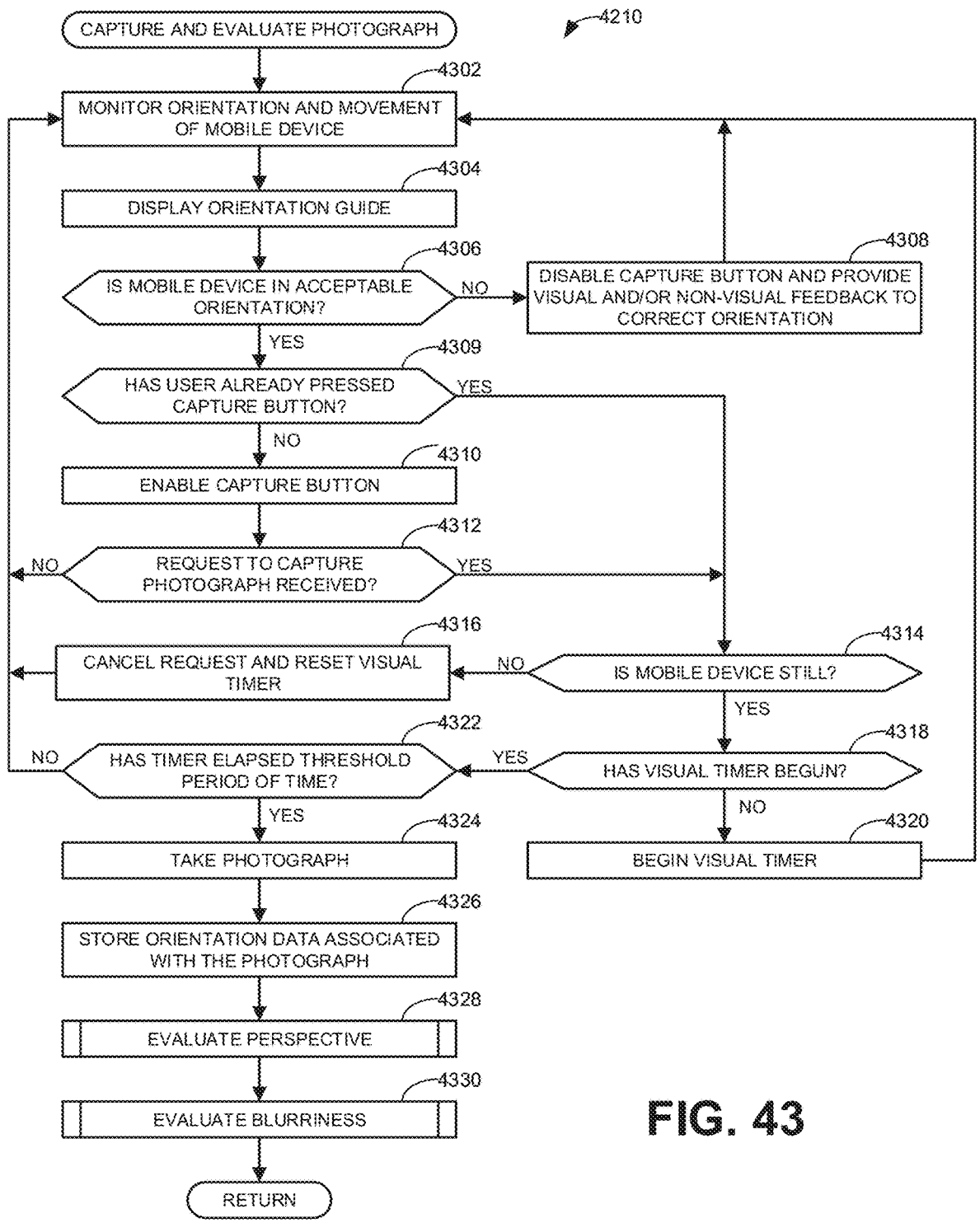

FIG. 43 is a flowchart representative of an example process to capture and evaluate a photograph. In some examples, the process of FIG. 43 may be implemented at block 4210 of FIG. 42. The example process of FIG. 43 begins at block 4302 where the example orientation monitor 206 and the example movement monitor 208 monitor the orientation and movement of a mobile device based on sensors in the device (e.g., gyroscope, accelerometer, magnetic field detector, etc.). At block 4304, the example photograph capturing interface 204 displays orientation guides (e.g., the orientation guides 602, 1202, 1502) to assist a user in properly orienting the mobile device. At block 4306, the example orientation monitor 206 determines whether the mobile device is in an acceptable orientation is determined. In some examples, the orientation of the mobile device is acceptable when a difference between the orientation of the mobile device and a reference orientation (e.g., an upright position) are within corresponding orientation thresholds (e.g., threshold angle of rotation or tilt in the X axis 114, threshold angle of inclination in the Y axis 116, and/or threshold angle of rotation in the Z axis 118). If the orientation is not acceptable, control advances to block 4308 where the example photograph capturing controller 202 disables the capture button (e.g., the capture button 608) and the example photograph capturing interface 204 provides visual and/or non-visual feedback to correct the orientation. In some examples, the visual feedback corresponds to the orientation guides 602, 1202, 1502 described above that may change color, shape, size, and/or placement on the display depending on the orientation of the mobile device.

Additionally or alternatively, in some examples, non-visual feedback is provided to a user. In some examples, the non-visual feedback includes sound (e.g., a beeping) when the mobile device is not in an acceptable orientation. In some examples, the non-visual feedback includes vibration of the mobile device when it is not in an acceptable orientation. In some examples, the non-visual feedback varies proportionately with how close or far away the orientation of the mobile device is relative to an acceptable orientation (e.g., the reference orientation). For example, sound may become louder and/or beep faster the further away the mobile device moves away from the upright position (or other desired position within the defined threshold limits). Similarly, in some examples, the amount of vibration and/or the frequency and/or speed of vibration pulses may increase the further away the mobile device moves from an acceptable orientation. As the visual and/or non-visual feedback is provided to a user (block 4308), control returns to block 4302 to continue monitoring the orientation and movement of the mobile device.

Returning to block 4306, if the mobile device is in an acceptable position, control advances to block 4309 where the example photograph capturing controller 202 determines whether a user has already pressed the capture button. If the user has not already pressed the capture button, control advances to block 4310 where the capture button is enabled. At block 4312, the photograph capturing controller 202 determines whether a request to capture a photograph has been received. In some examples, a request to capture a photograph has been received once a user presses the capture button (enabled at block 4310). If no request is received, control returns to block 4302. If a request to capture a photograph is received, control advances to block 4314 where the example movement monitor 208 determines whether the mobile device is still. Returning to block 4309, if the example photograph capturing controller 202 determines that a user has already pressed the capture button, control advances directly to block 4314 to determine whether the mobile device is still. In some examples, the mobile device is determined to be still when the level of movement of the device (based on associated motion sensors) is below a movement threshold. If the device is not still (e.g., the level of movement exceeds the threshold), control advances to block 4316 where the request to capture a photograph is cancelled and a visual timer (e.g., the visual timer 2502) is reset, whereupon control returns to block 4302. In some examples, with the request cancelled, the user must reposition and steady the mobile device and press the capture button again before a picture can be taken.

If the example movement monitor 208 determines that the mobile device is still (block 4314), control advances to block 4318 where the mobile device determines whether a visual timer (e.g., the visual timer 2502) has begun. In some examples, the timer begins when the capture button is first pressed and the device is confirmed to be sufficiently still. Accordingly, if the visual timer has not begun, control advances to block 4320 to begin the visual timer at which point control returns to block 4302 to continue monitoring the orientation and movement of the mobile device. If the visual timer has begun (e.g., initiated during a previous iteration of the example process), control advances to block 4322 to determine whether the timer has elapsed a threshold period of time. If not, control returns to block 4302. In some examples, the threshold period of time corresponds to the time taken for the visual timer to change from its initial appearance (e.g., FIG. 15(*b*)) to a final appearance (e.g., FIG. 15(*f*)). In some examples, if the mobile device does not remain sufficiently steady during the threshold period of time, the request to capture a photograph is canceled and the timer is reset (block 4316).

If the timer has elapsed the threshold period of time (block 4322), control advances to block 4324 where the photograph capturing controller 202 takes a photograph of the scene where the camera of the mobile device is directed. At block 4326, the captured photograph database 222 stores orientation data associated with the photograph. In some examples, the orientation data is based on feedback from the position and motion sensors in the mobile device defining the orientation of the device on all three axes. In some examples, the orientation data is used to determine the upright position of the photograph when it is to be stored at block 4216 of FIG. 42 as described above.

At block 4328, the example perspective analyzer 210 evaluates the perspective of the photograph. An example process to evaluate the perspective of a photograph is described in greater detail below in connection with FIGS. 44 and 45. At block 4330, the example blurriness analyzer 212 evaluates the blurriness of the photograph. An example process to evaluate the blurriness of a photograph is described in greater detail below in connection with FIG. 46. After the photograph has been captured and evaluated, the example process of FIG. 43 ends and returns to complete the process of FIG. 42 as described above.

Figure 44:
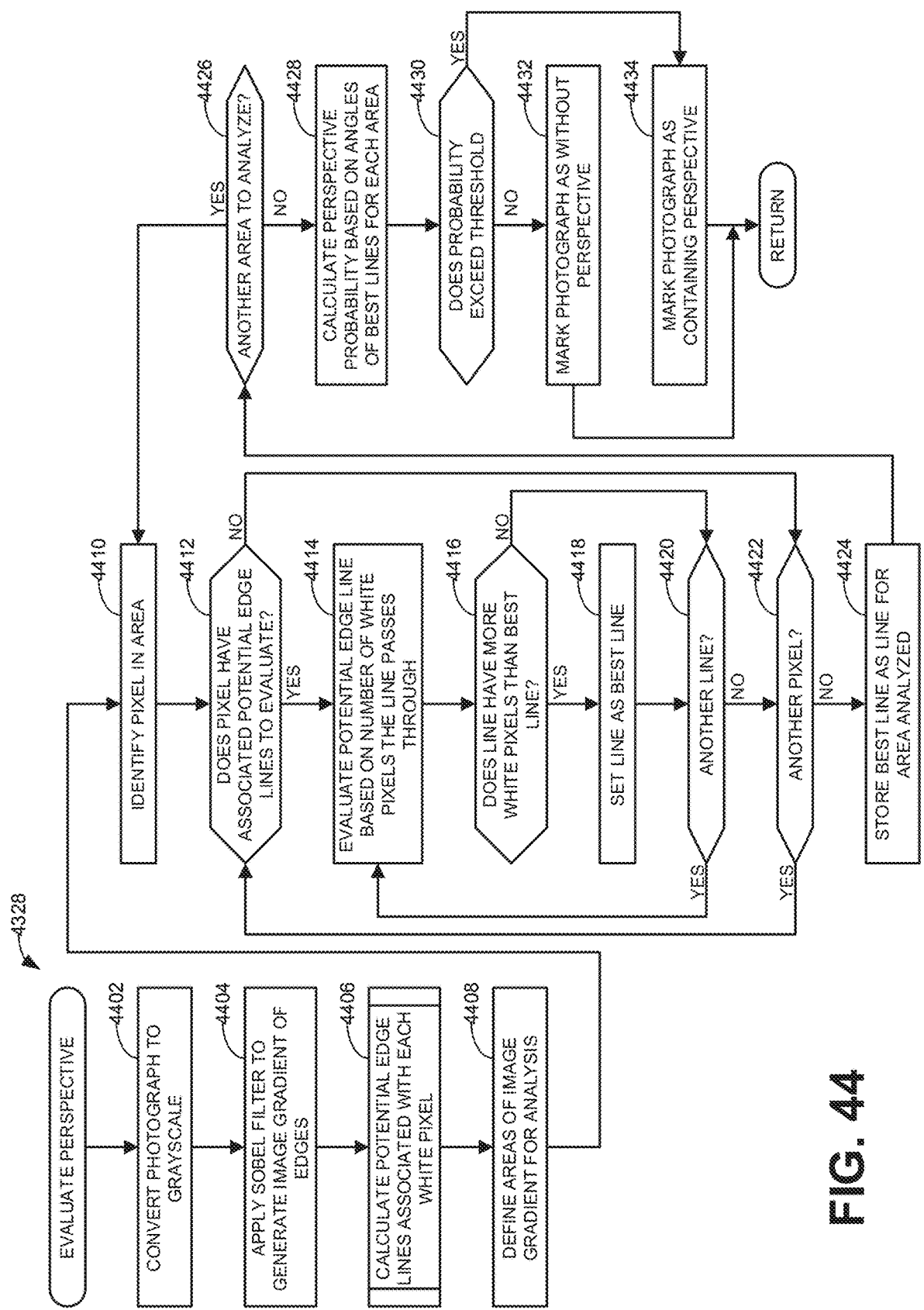

The example process of FIG. 44 begins at block 4402 where the example image gradient generator 302 of the example perspective analyzer 210 converts the photograph to grayscale. Converting to grayscale reduces the processing requirements and, thus, increases the speed of the post-processing analysis of the photograph. At block 4404, the example image gradient generator 302 applies an edge detection filter to the photograph to generate an image gradient of edges in the photograph. For purposes of explanation, the scene of interest is assumed to be a shelving unit with horizontal shelves. Accordingly, in some such examples, only a vertical edge detection filter (e.g., a Sobel filter) is applied to detect the edges of the shelves that may be used to evaluate the perspective of the photograph. Limiting the edge detection filter to one direction serves to increase the speed of the analysis but different applications of the filter may be applied in different directions or multiple directions as needed.

At block 4406, the example potential edge line calculator 304 calculates potential edge lines associated with each white pixel in the image gradient (e.g., the pixels corresponding to detected edges). Greater detail in calculating potential edge lines is described below in connection with FIG. 45.

At block 4408, the example image area divider 306 defines areas of the image gradient for analysis. At block 4420, the example edge line evaluator 308 identifies a first pixel to analyze in a first of the areas. In some examples, every pixel within the identified area is analyzed. In some examples, the edge line evaluator 308 iterates through each row of pixels. At block 4422, the example edge line evaluator 308 determines if the pixel has associated potential edge lines to evaluate (e.g., initially calculated at block 4406). If the pixel has associated potential edge lines, control advances to block 4424 where the example edge line evaluator 308 evaluates a first potential edge line based on a number of white pixels the line passes through. Each potential edge line is defined as a line with a predetermined angle (calculated at block 4406) passing through the pixel. Using the specified angle of the potential edge line (calculated at block 4406) in conjunction with the calculated position of all the white pixels in the image (calculated at block 4406), the example edge line evaluator 308 can determine the number of white pixels through which the line passes. At block 4426, the example edge line evaluator 308 determines whether the potential edge line has more pixels than a best line (e.g., a line having more with pixels than any other line in the area being analyzed). If so, control advances to block 4428 where the potential edge line is set as the best line (i.e., the line most likely to correspond to an actual edge). In some examples, if the potential edge line is the first line being analyzed in the process, it is automatically set as the best line. After setting the best line (block 4428), control advances to block 4430 to determine whether there is another potential edge line to evaluate. If so, control returns to block 4424. Returning to block 4426, if the potential edge line being analyzed does not have more white pixels than the best line, control advances directly to block 4430.

If there are no more potential edge lines to evaluate (block 4430), control advances to block 4432, where the example edge line evaluator 308 determines whether there is another pixel to evaluate. If so control returns to block 4422. Otherwise, control advances to block 4434 where the best line is stored as a line for the area analyzed. At block 4436, the example image area divider 306 determines whether there is another area to be analyzed. If so control returns to block 4420 to repeat the process of analyzing each pixel to determine the best line in the area and store it as the line for the area.

If all areas have been analyzed, control advances to block 4438 where the example perspective probability analyzer 310 calculates a perspective probability based on the angles of the best lines identified for each area. In some examples, the probability is determined based on applying a logistic model to the identified angles. At block 4430, the example perspective probability analyzer 310 determines whether the probability exceeds a threshold. If the calculated probability for the photograph does not exceed the threshold, control advances to block 4432 where the photograph is marked as containing no perspective (e.g., the photograph is valid for purposes of perspective) at which point the example process of FIG. 44 ends and returns to the process of FIG. 43. While there may be some perspective in such examples, the amount is acceptable for purposes of subsequent image recognition analysis. If the calculated probability for the photograph does exceed the threshold (block 4430), control advances to block 4434 where the photograph is marked as containing perspective at which point the example process of FIG. 44 ends and returns to the process of FIG. 43.

Figure 45:
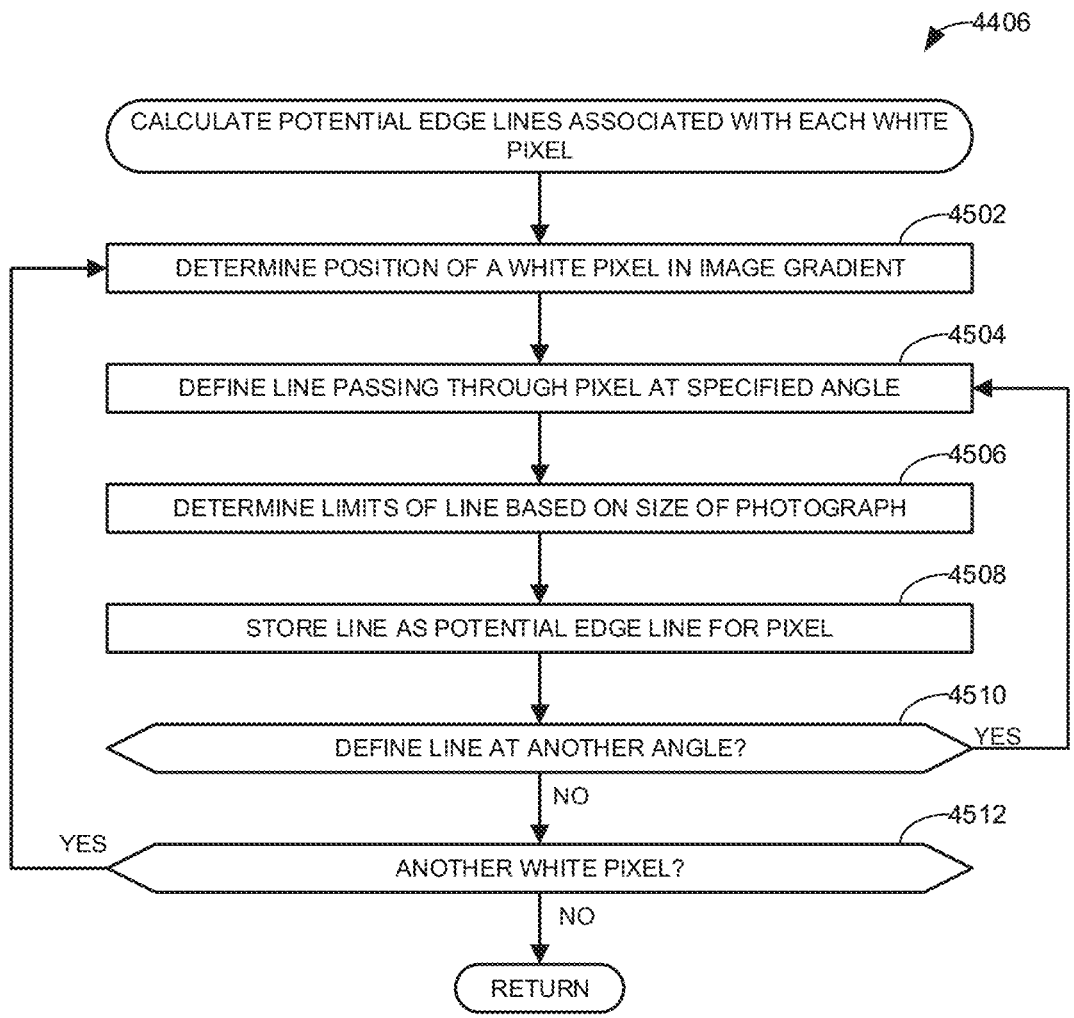

FIG. 45 is a flowchart representative of an example process to calculate potential edge lines associated with each white pixel in an image gradient. In some examples, the process of FIG. 45 may be implemented at block 4406 of FIG. 44. The example process of FIG. 45 begins at block 4502 where the example potential edge line calculator 304 determines the position of a white pixel in the image gradient. In some examples, white pixels are identified based on their pixel value. More particularly, in some examples, where the photograph was converted to grayscale, the pixel will have a value between 0 and 255 where 255 is perfectly white and 0 is perfectly black. In some examples, only pixels with a 255 value are identified for further analysis. In other examples, a range of pixel values (e.g., from 250-255, 240-255, 230-255, 200-255, etc.) are used to identify white pixels. In some examples, the position of each identified white pixel is defined by the x and y positions or coordinates of the pixel with in the two-dimensional pixel grid of the image.

At block 4504, the example potential edge line calculator 304 defines a line passing through the pixel at a specified angle. In some examples, where horizontally extended edges are going to be detected (e.g., the edges of shelves in a shelving module) the specified angle is specified within a range of angles above and below a horizontal line. At block 4506, the example potential edge line calculator 304 determines the limits (e.g., endpoints) of the line based on the size of the photograph. At block 4508, the example potential edge line calculator 304 stores the line as a potential edge line for the pixel.

At block 4510, the example potential edge line calculator 304 determines whether to define another line at a different angle. If so, control returns to block 4504. Otherwise, control advances to block 4512, where the example potential edge line calculator 304 determines whether there is another white pixel for which to calculate potential edge lines. If so, control returns to block 4502. Otherwise, the example process of FIG. 45 ends and returns to complete the process of FIG. 44.

Figure 46:
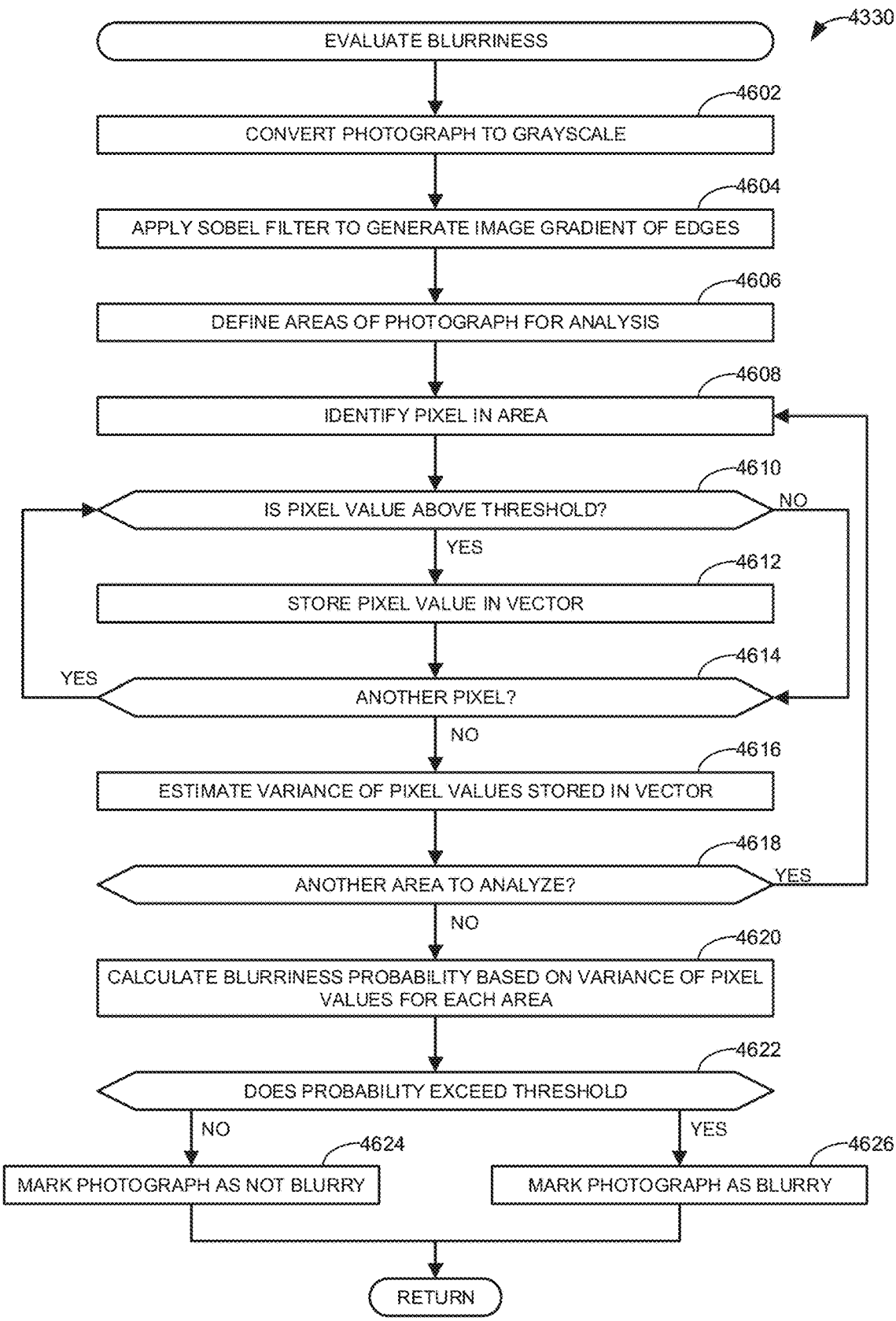

FIG. 46 is a flowchart representative of an example process to evaluate blurriness in a photograph. In some examples, the process of FIG. 46 may be implemented at block 4330 of FIG. 43. The example process of FIG. 46 begins at block 4602 where the example image gradient generator 402 of the example blurriness analyzer 212 converts the photograph to grayscale. At block 4604, the example image gradient generator 402 applies an edge detection filter to the photograph to generate an image gradient of edges in the photograph. In some examples, blocks 4602 and 4604 of the example process of FIG. 46 are identical to blocks 4402 and 4404 of FIG. 44. Accordingly, in some examples, the resulting gradient image generated at block 4404 is used in place of implementing blocks 4602 and 4604. At block 4606, the example image area divider 404 defines areas of the image gradient for analysis.

At block 4608, the example pixel evaluator 406 identifies a first pixel to analyze in a first of the areas. In some examples, every pixel within the identified area is analyzed. In some examples, the example pixel evaluator 406 iterates through each row of pixels. At block 4610, the example pixel evaluator 406 determines whether the pixel value is above a threshold. If the pixel value is above the threshold (block 4610), control advances to block 4612 where the pixel value is stored in a vector (e.g., a placeholder for all values to be analyzed). Control then advances to block 4614 where the example pixel evaluator 406 determines whether there is another pixel to analyze. If so control returns to block 4610. If the pixel value is not above the threshold (block 4610), control advances directly to block 4614.

Once example pixel evaluator 406 determines that there are no more pixels in the area to analyze (block 4614), control advances to block 4616 where the example variance estimator 408 estimates the variance of the pixel values stored in the vector. At block 4618, the example image area divider 404 determines whether there is another area to analyze. If so, control returns to block 4608 to repeat the process for the designated area of the image. When there are no more areas to analyze, control advances to block 4620 where the example blurriness probability analyzer 410 calculates a blurriness probability based on the variance of pixel values for each area. At block 4622, the example blurriness probability analyzer 410 determines whether the probability exceeds a blurriness threshold. If the calculated probability for the photograph does not exceed the blurriness threshold (block 4622), control advances to block 4624 where the photograph is marked as not blurry (i.e., sharp) at which point the example process of FIG. 46 ends and returns to the process of FIG. 43. If the calculated probability for the photograph does exceed the threshold (block 4622), control advances to block 4626 where the photograph is marked as blurry at which point the example process of FIG. 46 ends and returns to the process of FIG. 43.

Figure 47:
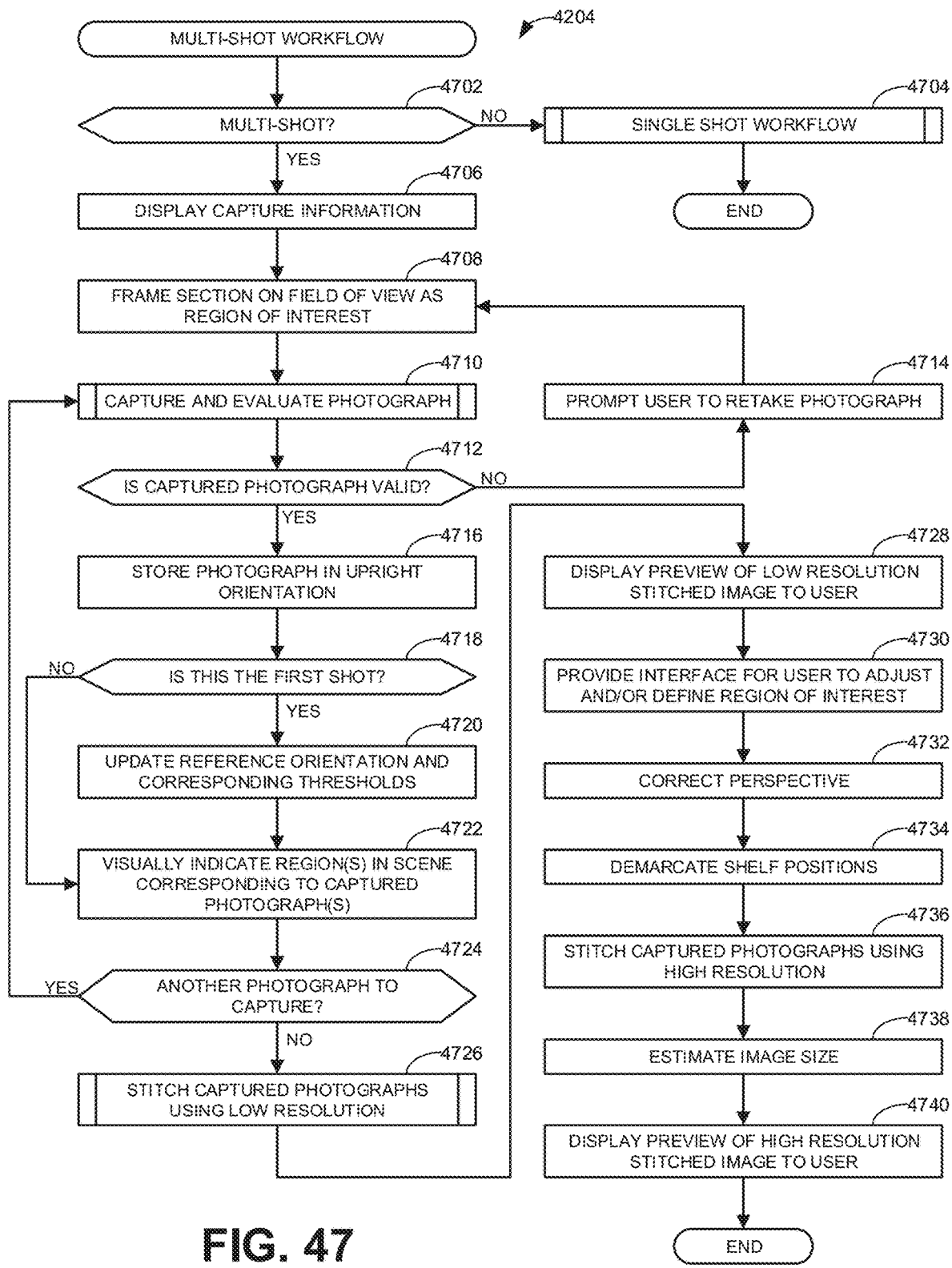

FIG. 47 is a flowchart representative of example process to guide a user in capturing multiple photographs to be stitched together to form a single high quality final image for subsequent image recognition analysis. In some examples, the process of FIG. 47 may be implemented at block 4204 of FIG. 42. The example method of FIG. 47 begins at block 4702 where the example photograph capturing controller 202 determines whether a user will be taking a single shot or multiple shots stitched together. If the user indicates that a single shot is to be taken, control advances to block 4704 where the single shot workflow described in connection with FIG. 42 is implemented, whereupon the example of FIG. 47 ends. In some examples, the example photograph capturing controller 202 determines that multiple shots are to be taken when a user presses the capture button (e.g., the capture button 608) a second time after capturing a first photograph without completing the post-processing of the first shot. If multiple shots are to be taken, control advances to block 4706 where capture information is displayed to the user. In the illustrated example, when a user takes the first shot of a multi-shot photograph, blocks 4706, 4708, 4710, 4712, 4714, and 4716 follow the same process as described above in connection with corresponding blocks 4206, 4208, 4210, 4212, 4214, and 4216 of FIG. 42.

After capturing and storing the photograph, control advances to block 4718 where the example photograph capturing controller 202 determines whether the photograph is the first shot of the multi-shot process. If so, control advances to block 4720 where the example orientation monitor 206 updates the reference orientation and corresponding thresholds. In some examples, the process to capture the first shot for a multi-shot image is the same as capturing a single shot as described above in FIGS. 42-5. Thus, as described above, in some examples, the orientation of the mobile device in a single shot process is limited by threshold angles of tilt and inclination (e.g., rotation about the X and Y axes 114, 116) relative to a reference orientation such as an upright position (assumed for vertically oriented front facing plane of shelving modules). In some examples, the threshold angles may be around 20 to 30 degrees. Effective stitching of separate shots in a multi-shot process can be significantly improved when each of the shots are taken from approximately the same orientation. Accordingly, in some examples, the orientation data defining the orientation of the mobile device at the time of the first shot is used as the reference orientation of the subsequent shots.

In some examples, the orientation limits or thresholds from the reference orientation are stricter for second and subsequent shots than the threshold limits relative to an upright position (e.g., the initial reference orientation) for the first shot. For example, while the orientation of the mobile device may limited to within 30 degrees of the initial reference orientation before a first shot can be taken, a mobile device taking second and subsequent shots for a multi-shot image may be limited to within 10 degrees of the orientation of the mobile device when the first shot was taken. Additionally, in some examples, there may be no limits on the compass direction of the mobile device during a first shot as there is no reference direction that can be assumed (rather a user is assumed to aim the mobile device towards the scene being photographed), the mobile device is limited in its compass direction (rotation about the vertical Z axis 118) to a corresponding threshold limit for second and subsequent shots. In some examples, the limit or thresholds defining the extent of misorientation acceptable for a mobile device (relative to the reference orientation) in second and subsequent shots may be greater than or less than 10 degrees (e.g., 5 degree, 15 degrees, etc.).

Once the orientation limits are defined for subsequent shots (block 4720), control advances to block 4722. If the captured photograph is not the first shot (block 4718), control advances directly to block 4722. At block 4722 the example photograph capturing interface 204 visually indicates region(s) in the scene of interest corresponding to previously captured photograph(s). In some examples, the first shot is overlaid on the display of the current field of view of the camera to provide an indication to the user of what portion or region of the scene has already captured in the first image to assist in determining where to direct the second shot. In some examples, after the second shot, both the first and second shot are overlaid the display. In some examples, the first and second shot are stitched together before being overlaid. In some examples, the overlaid captured photograph(s) are rendered semi-transparent so that the user can still see that actual scene being viewed by the camera of the mobile device. In some examples, real-time image recognition of the scene is implemented to align the overlaid shot(s) with the scene as viewed by the mobile device. That is, in some examples, as a user aims the mobile device at different locations relative to the location of the previous shot(s), the amount and position of the overlaid shot(s) within the display of the mobile device will move accordingly to remain substantially aligned with the actual region of the scene to which the shot(s) correspond. In some examples, the position of the previously captures shot(s) relative to a current field of view is determined based on the current orientation of the mobile device relative to the orientation of the mobile device when the previous shot(s) were taken.

In some examples, rather than overlaying previous shots as described above, the regions in the scene corresponding to the previous shots are visually indicated via lines and/or a box around the corresponding region. In some examples, a separate box is presented for each previously captured photograph. In other examples, the combined area covered by multiple previously captured photographs is visually indicated by a single box or other suitably shaped outline. In some examples, the appearance (e.g., color) of the boxes change when there is insufficient overlap between the previously captured shots and the current field of view.

At block 4724, the example photograph capturing controller 202 determines whether there is another photograph to capture (i.e., another shot to take for the multi-shot image). If so, control returns to block 4710 to capture and evaluate another photograph. In the illustrated example, the process may be repeated for as many shots as needed to capture the entire scene of interest. As described above, the process to capture and evaluate a photograph at block 4710 is the same for the first shot as at block 4210 of FIG. 42, which is detailed in FIG. 43. The process is the same for second and subsequent shots as well except that displaying the orientation guides (block 4304 of FIG. 43), determining whether the device is in an acceptable orientation (block 4306 of FIG. 43), and providing feedback to correct the orientation if not (block 4308 of FIG. 43) are implemented with respect to the redefined reference orientation (updated at block 4720). In some examples, the number of shots may be predefined such that once the number is reached, the example photograph capturing controller 202 determines there are no more photographs to capture (block 4724) and control automatically advances to block 4726. Alternatively, in some examples, a user may continue taking additional photographs until the user indicates there are no more shots to be taken (e.g., by selecting the next button) at which point control advances to block 4726.

At block 4726, the example photograph stitcher 214 stitches the captured photographs together using low resolution. Further detail to stitch the captured photographs is provided below in connection with FIG. 48. In some examples, low resolution stitching is implemented to reduce the processing requirements on the mobile device and to provide a quick preview to a user of the stitched image that a user can interact with to verify the accuracy of the stitching and/or to provide additional feedback to improve the quality of the stitched image. In some examples, the separate shots are stitched using the full (e.g., high) resolution of the photographs as captured by the mobile device. At block 4728, a preview of the low resolution stitched image is displayed to the user. In some examples, the user is given the ability to adjust the proposed stitching (e.g., move the positions of one or more of the shots relative to the other shots). Blocks 4730, 4732, and 4734 of the example process of FIG. 47 are the same as blocks 4220, 4222, 4224 of the example process of FIG. 42 as described above.

After segments within the region of interest have been demarcated (block 4734), control advances to block 4736 where the separate shots are stitched using high resolution. In some examples, stitching using high resolution serves to improve the accuracy of the stitching to generate a higher quality final image to be sent to central data collection facility for subsequent image recognition analysis. By contrast, the low resolution stitching described above facilitates faster processing by the mobile device when interacting with the user to obtain additional feedback (e.g., defining the region of interest (block 4730) to then correct perspective (block 4732), and demarcating separate segments of the region of interest (block 4734)). In some examples, because mobile device screens are so small, there will be no appreciable difference to a user between the high resolution stitching and the low resolution stitching. At block 4738, the example image size estimator 510 estimates an image size. In some examples, the image size corresponds to the size of the stitched shots within the area defined by the region of interest input by the user. At block 4740, a preview of the high resolution stitched image is displayed to the user. In this manner, the user can see the final image to verify there are no obvious errors before accepting the image to be transmitted to a data collection facility for subsequent analysis. After this, the example process of FIG. 47 ends.

Figure 48:
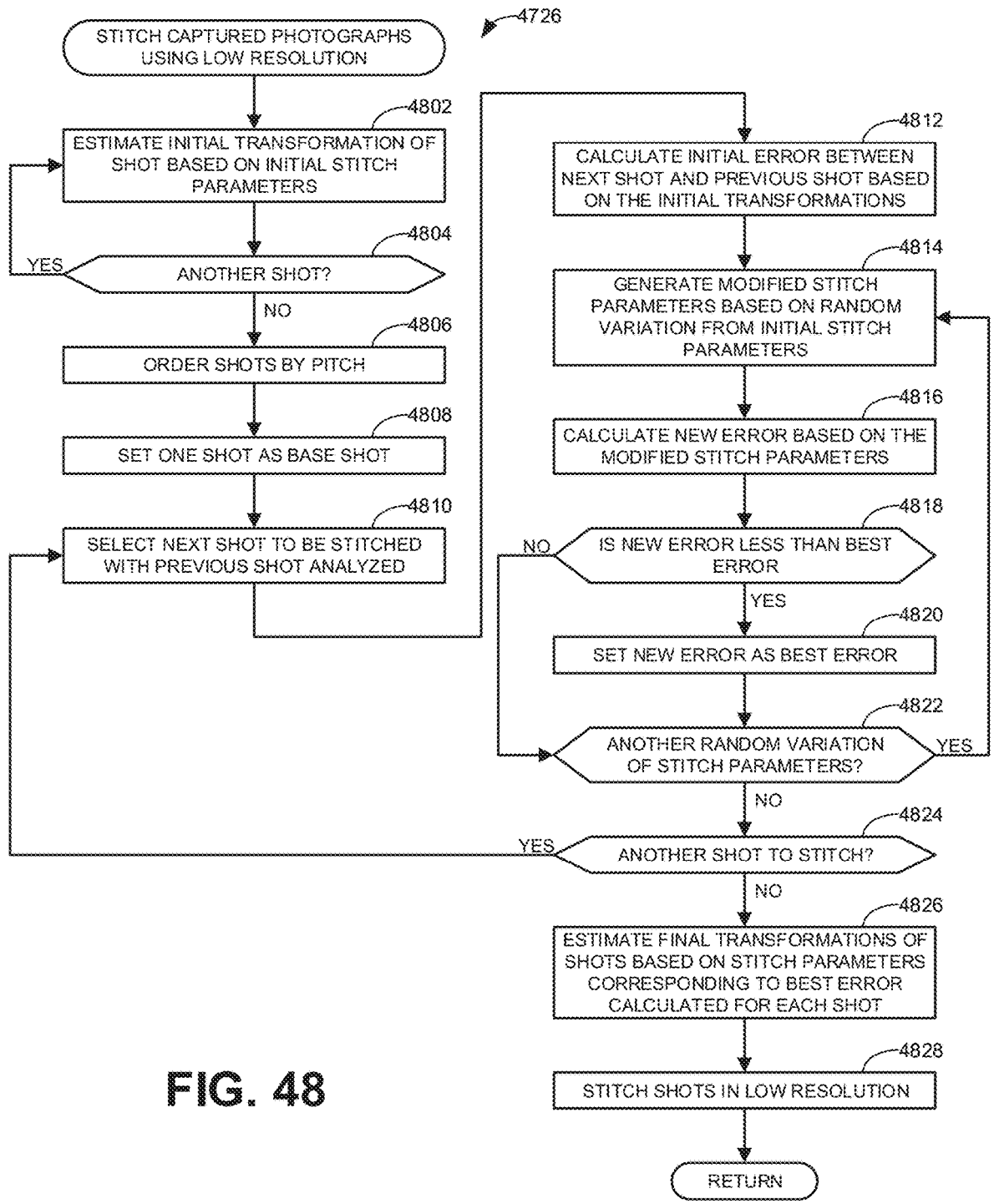

FIG. 48 is a flowchart representative of an example process to stitch captured photographs using low resolution. In some examples, the process of FIG. 48 may be implemented at block 4726 of FIG. 47. Although the example process of FIG. 48 is described with respect to low resolution photographs, the process could alternatively be implemented using high resolution photographs. The example process begins at block 4802 where the example transformation calculator 502 of the example photograph stitcher 214 estimates an initial transformation of a shot (from among multiple shots to be stitched) based on initial stitch parameters. At block 4804, the example transformation calculator 502 determines whether there is another shot to analyze. If so control returns to block 4802 to estimate an initial transformation of the next shot based on the corresponding initial stitch parameters for the shot. If there are no more shots to analyze, control advances to block 4806.

At block 4806, the example photograph stitcher 214 orders the shots by angle of inclination forwards or backwards (e.g., rotation about the Y axis 116). In some such examples, it is assumed that a forward inclination (when the camera is aimed downward) corresponds to lower portions of a scene being photographed (e.g., the bottom of a shelving module) while a backward inclination (when the camera is aimed upward) corresponds to higher portions of a scene (e.g., the top of a shelving module). Thus, in some examples, by ordering the shots according to angle of inclination, the shots can be ordered according to the arrangement in which they are to be stitched. At block 4808, one shot (among the multiple shots to be stitched) is set as a base or beginning shot. In some examples, the base shot corresponds to a shot that is spatially at the end of the stitched image (e.g., either the top or the bottom).

At block 4810, the example photograph stitcher 214 selects the next shot to be stitched with the previous shot analyzed (e.g., the base shot on the first iteration of the example process). In some examples, the next shot selected will be the next in the order of shots determined at block 4806. At block 4812, the example stitching error calculator 504 calculates an initial error between the next shot and the previous shot based on the initial transformations (estimated at block 4802). At block 4814, the example stitch parameter generator 506 generates modified stitch parameters based on random variation from the initial stitch parameters. As described above, the reliability of the orientation data included within the initial stitch parameters is limited by the precision of the sensors generating the orientation data. Other factors may also impact the reliability of the stitch parameters. Accordingly, the example process of FIG. 48 implements a random sample consensus (RANSAC) process to determine more reliable (e.g., optimized) stitch parameters for the photographs to be stitched using computer vision techniques.

At block 4816, the example stitching error calculator 504 calculates a new error based on the modified stitch parameters. In some examples, the new error is calculated in the same manner as the initial error. At block 4818, the example stitching error calculator 504 determines whether the new error (calculated at block 4816) is less than a best error (e.g., originally set as the initial error calculated at block 4812). If so, control advances to block 4820 where the new error is set as the best error (e.g., to replace the previously defined best error). At block 4822, the example stitch parameter generator 506 determines whether to generate another random variation of stitch parameters. In some examples, different modified stitch parameters are randomly generated a specified number of times to iterate through the process a sufficient number of times to arrive at improved (e.g., optimized) stich parameter values that reduce (e.g., minimize) the error between the overlapping portions of the adjacent pictures. Thus, if the example stitch parameter generator 506 determines there is another random variation of stitch parameters (block 4822), control returns to block 4814. If there are no more random variations of stitch parameters to generate (e.g., the example process has executed the specified number of iterations), control advances to block 4824. Returning to block 4818, if the new error is not less than the best error, control advances directly to block 4822.

At block 4824, the example photograph stitcher 214 determines whether there is another shot to stitch. If so, control returns to block 4810 to select the next shot to be stitched and compared with the previous shot analyzed. Otherwise, in some examples, control advances to block 4826 where the example transformation calculator 502 estimates final transformations for the shots based on the improved stitch parameters corresponding to the best error calculated for each shot. In some examples, as described above, the example stitching error calculator 504 analyzes each adjacent pair of shots together such that the error is reduced based on how well the photographs align when transformed based on the corresponding stitch parameters identified for each photograph. In some examples, each comparison of a pair of adjacent shots begins based on the initial stitch parameter values. That is, in an example involving three shots (bottom, middle, and top), the middle may be analyzed relative to the bottom shot (designated as the base or beginning shot) to determine improved (e.g., optimized) values for the stitch parameters for the middle shot. Subsequently, in such an example, the top shot is then analyzed relative to the middle shot. In some examples, the top shot is analyzed relative to the middle shot based on the initial transformation estimate based on the initial stitch parameters rather than the improved transformation based on the stich parameters corresponding to the best error for the middle shot with respect to the bottom shot. Thus, each shot is analyzed relative to the initial stitch parameters of the adjacent shot, even where the adjacent shot may have already been analyzed to arrive at improved (e.g., optimized) stitch parameters somewhat different than the initial values. At block 4826, the example photograph stitcher 214 provides a second level of iterations to further improve the transformation of the photographs to be stitched by estimating final transformations based on the improved stitch parameters determined for each shot as described above.

At block 4828, the example image stitcher 508 stitches the shots in low resolution. As described above, in some examples, the shots are stitched in high (e.g., full) resolution but this is not necessary as this stitching focuses on providing a preview of the complete stitched image for a user to then provide feedback that may be used to further improve the quality of the image. Once the shots are stitched (block 4828), the example process of FIG. 48 ends and returns to FIG. 47.

As mentioned above, the example processes of FIGS. 42-48 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 42-48 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 49:
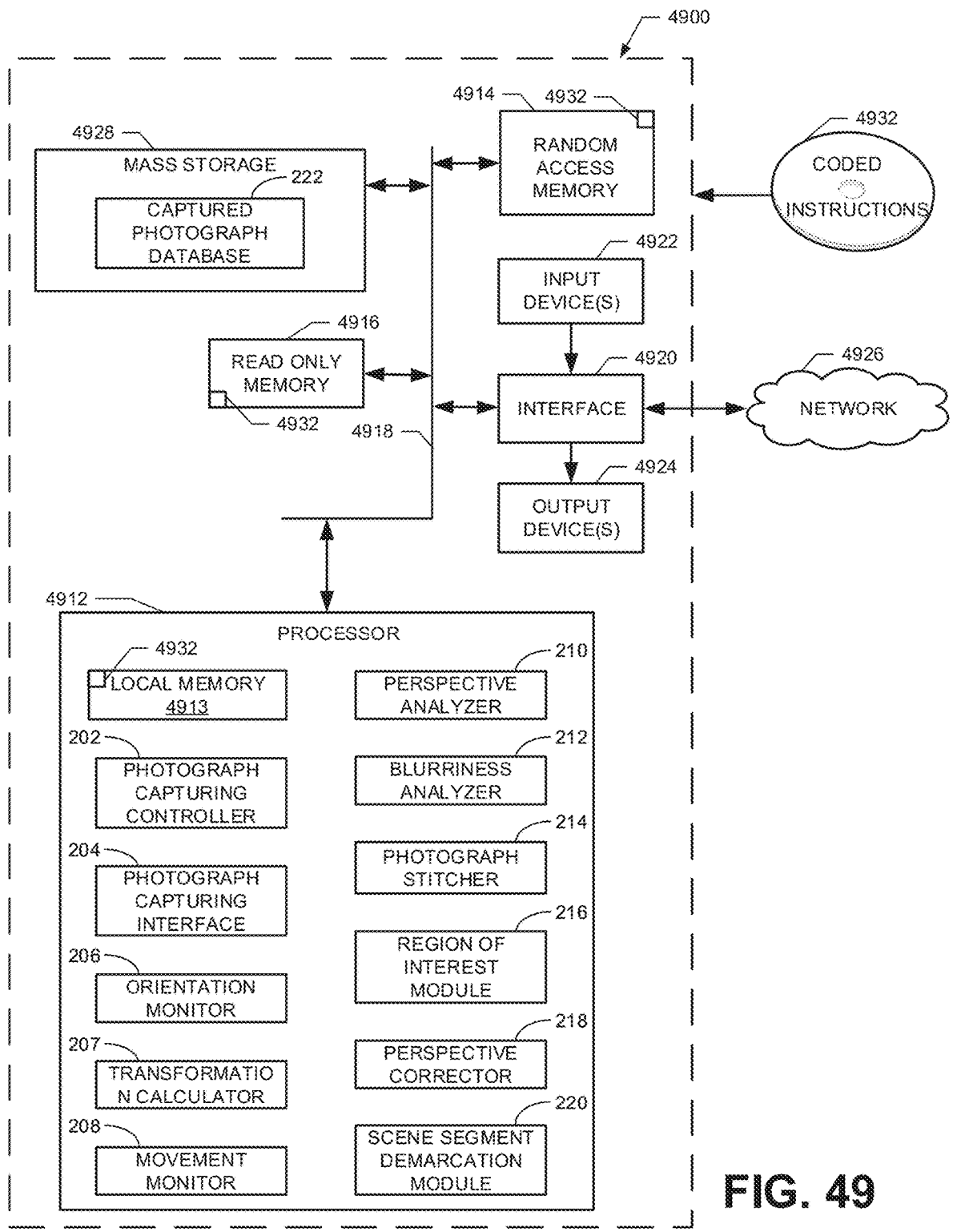
FIG. 49 is a block diagram of an example processor platform capable of executing the example machine readable instructions of FIGS. 3-6 to implement the example photograph capturing module of FIGS. 1 and/or 2.

FIG. 49 is a block diagram of an example processor platform 4900 capable of executing the instructions of FIGS. 42-48 to implement the photograph capturing module 120 of FIG. 2. The processor platform 4900 can be, for example, a server, a personal computer, a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, or any other type of computing device.

The processor platform 4900 of the illustrated example includes a processor 4912. The processor 4912 of the illustrated example is hardware. For example, the processor 4912 can be implemented by one or more integrated circuits, logic circuits, microprocessors or controllers from any desired family or manufacturer.

The processor 4912 of the illustrated example includes a local memory 4913 (e.g., a cache). In the illustrated example, the processor 4912 implements the example photograph capturing controller 202, the example photograph capturing interface 204, the example orientation monitor 206, the example transformation calculator 207, the example movement monitor 208, the example perspective analyzer 210 (detailed in FIG. 3), the example blurriness analyzer 212 (detailed in FIG. 4), the example photograph stitcher 214 (detailed in FIG. 51), the example region of interest module 216, the example perspective corrector 218, and/or the example scene segment demarcation module 220 of FIG. 2. The processor 4912 of the illustrated example is in communication with a main memory including a volatile memory 4914 and a non-volatile memory 4916 via a bus 4918. The volatile memory 4914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 4916 may be implemented by flash memory and/or any other desired type of memory device. Access to the main memory 4914, 4916 is controlled by a memory controller.

The processor platform 4900 of the illustrated example also includes an interface circuit 4920. The interface circuit 4920 may be implemented by any type of interface standard, such as an Ethernet interface, a universal serial bus (USB), and/or a PCI express interface.

In the illustrated example, one or more input devices 4922 are connected to the interface circuit 4920. The input device(s) 4922 permit(s) a user to enter data and commands into the processor 4912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 4924 are also connected to the interface circuit 4920 of the illustrated example. The output devices 4924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 4920 of the illustrated example, thus, typically includes a graphics driver card, a graphics driver chip or a graphics driver processor.

The interface circuit 4920 of the illustrated example also includes a communication device such as a transmitter, a receiver, a transceiver, a modem and/or network interface card to facilitate exchange of data with external machines (e.g., computing devices of any kind) via a network 4926 (e.g., an Ethernet connection, a digital subscriber line (DSL), a telephone line, coaxial cable, a cellular telephone system, etc.).

The processor platform 4900 of the illustrated example also includes one or more mass storage devices 4928 for storing software and/or data. For example, the mass storage device 4928 may include the example captured photograph database 222 of FIG. 2. Examples of such mass storage devices 4928 include floppy disk drives, hard drive disks, compact disk drives, Blu-ray disk drives, RAID systems, and digital versatile disk (DVD) drives.

The coded instructions 4932 of FIGS. 42-48 may be stored in the mass storage device 4928, in the volatile memory 4914, in the non-volatile memory 4916, and/or on a removable tangible computer readable storage medium such as a CD or DVD.

From the foregoing, it will appreciate that the above disclosed methods, apparatus and articles of manufacture increase the likelihood of a user capturing high quality photographs using a mobile device by providing real-time feedback (based on sensor data from the mobile device) before the photograph is taken while the user is aiming the camera of the device at a scene to be photographed. Furthermore, the teachings disclosed herein filter out low quality photographs by performing, via the mobile device, post-processing of captured images to analyze the presence of perspective and/or blurriness to detect photographs that do not meet acceptable thresholds of quality, in which case the photograph may be rejected and the user requested to retake the shot. Further still, the teachings disclosed herein produce more accurate images of multiple photographs stitched together by using orientation data collected at the time photographs are captured to estimate transformations of photographs for the stitching. Increasing the likelihood of high quality photographs, filtering out poor quality photographs, and using orientation data to transform photographs as disclosed herein, serve to facilitate and improve subsequent image recognition analysis of such photographs. Fewer poor quality photographs reduces the amount of processing of images that do not produce useful data (e.g., because nothing can be recognized). Furthermore, ensuring higher quality images (including stitched images that are more accurate) increases the rates of recognition in the images analyzed while reducing the number of false positives (e.g., misidentifying an object within a photograph).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a photograph capturing controller to capture a first photograph;
a blurriness analyzer to determine a probability of blurriness of the first photograph, the probability of blurriness based on an analysis of a portion of the first photograph, the portion excluding a region of the first photograph associated with an auto-focus operation; and
a photograph capturing interface to prompt a user to capture a new photograph to replace the first photograph when the probability of blurriness exceeds a blurriness threshold.

2. The apparatus of claim 1, wherein the blurriness analyzer is to determine the probability of blurriness by:
applying an edge detection filter to the first photograph;
identifying pixels having a pixel value above a pixel value threshold;
estimating a variance of pixel values corresponding to the identified pixels; and
calculating the probability of blurriness based on the estimated variance.

3. The apparatus of claim 2, wherein the variance of the pixel values is a first variance of a plurality of variances of the pixel values, the first variance associated with a first area of multiple areas within the portion of the first photograph, the blurriness analyzer to estimate the first variance based on the pixels identified within the first area.

4. The apparatus of claim 1, wherein the blurriness analyzer is to divide the first photograph into a plurality of sections, the portion of the first photograph including first ones of the sections, the region excluded from the portion including a different one of the sections.

5. The apparatus of claim 4, wherein the first ones of the sections are to be spaced apart from a central point of the first photograph, the different one of the sections including the central point.

6. The apparatus of claim 4, wherein the different one of the sections is a central section of the first photograph, a first section of the first ones of the sections to be at least one of above or below the central section, and a second section of the plurality of sections is to be at least one of to a left or to a right of the central section.

7. The apparatus of claim 4, wherein at least one of the first ones of the sections has a boundary coterminous with an outer perimeter of the first photograph.

8. A non-transitory computer readable medium comprising instructions that, when executed, causes a machine to at least:
   capture a first photograph;
   determine a probability of blurriness of the first photograph, the probability of blurriness based on an analysis of a portion of the first photograph, the portion excluding a region of the first photograph associated with an auto-focus operation; and
   prompt a user to capture a new photograph to replace the first photograph when the probability of blurriness exceeds a blurriness threshold.

9. The non-transitory computer readable medium of claim 8, wherein the instructions further cause the machine to determine the probability of blurriness by:
   applying an edge detection filter to the first photograph;
   identifying pixels having a pixel value above a pixel value threshold;
   estimating a variance of pixel values corresponding to the identified pixels; and
   calculating the probability of blurriness based on the estimated variance.

10. The non-transitory computer readable medium of claim 9, wherein the variance of the pixel values is a first variance of a plurality of variances of the pixel values, the first variance associated with a first area of multiple areas within the portion of the first photograph, the instructions further causing the machine to estimate the first variance based on the pixels identified within the first area.

11. The non-transitory computer readable medium of claim 8, wherein the instructions further cause the machine to divide the first photograph into a plurality of sections, the portion of the first photograph including first ones of the sections, the region excluded from the portion including a different one of the sections.

12. The non-transitory computer readable medium of claim 11, wherein the first ones of the sections are to be spaced apart from a central point of the first photograph, the different one of the sections including the central point.

13. The non-transitory computer readable medium of claim 11, wherein the different one of the sections is a central section of the first photograph, a first section of the first ones of the sections to be at least one of above or below the central section, and a second section of the plurality of sections is to be at least one of to a left or to a right of the central section.

14. The non-transitory computer readable medium of claim 11, wherein at least one of the first ones of the sections has a boundary coterminous with an outer perimeter of the first photograph.

15. An apparatus comprising:
   means for capturing a first photograph;
   means for determining a probability of blurriness of the first photograph, the probability of blurriness based on an analysis of a portion of the first photograph, the portion excluding a region of the first photograph associated with an auto-focus operation; and
   means for prompting a user to capture a new photograph to replace the first photograph when the probability of blurriness exceeds a blurriness threshold.

16. The apparatus of claim 15, wherein the probability of blurriness determining means is to:
   apply an edge detection filter to the first photograph;
   identify pixels having a pixel value above a pixel value threshold;
   estimate a variance of pixel values corresponding to the identified pixels; and
   calculate the probability of blurriness based on the estimated variance.

17. The apparatus of claim 16, wherein the variance of the pixel values is a first variance of a plurality of variances of the pixel values, the first variance associated with a first area of multiple areas within the portion of the first photograph, the probability of blurriness determining means to estimate the first variance based on the pixels identified within the first area.

18. The apparatus of claim 15, wherein the probability of blurriness determining means is to divide the first photograph into a plurality of sections, the portion of the first photograph including first ones of the sections, the region excluded from the portion including a different one of the sections.

19. The apparatus of claim 18, wherein the first ones of the sections are to be spaced apart from a central point of the first photograph, the different one of the sections including the central point.

20. The apparatus of claim 18, wherein at least one of the first ones of the sections has a boundary coterminous with an outer perimeter of the first photograph.

21. The apparatus of claim 18, wherein the different one of the sections is a central section of the first photograph, a first section of the first ones of the sections to be at least one of above or below the central section, and a second section of the plurality of sections is to be at least one of to a left or to a right of the central section.

22. An apparatus comprising:
   memory;
   instructions;
   processor circuitry to execute the instructions to:
   cause capture of a first photograph;
   determine a probability of blurriness of the first photograph, the probability of blurriness based on an analysis of a portion of the first photograph, the portion excluding a region of the first photograph associated with an auto-focus operation; and
   prompt a user to capture a new photograph to replace the first photograph when the probability of blurriness exceeds a threshold.

23. The apparatus of claim 22, wherein the processor circuitry is to execute the instructions to determine the probability of blurriness by:
   applying an edge detection filter to the first photograph;
   identifying pixels having a pixel value above a pixel value threshold;
   estimating a variance of pixel values corresponding to the identified pixels; and
   calculating the probability of blurriness based on the estimated variance.

24. The apparatus of claim 23, wherein the variance of the pixel values is a first variance of a plurality of variances of the pixel values, the first variance is associated with a first area of multiple areas within the portion of the first photograph, and the processor circuitry is to execute the instructions to estimate the first variance based on the pixels identified within the first area.

25. The apparatus of claim 22, wherein the processor circuitry is to execute the instructions to divide the first photograph into a plurality of sections, the portion of the first photograph including first ones of the sections, the region excluded from the portion including a different one of the sections.

26. The apparatus of claim 25, wherein the first ones of the sections are to be spaced apart from a central point of the first photograph, the different one of the sections including the central point.

27. The apparatus of claim 25, wherein the different one of the sections is a central section of the first photograph, a first section of the first ones of the sections to be at least one of above or below the central section, and a second section of the plurality of sections is to be at least one of to a left or to a right of the central section.

28. The apparatus of claim 25, wherein at least one of the first ones of the sections has a boundary coterminous with an outer perimeter of the first photograph.

\* \* \* \* \*